M. TEETOR.
CALCULATING MACHINE.
APPLICATION FILED APR. 18, 1914. RENEWED NOV. 24, 1919.

1,371,526.

Patented Mar. 15, 1921.
26 SHEETS—SHEET 1.

Witnesses:
Milton Lenoir,
Sebastian Hinton

Inventor:
Martin Teetor
Wallace R Lane
Attorney.

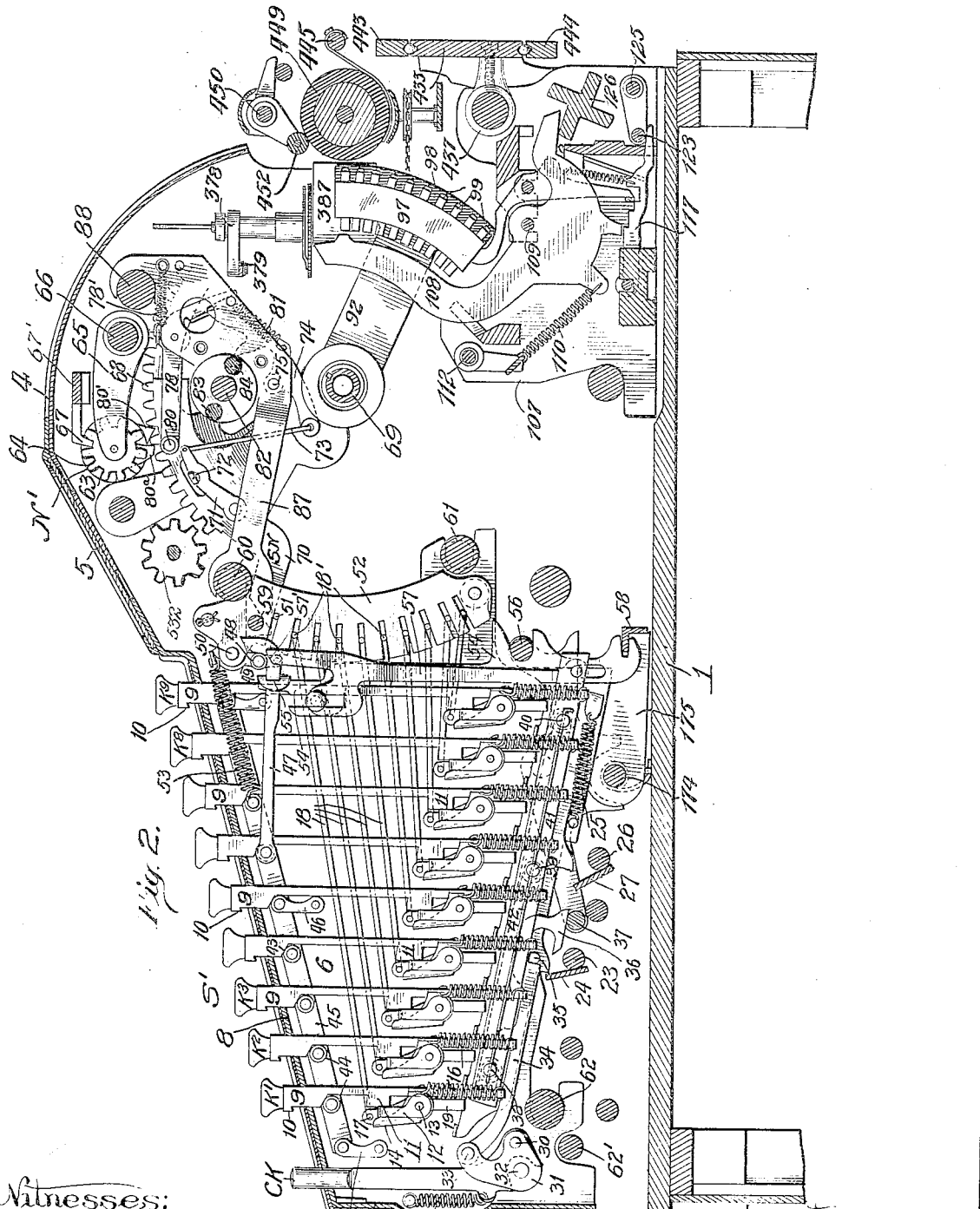

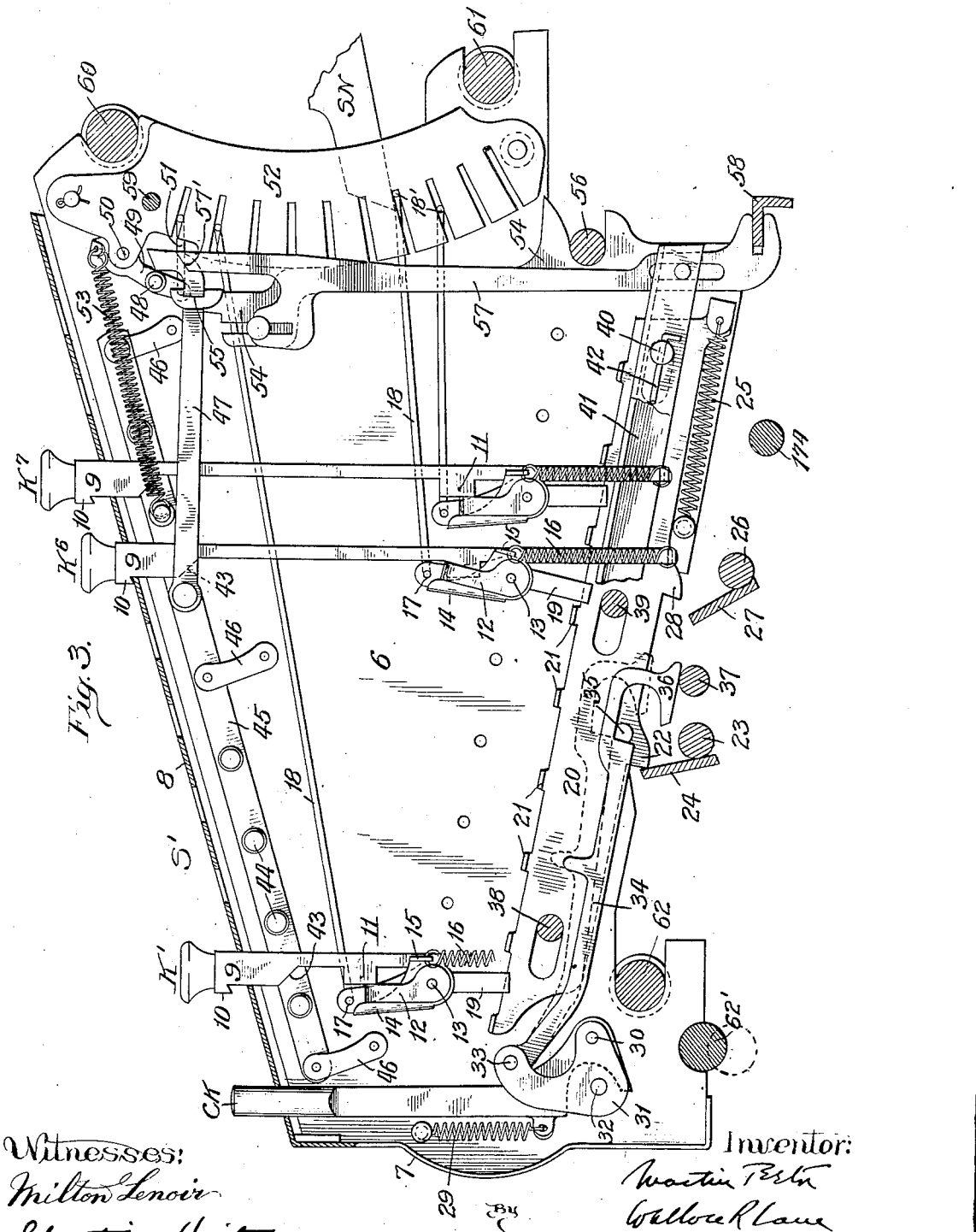

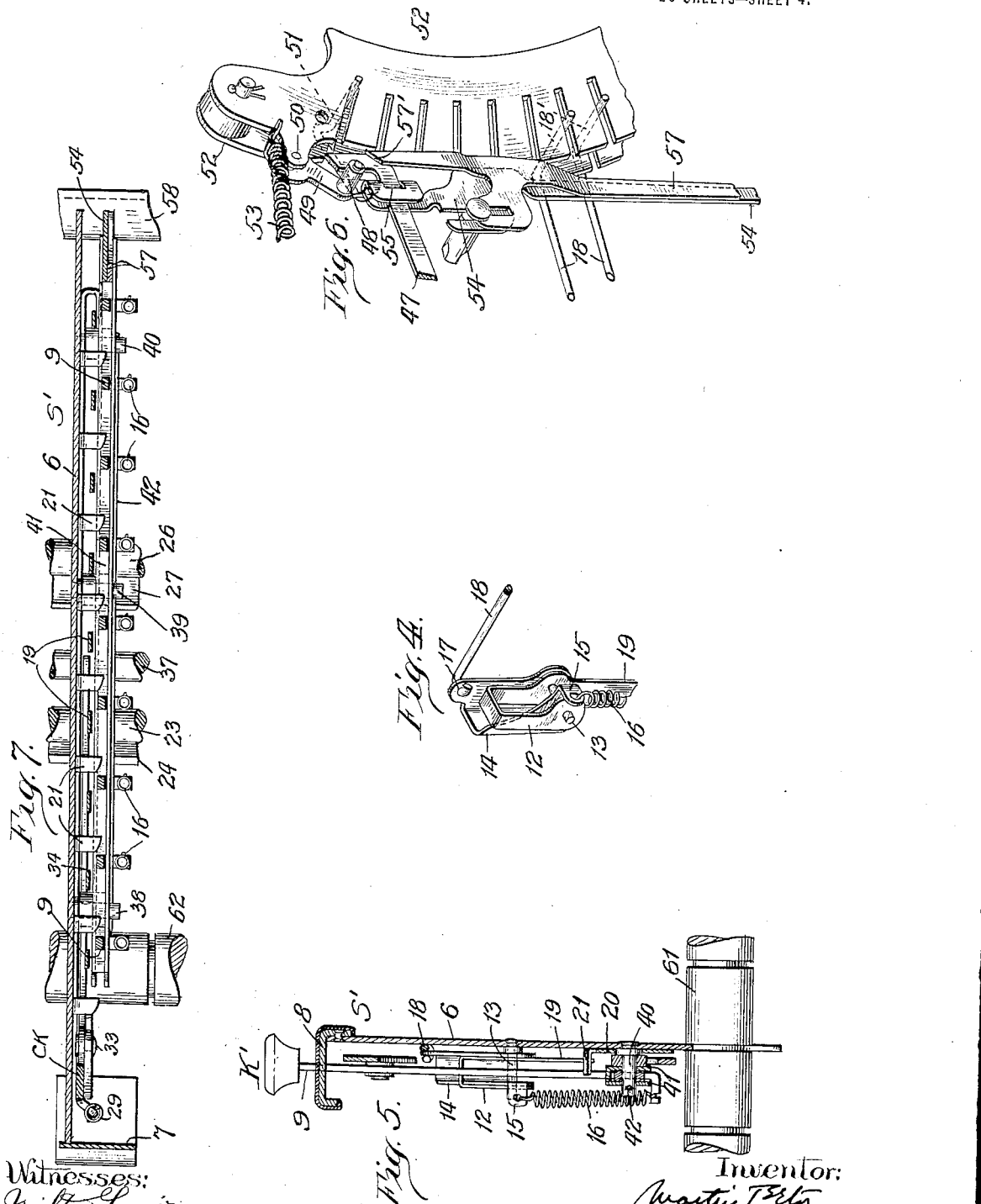

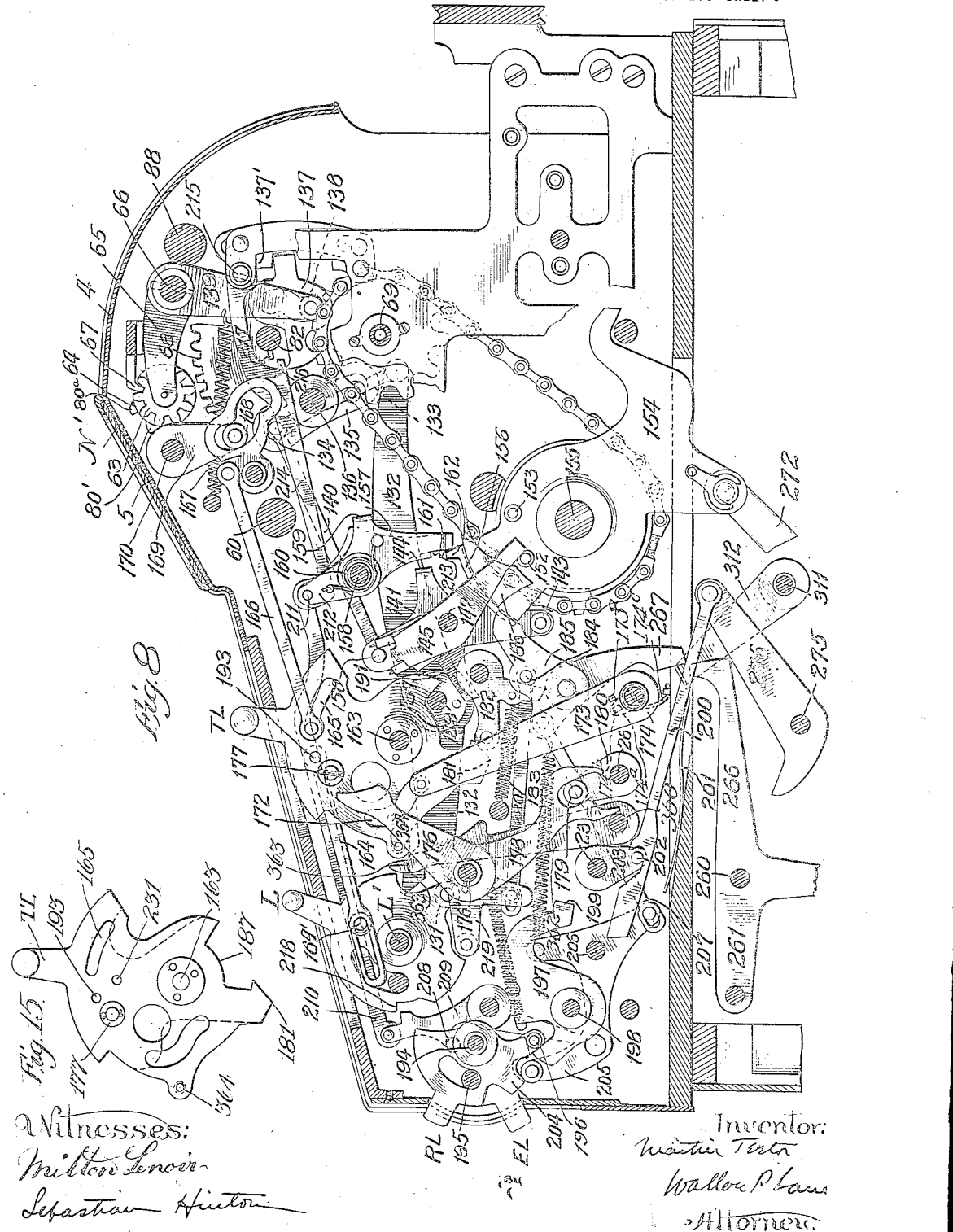

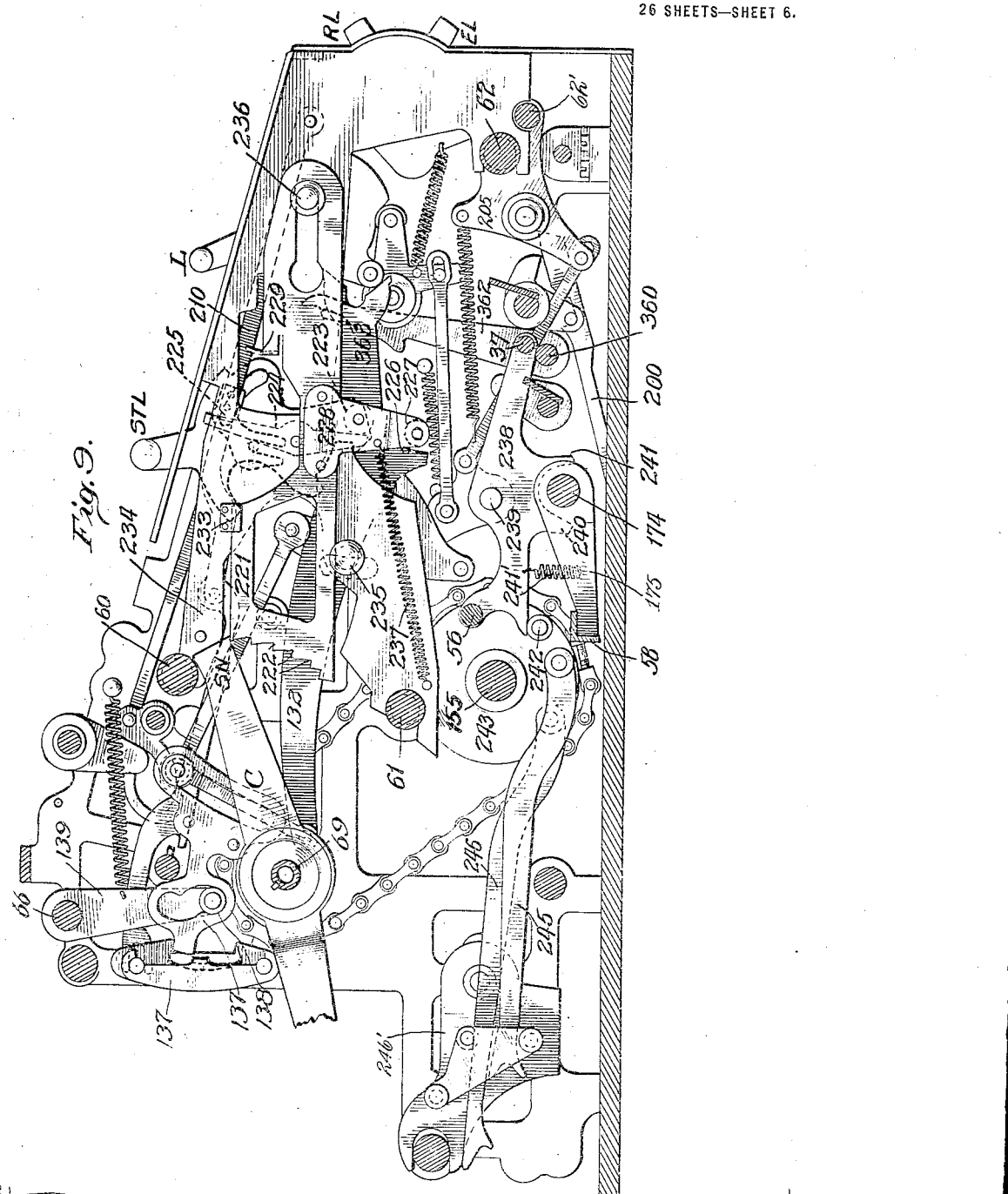

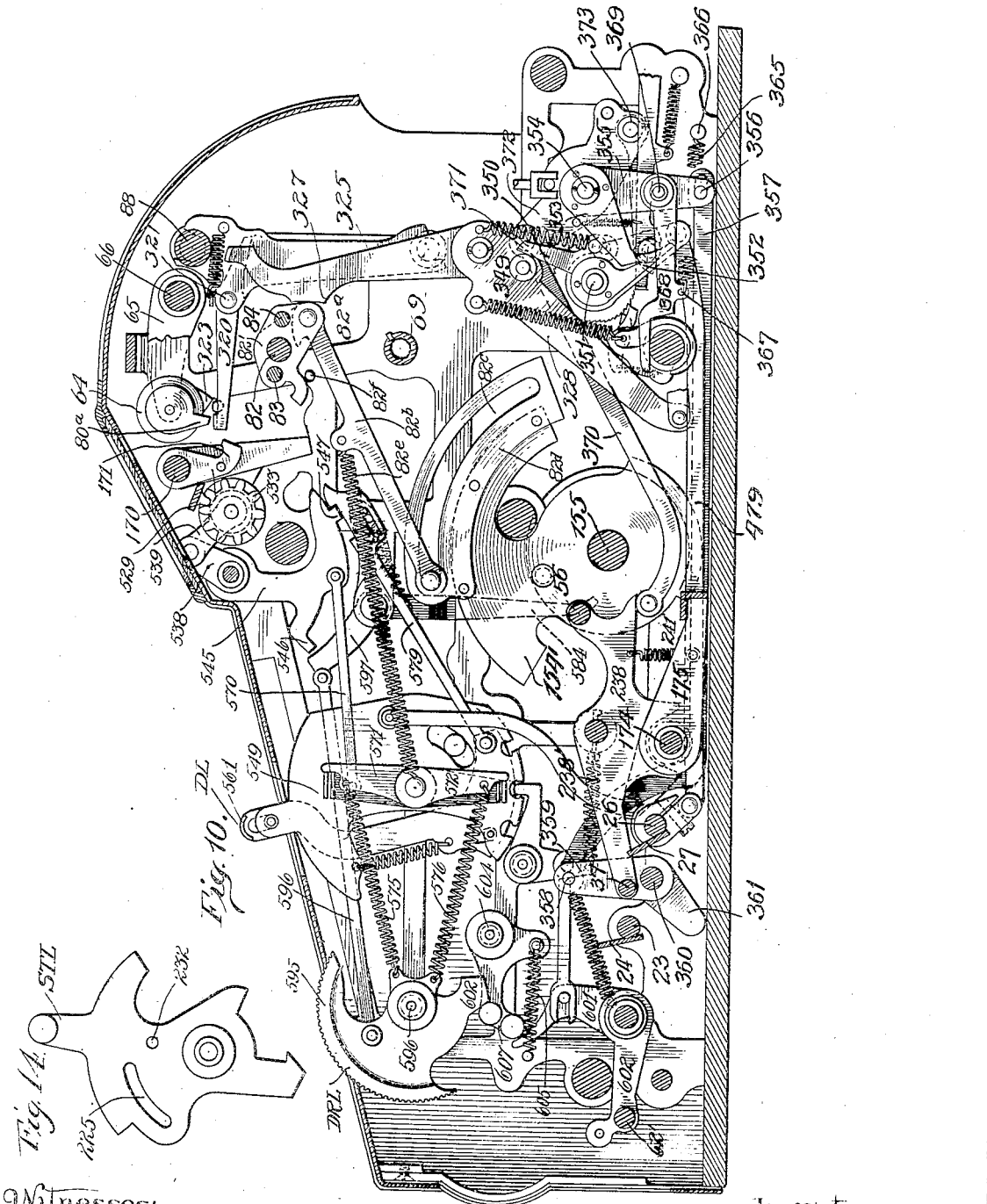

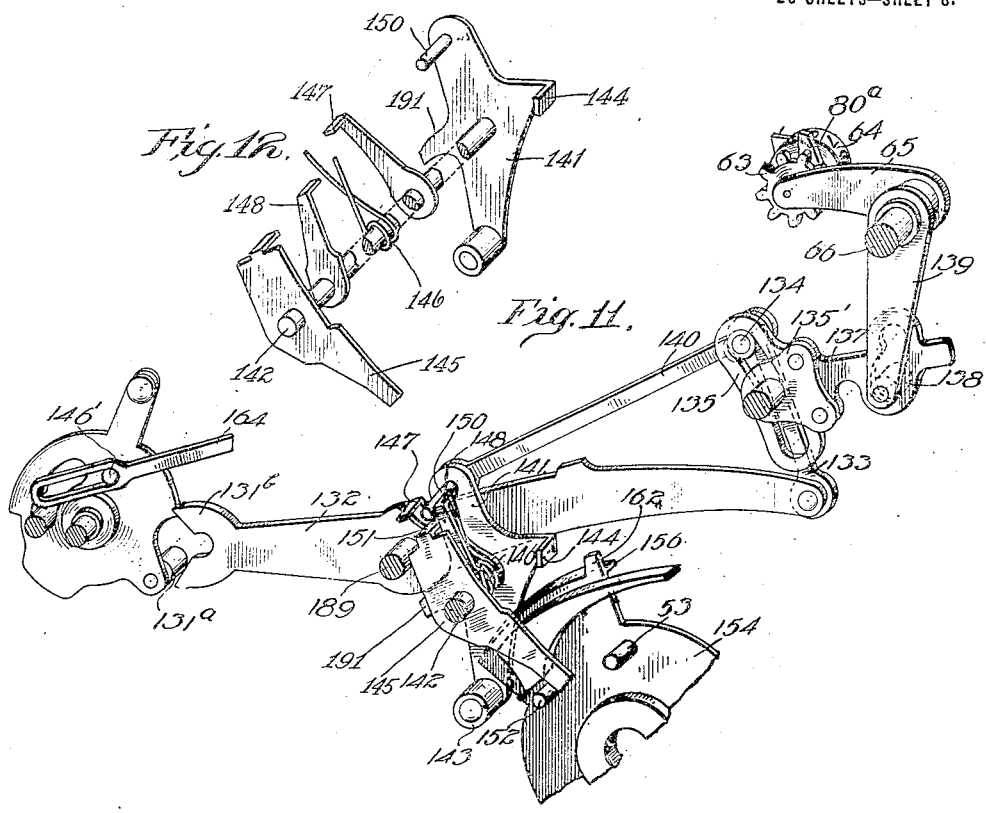

M. TEETOR.
CALCULATING MACHINE.
APPLICATION FILED APR. 18, 1914. RENEWED NOV. 24, 1919.
1,371,526.
Patented Mar. 15, 1921.
26 SHEETS—SHEET 9.
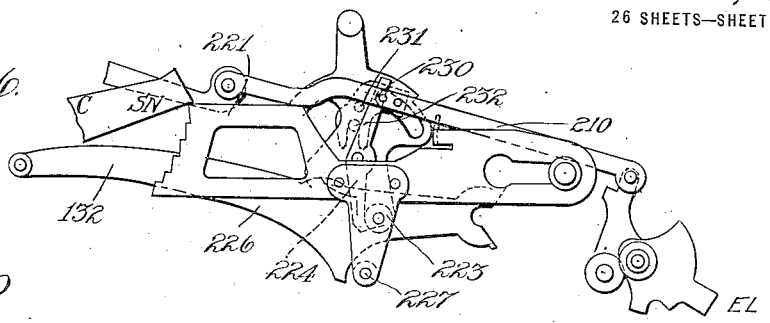
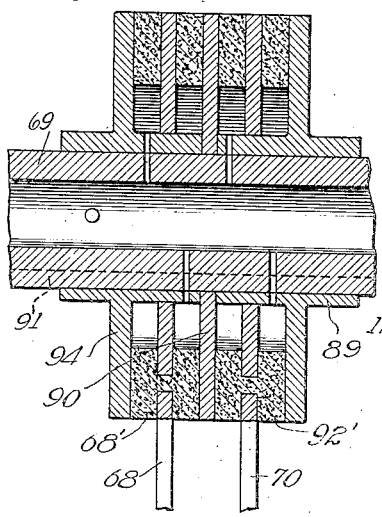
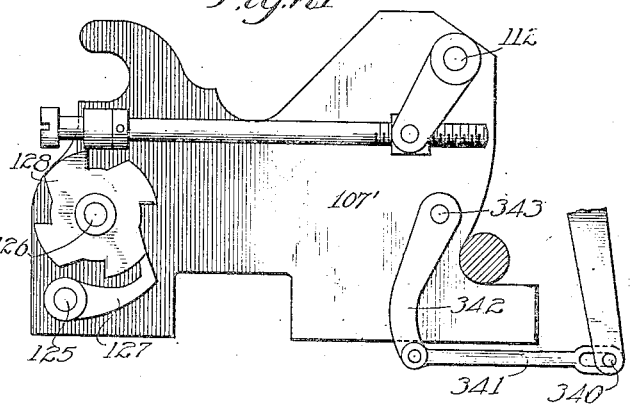
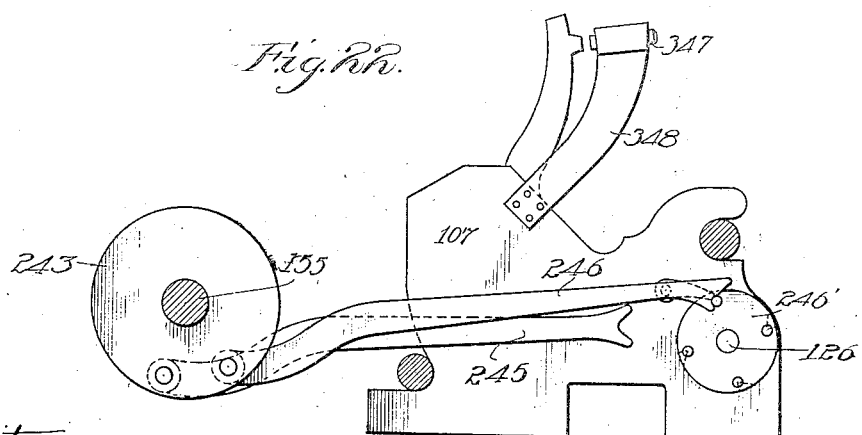

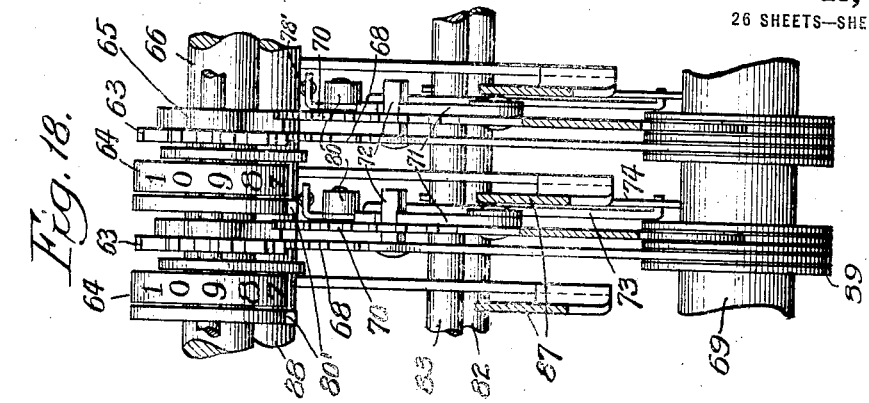

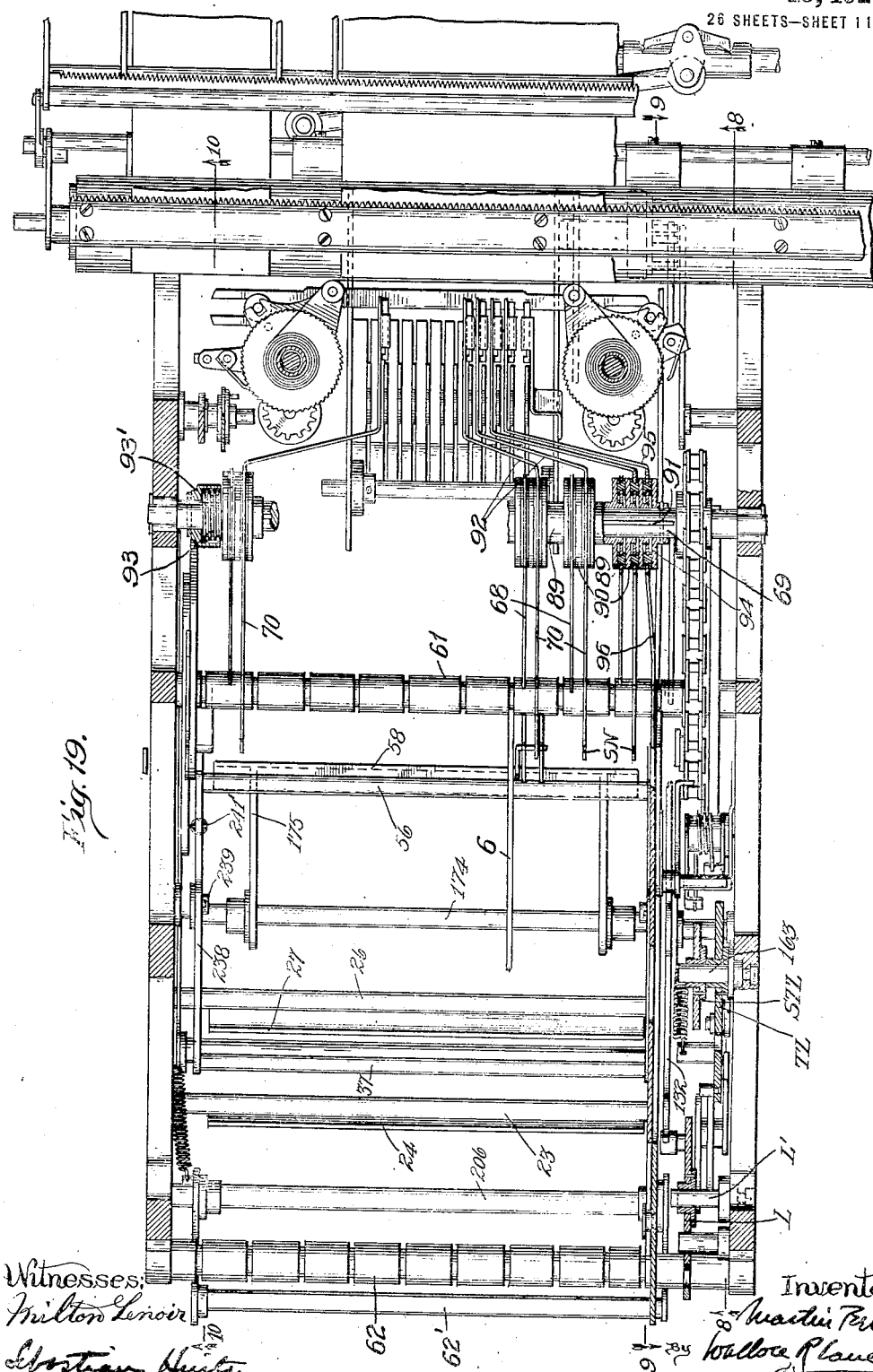

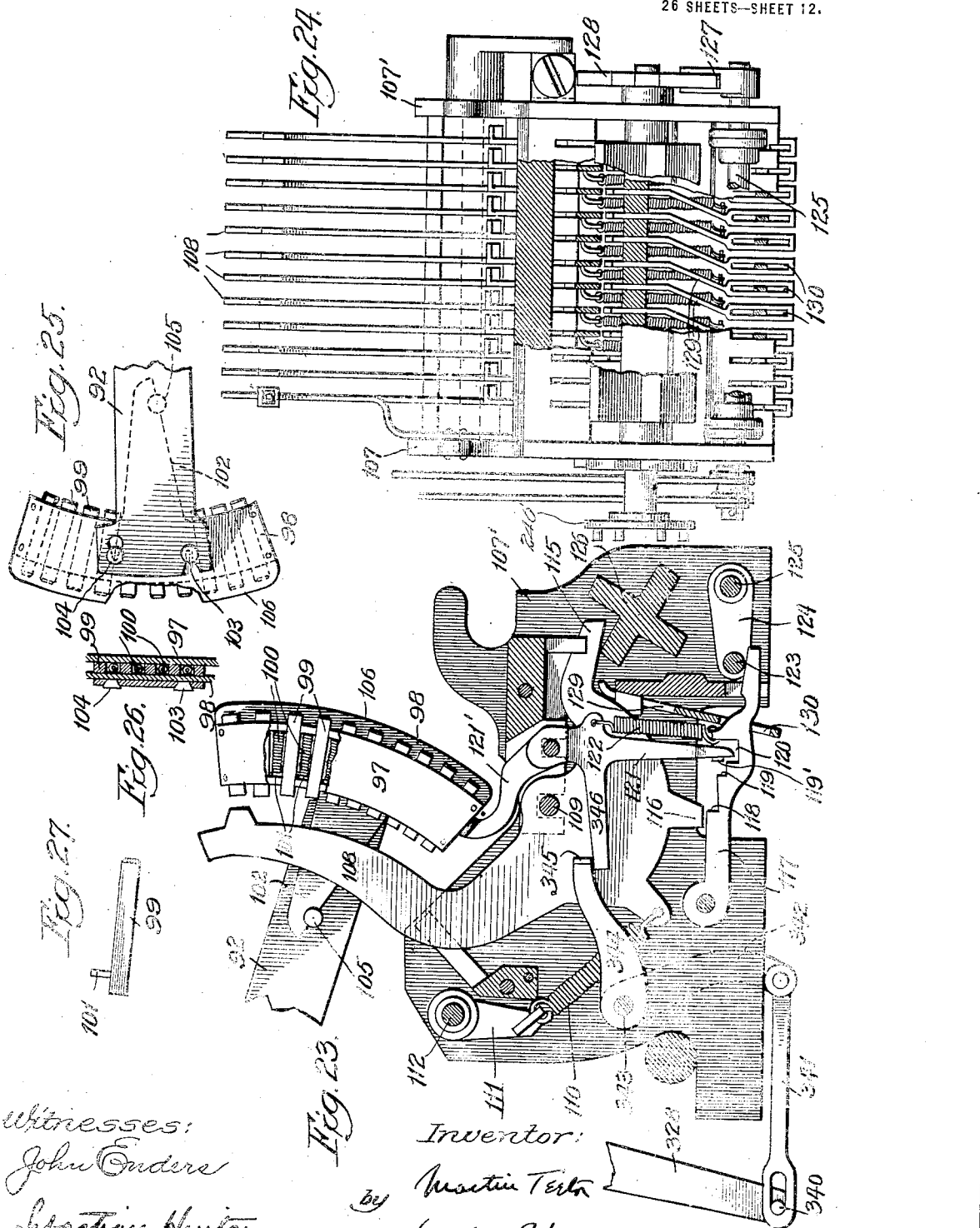

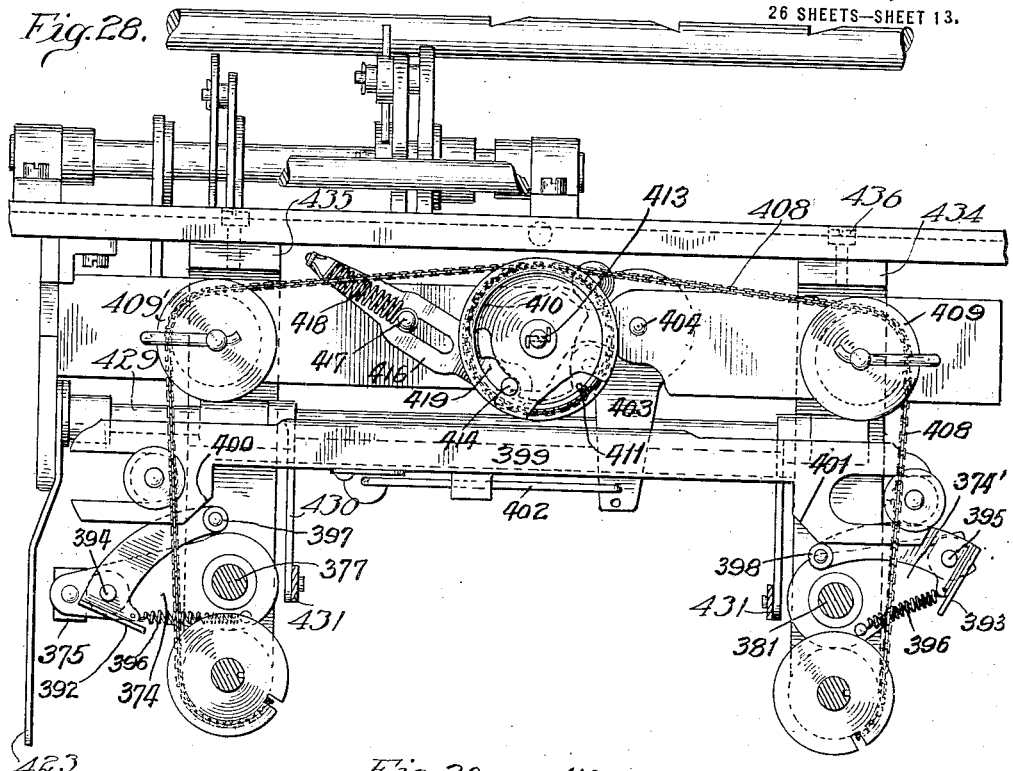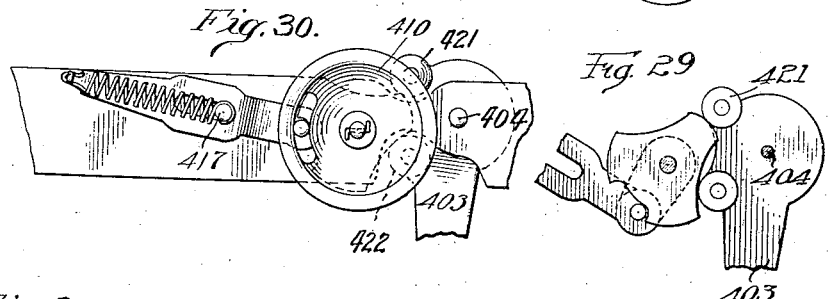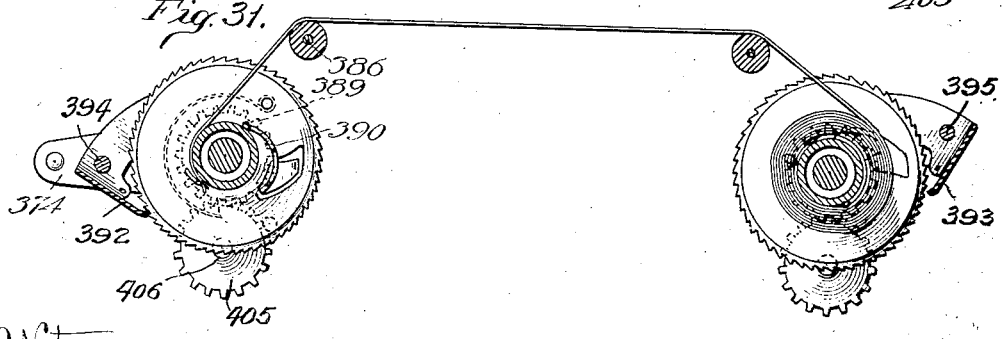

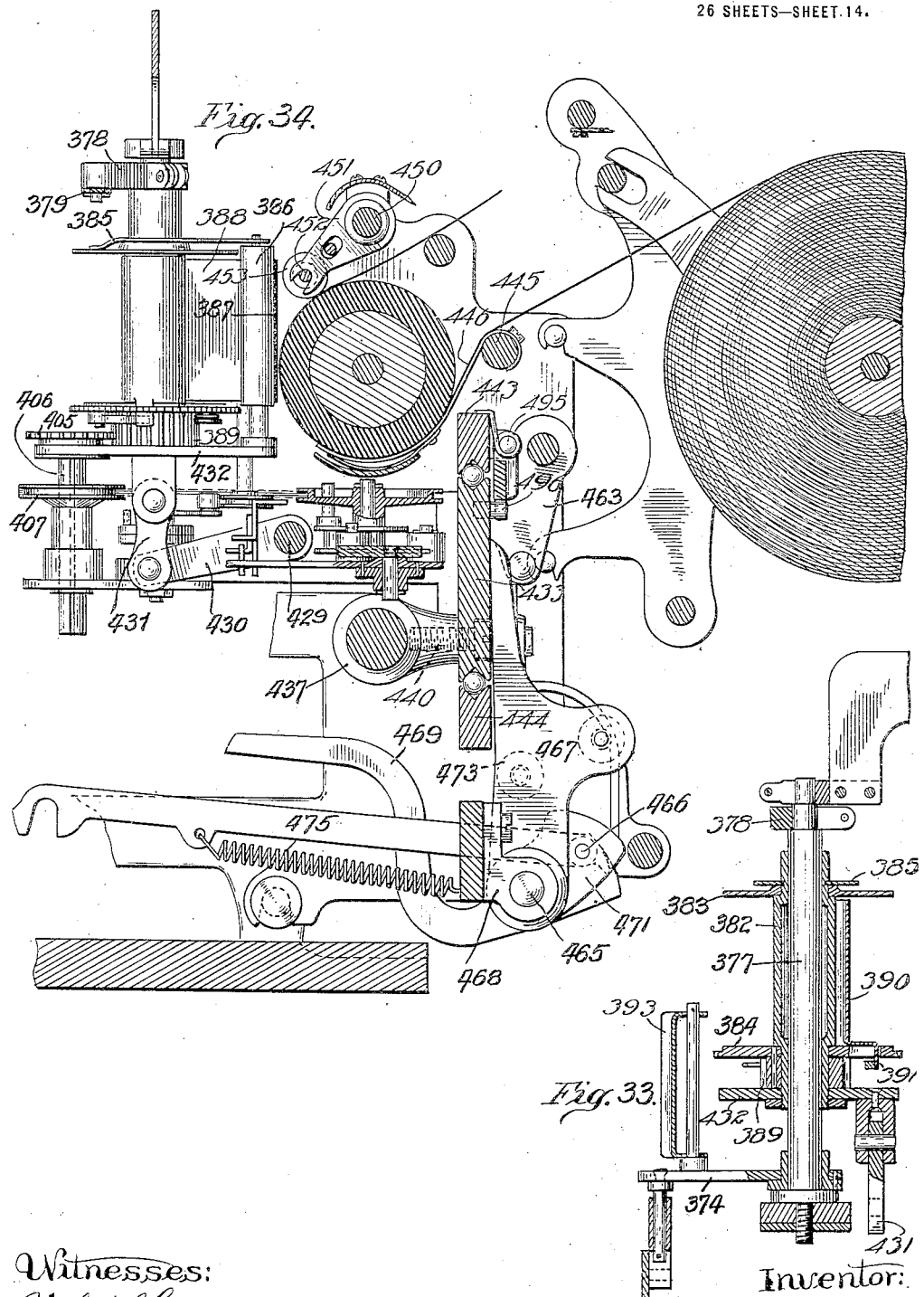

M. TEETOR.
CALCULATING MACHINE.
APPLICATION FILED APR. 18, 1914. RENEWED NOV. 24, 1919.
1,371,526.
Patented Mar. 15, 1921.
26 SHEETS—SHEET 16.
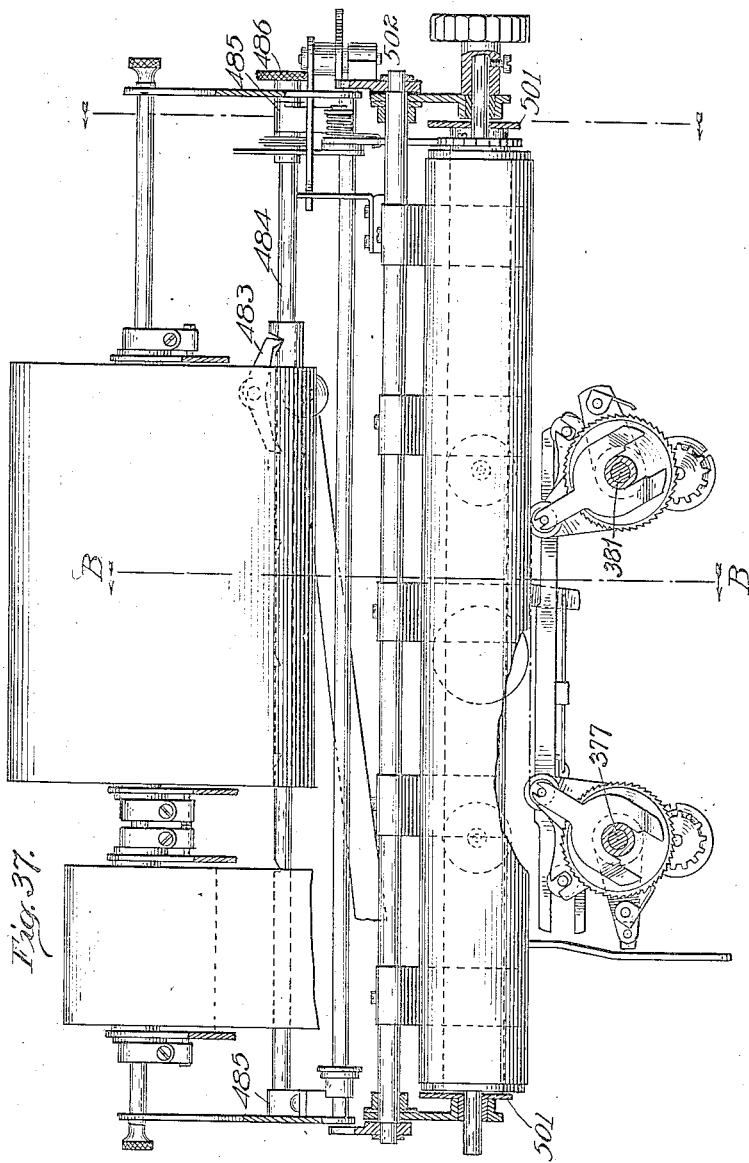
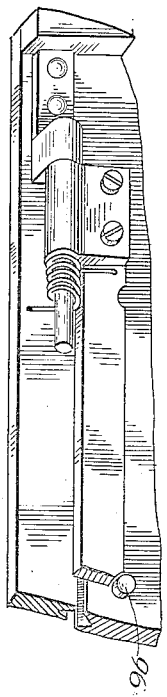
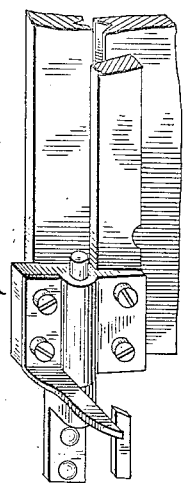

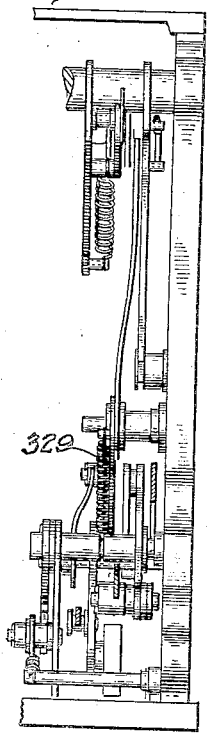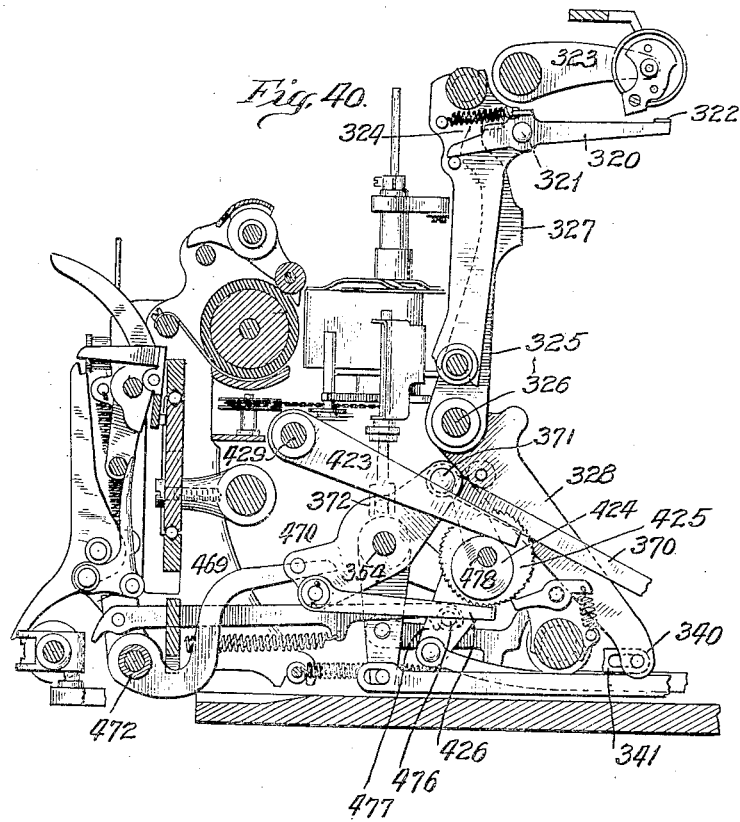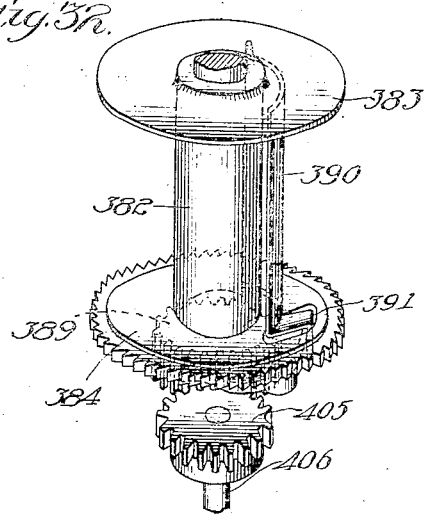

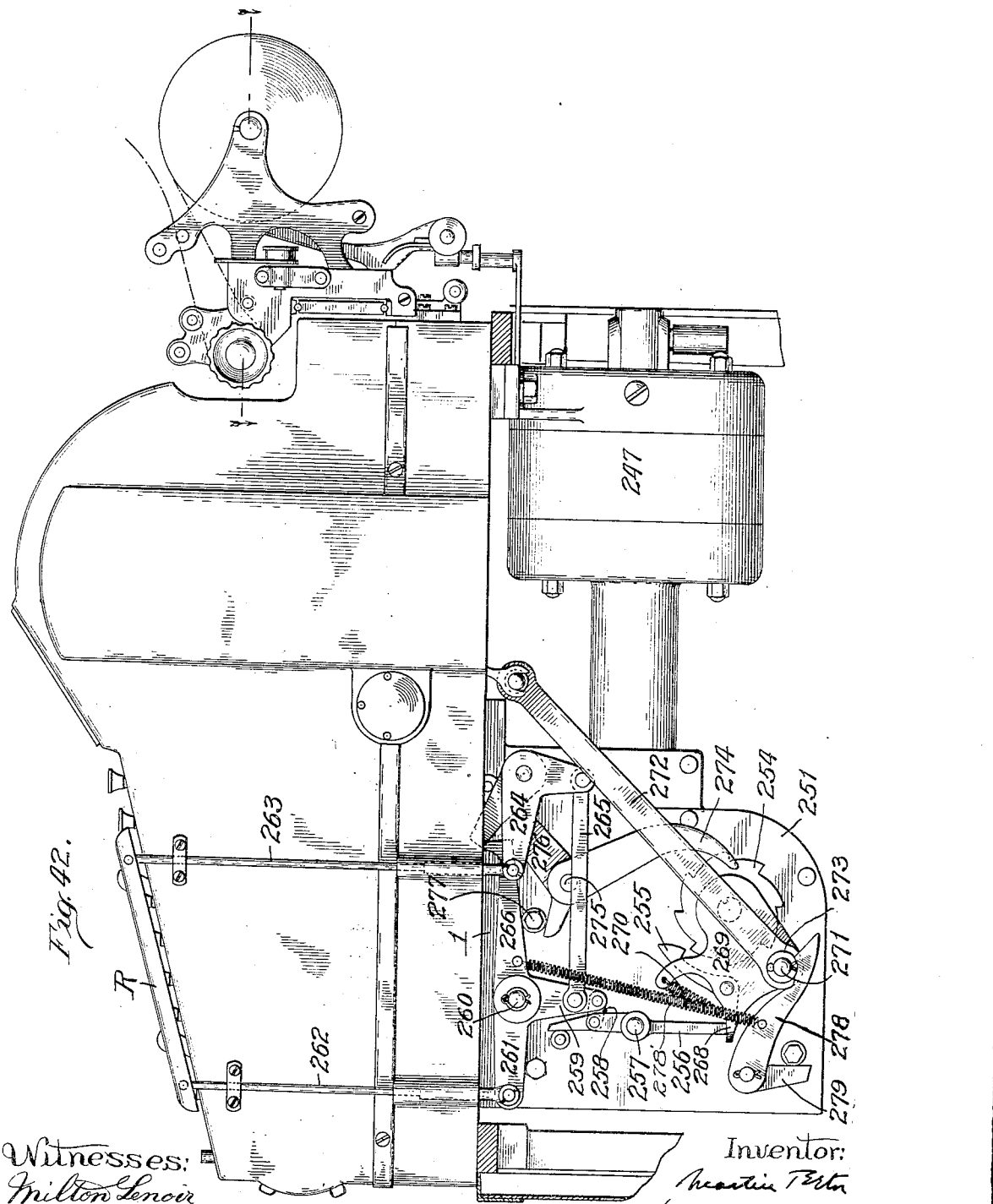

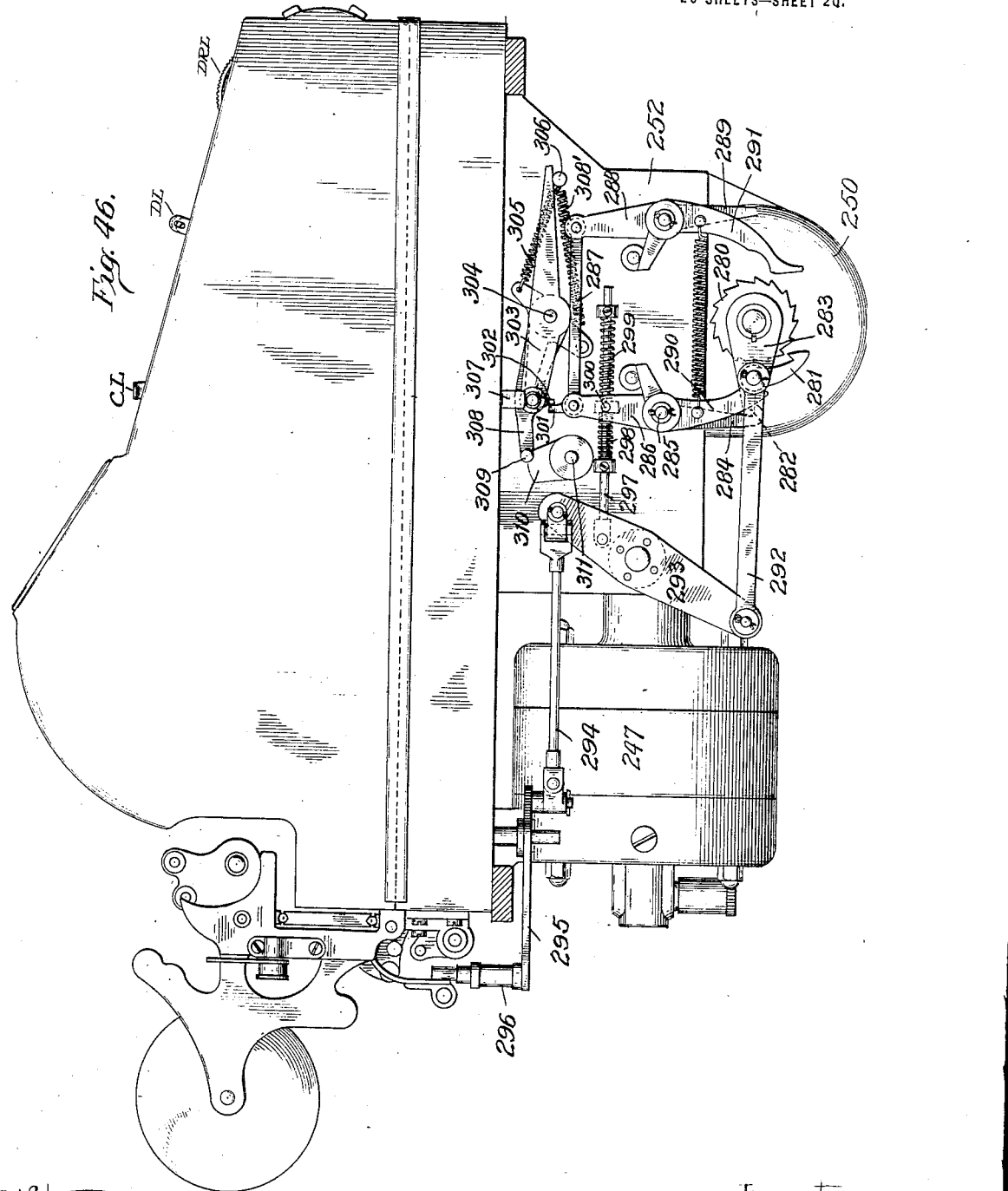

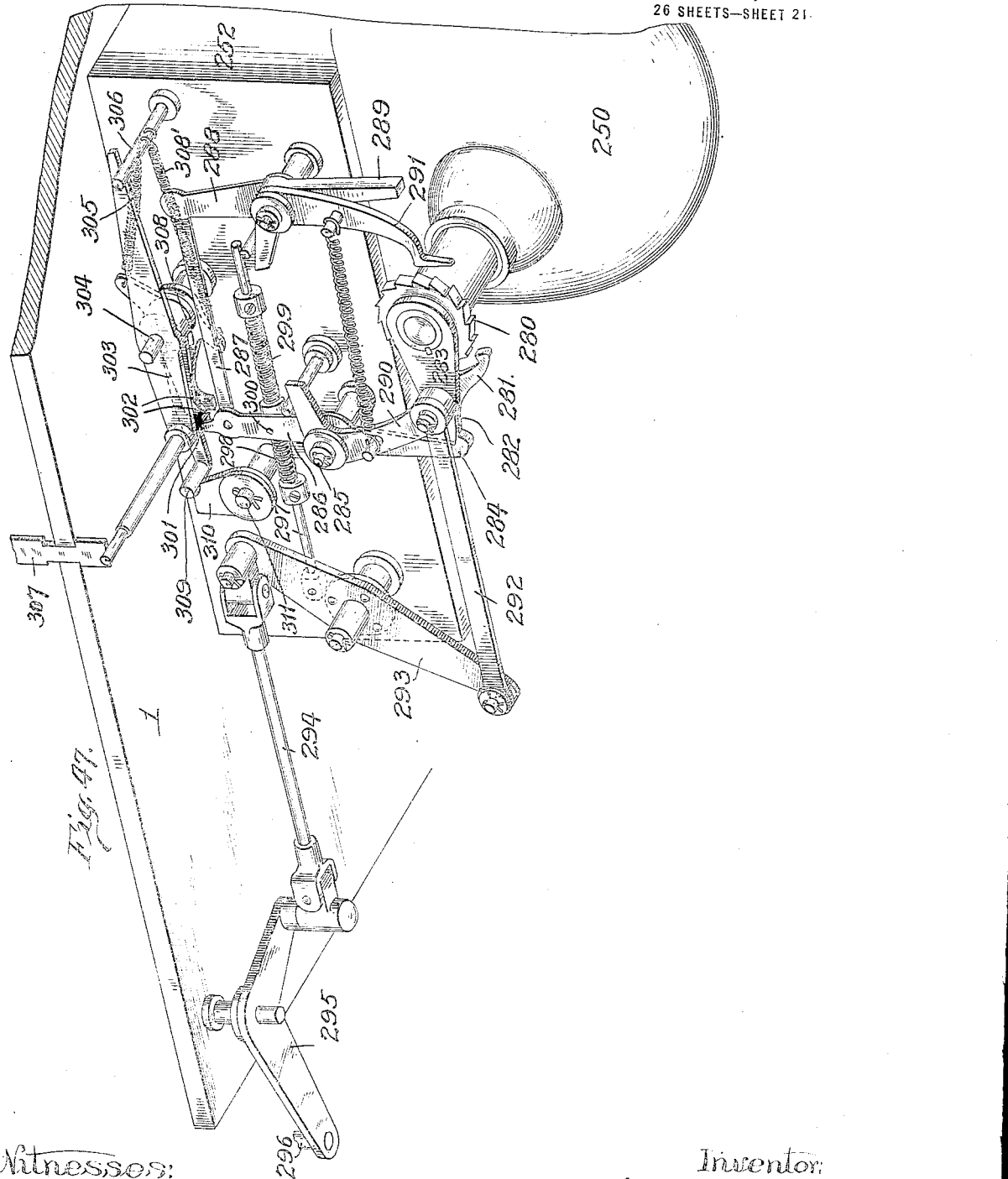

M. TEETOR.
CALCULATING MACHINE.
APPLICATION FILED APR. 18, 1914. RENEWED NOV. 24, 1919.
1,371,526.
Patented Mar. 15, 1921.
26 SHEETS—SHEET 22.
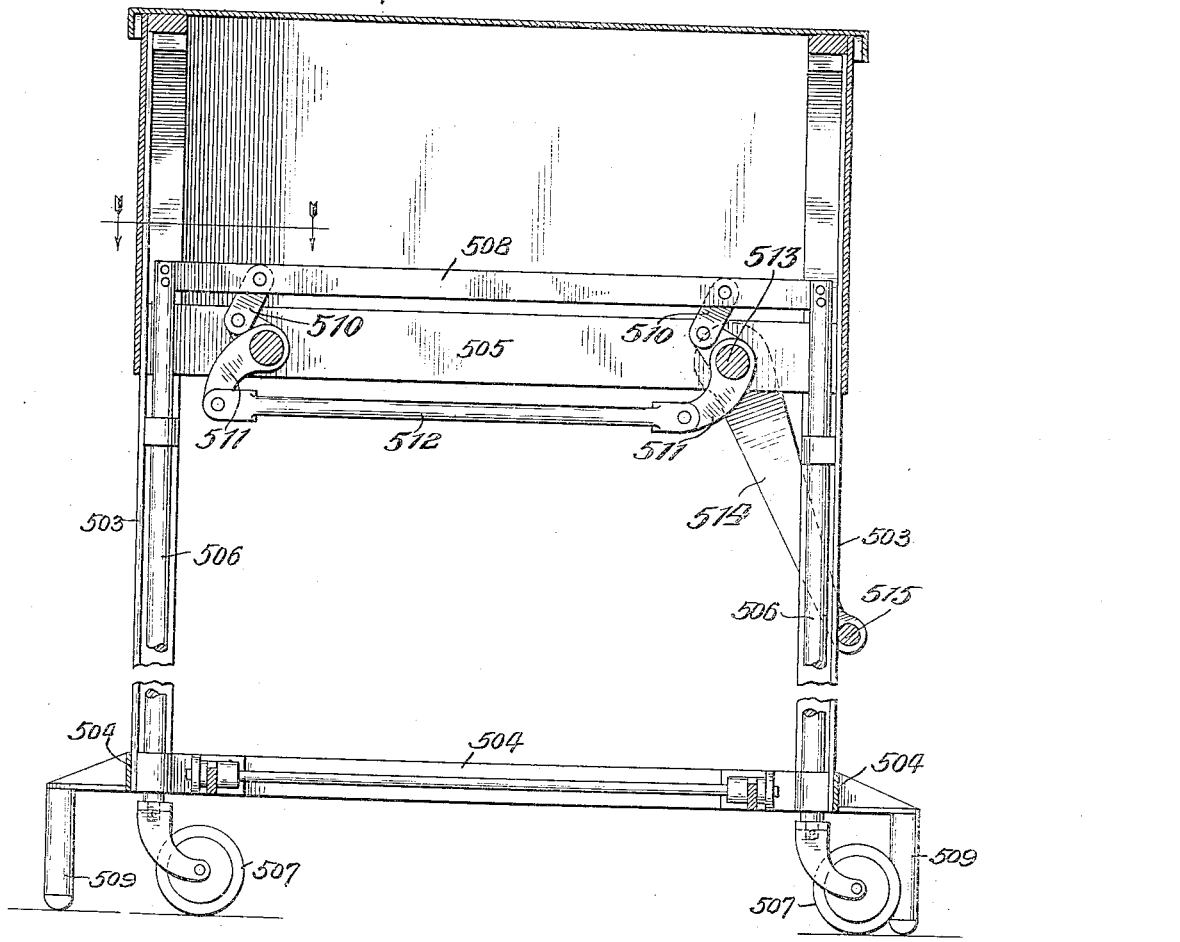
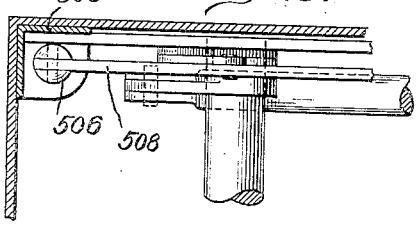

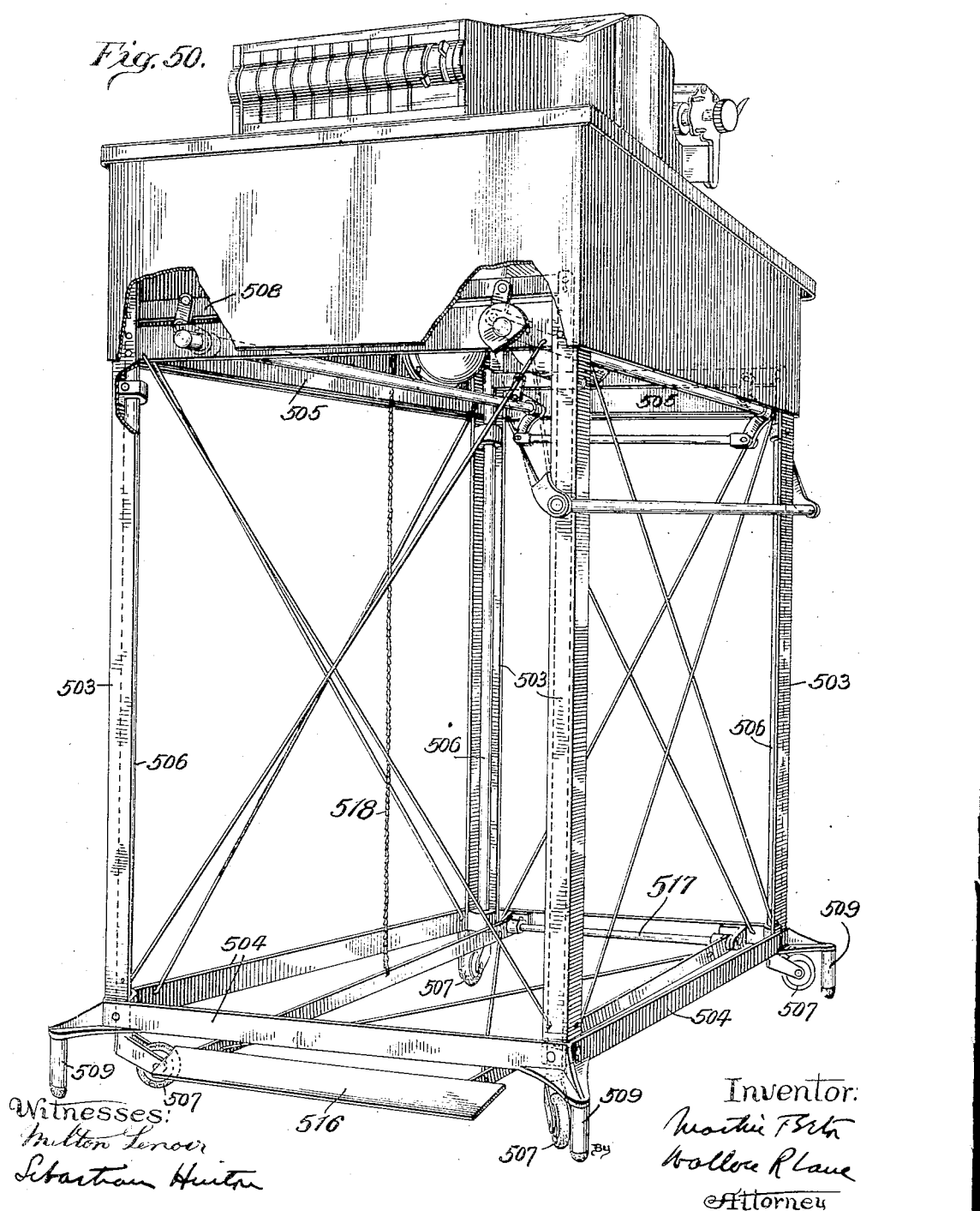

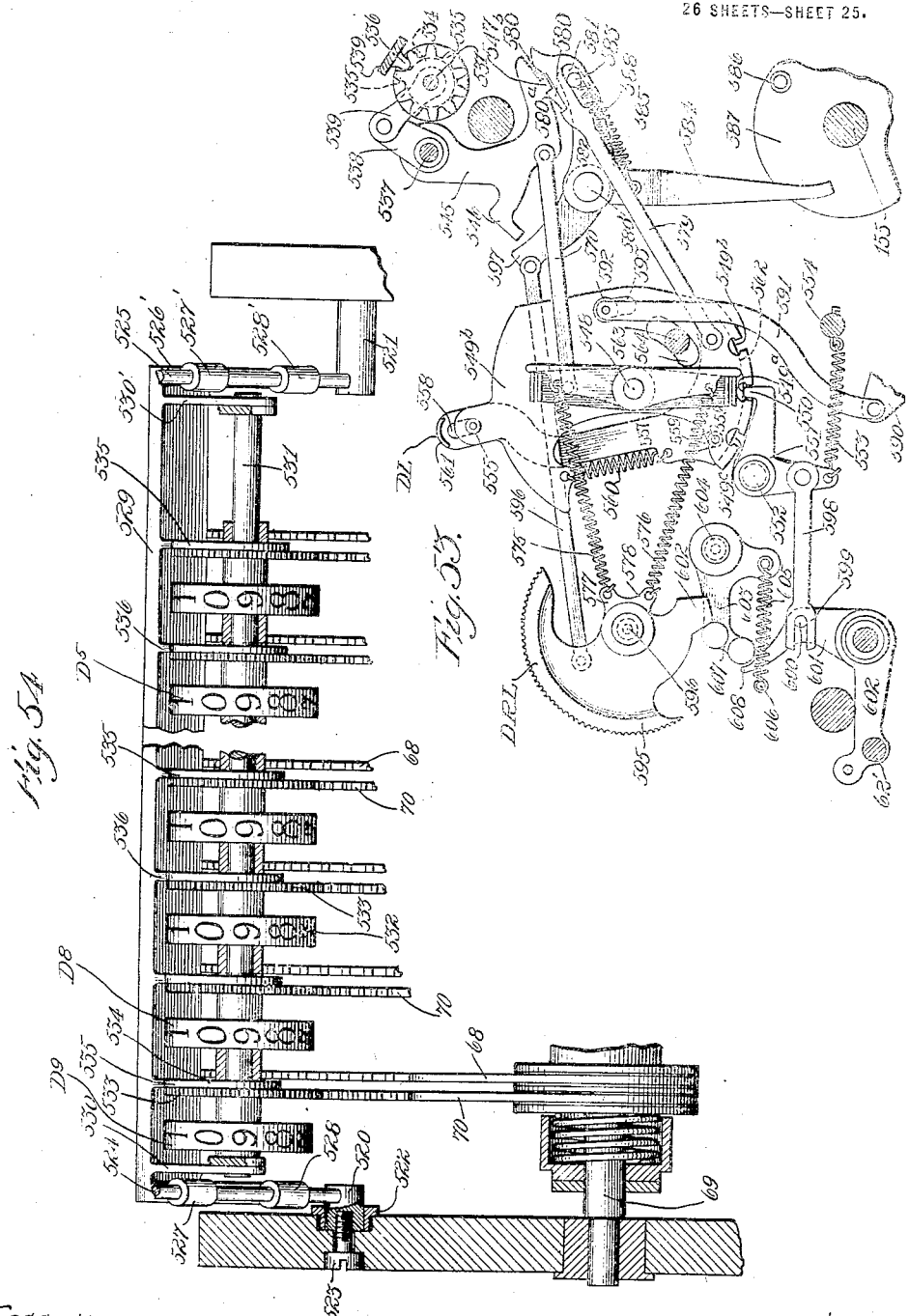

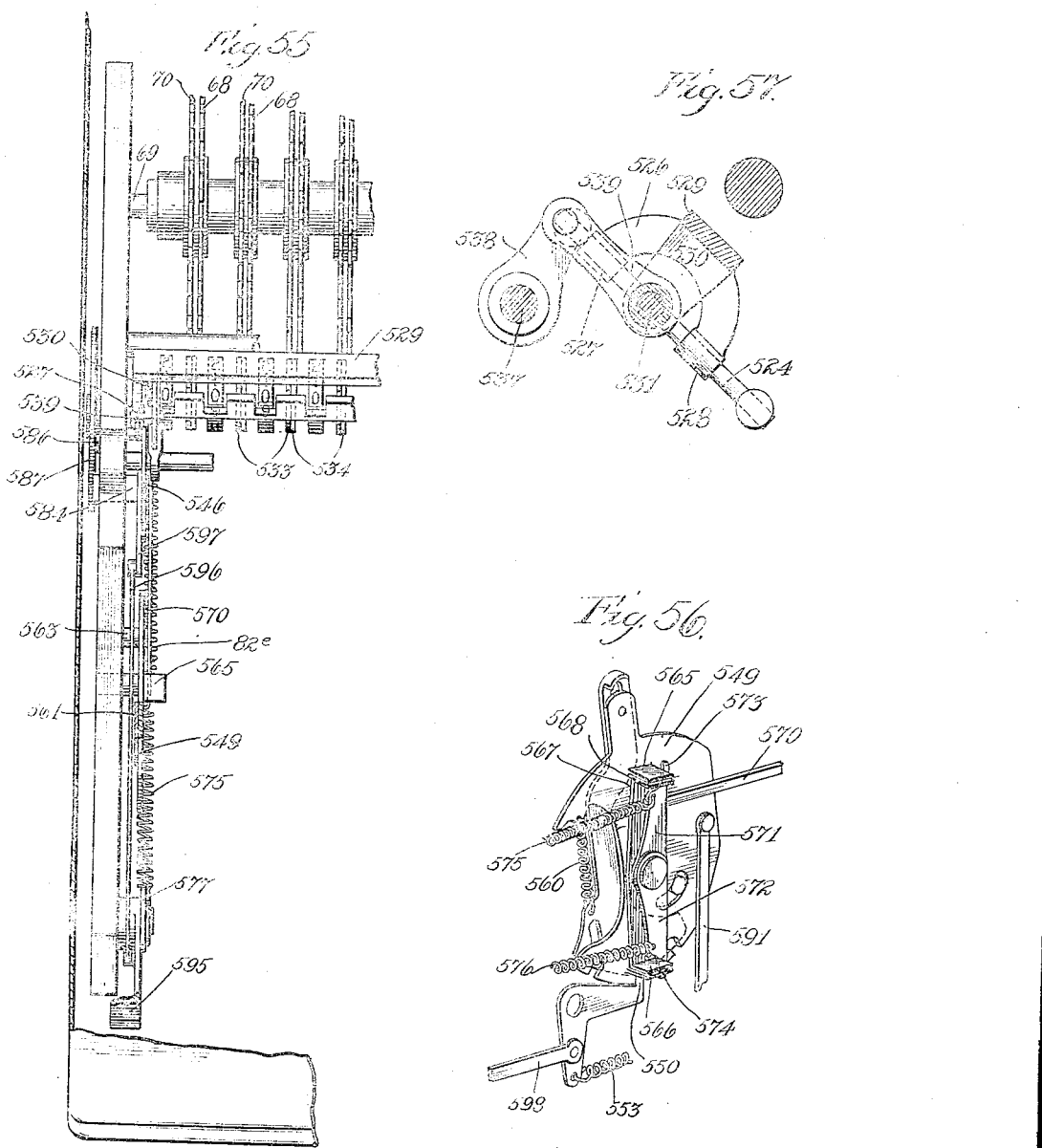

UNITED STATES PATENT OFFICE.

MARTIN TEETOR, OF DES MOINES, IOWA, ASSIGNOR TO TEETOR COMPANY, OF DES MOINES, IOWA, A CORPORATION OF IOWA.

CALCULATING-MACHINE.

1,371,526. Specification of Letters Patent. Patented Mar. 15, 1921.

Application filed April 18, 1914, Serial No. 832,924. Renewed November 24, 1919. Serial No. 340,289.

*To all whom it may concern:*

Be it known that I, MARTIN TEETOR, a citizen of the United States, residing at Des Moines, in the county of Polk and State of Iowa, have invented new and useful Improvements in Calculating-Machines, of which the following is a specification.

My present invention includes many improvements in calculating machines, and effects some results not heretofore attainable and also effects some old results in a new and easier way and embraces many details of construction and advantageous arrangements of the several parts, new in this art, and coöperating to bring about the desired action of the mechanism as a whole.

A specific embodiment of the present invention is shown in the drawings and is described in detail in this specification. Some of the advantages will be pointed out in detail and others inherent in the construction will become apparent after comparison of the improvements here disclosed with other machines in this art.

Among the more salient features of novelty included in the present invention, mention may be be made of the following:

1. A key-board built up out of sections, anyone of which may be removed from the machine easily without disturbing the others and all of which may be made up of a standard size and as interchangeable elements and may be assembled in any one machine or transferred from one machine to another as desired. This results in an economy of manufacture and special convenience in assembly, more particularly in making up machines which are in some respects special or differing from standard. Also in the matter of equalizing the wear on different parts of the key-board or in shifting one section over to take the place of another, this feature is of extreme convenience and utility. With standard key-board sections on hand, machines of large or small capacity can be erected on short notice.

2. A rock shaft extending through the machine and carrying type bearing arms frictionally supported on and provided with an improved slip joint connection with this rock shaft so that they will swing with it as the rock shaft turns, but may be stopped at predetermined points in their travel to correspond with the set-up on the key-board of the machine, and affords a novel coaction with a rack arm also frictionally mounted on the rock shaft. This brings the appropriate printing type in position for making impressions on the paper or permanent record sheet at the rear of the machine. This affords a rigid and non-vibrating support for the type and also serves automatically to aline the swinging members, thereby obviating the use of guide fingers or combs.

3. A simplified arrangement of calculating wheels, and means regulated in movement by the set-up of the key-board to rotate these wheels, either forward or back as the case may be, to add or subtract items set up on the key-board, the rotation of these wheels being governed by improved mechanism carried by the rock shaft and having a novel arrangement of parts for "carrying over" or transferring from one wheel to the next, as the total within the machine increases or decreases in size in accordance with the items for subtraction or addition, set up on the key-board. The transfer mechanism is sectionalized and offers many advantages for commercial manufacture.

4. A printing mechanism having removable type heads or type carriers with a ribbon guard and having positive, double acting hammers and novel means for working and controlling the hammers, this printing mechanism having novel means for printing explanatory characters after the numerals printed on the paper, and thus representing something other than numbers to be added or subtracted, as for instance, invoice numbers or car numbers. The complete hammer section of the printing mechanism is so arranged with respect to the other elements of the machine that it can be quickly removed as a unit for inspection or repair.

5. Improved elements associated with the calculating wheels, whereby a total which has been recorded by the printing mechanism may either be retained in the calculating wheels or cleared therefrom as desired.

6. An improved carriage mechanism mounted at the rear of the machine and easily detachable as a unit, this carriage mechanism having improved ribbon shifting means, improved platen shifting means and being connected up for control from the front of the machine so that it may be shifted longitudinally to print in either of two or more columns, as desired, this sliding or shifting carriage being power driven and positive in its action in either direction. The shifting of the carriage is of especial value in making up statements and bank balances or any records where debits and credits are to be compared, for the sliding movement can be governed for either position or retained at any position (to correct errors) by suitable manipulation of control mechanism at the key-board.

7. A locking mechanism to prevent the taking of a total when the machine has been operated below its normal (as in the case of over draft) or is operating nearly up to its full capacity. This prevents the machine from giving an erroneous total where the calculations have over run the machine in either direction.

8. Improved driving means whereby an electric motor or its equivalent may be thrown into driving relation with the machine at the will of the operator and may be used not only to swing the rock shaft with its load of type bearing levers and associated elements for actuating the calculating wheels, but also serves to shift the platen in either direction in case of two column printing. The driving connection between the motor and the driven parts is unusually direct, the normal speed of the motor being utilized to govern the normal speed of the machine as a whole, and the machine as a whole being relatively free from dash-pots, springs and similar protecting devices heretofore found very desirable and even necessary. The clutch mechanism whereby driving connection is established or interrupted between the motor and the calculator is of novel construction and particularly designed to give an easy start for the motor and a cushioned stop for the shifting carriage.

The above enumerated features and advantages of my invention are by no means the only ones, and others will become apparent from the following detailed description, and will be readily understood as inherent in the construction shown and will be appreciated by those familiar with the construction and mode of operation of machines of this general class.

In so far as it relates to the common subject-matter disclosed, this application is a continuation of application Serial Number 427,999, filed April 20, 1908, and application Serial Number 612,127, filed March 3, 1911, it being my express intention to prosecute in this application claims broad enough to read upon its disclosure and that of either of said two prior filed applications.

In the accompanying drawings, which form a part of this specification—

Fig. 2 is a transverse section through the key-board and accumulating mechanism showing the hammer section in side elevation and omitting most of the platen, carriage and ribbon shift.

Fig. 3 shows one of the key-board sections on a larger scale, many of the keys and associated parts being omitted to simplify the figure.

Fig. 4 is a detail of the swinging stirrup and saddle which establish connection between each key-stem and its stop-wire.

Fig. 5 is a transverse section through one of the key-supporting plates illustrating particularly the elements associated with the key-stem.

Fig. 6 is a perspective illustration of the mechanism used to control the zero stop wire.

Fig. 7 is a horizontal section taken through the structure of Fig. 3 just above the sliding plate 20.

Fig. 8 is a longitudinal section through the machine just inside the right hand side plate and shows particularly the control elements whereby the various operations of which the machine is capable, are determined.

Fig. 9 is a view looking in the opposite direction, the section being taken just inside of the control mechanism and between that mechanism and the first key-board section.

Fig. 10 shows the controlling elements positioned at the left hand side of the machine.

Fig. 11 is a perspective view of the lever L and the reversing gear governed thereby, whereby the machine is shifted over from an adding machine to a subtracting machine.

Fig. 12 is a detail of the tension device appearing at the center of Fig. 11 and whereby the in and out snapping of the pinions is determined.

Fig. 13 is a side elevation of the eliminating lever including its connections running through to coöperate with some of the parts shown in Fig. 11 to hold the accumulator out of action while permitting the printing device to record an invoice number or the like.

Fig. 14 is a detail of the sub-total lever.

Fig. 15 shows the connections between the sub-total lever and the total lever.

Fig. 16 shows how the total lever is connected up with the sliding notched plate whereby the identifying character to be printed on the record at the side of the numbers, is determined.

Fig. 17 is a side elevation of one section of the accumulator, illustrating the latching device which governs the slip between the stop-nose and its rack and thus controls the transferring or carrying over from one section to the next.

Fig. 18 is a front view of the structure shown in Fig. 17 partly in section and viewed in the direction indicated by the arrows Fig. 17.

Fig. 19 is a horizontal section showing in plan the main rock shaft and the swinging type arms, and also certain of the other parts.

Fig. 20 is a sectional detail of the slip joint whereby the stop noses and the swinging racks are slung from the main rock shaft.

Fig. 21 is an elevation of one of the side plates hammer section, and

Fig. 22 shows the other side of that section.

Fig. 23 is a transverse section illustrating the hammers and their relation to the printing heads and showing the means whereby the hammers are actuated or are locked against action.

Fig. 24 is a rear view of the hammer section, certain parts being broken away to show how one hammer may be made to carry across to the next when zeros are to be printed in after a numeral.

Fig. 25 illustrates the detachable printing head with its side plate forming a ribbon guard.

Fig. 26 is a detail of the type head showing the type and their respective springs in section.

Fig. 27 is a perspective view of one of the type showing the pin used for engagement with its controlling spring.

Fig. 28 is a plan view partly in section of the ribbon carrier.

Figs. 29 and 30 are details of the cam mechanism utilized in reversing the direction in which the spools rotate to shift the ribbon.

Fig. 31 is a transverse section through the ribbon drums illustrating the swinging flaps used for starting the gears to shift the cam of Fig. 29 when the direction of a ribbon movement is to be altered.

Fig. 32 is a perspective view of one of the ribbon spools and its associated parts.

Fig. 33 is a vertical section through a ribbon spool showing in section the plate used as a dog to rotate that spool and also illustrating the toggle mechanism whereby the spool may be raised and lowered to shift the ribbon vertically and thus equalize the wear thereon.

Fig. 34 shows one of the ribbon spools in elevation and the platen carriage in section and is taken along the line B—B of Fig. 37.

Fig. 37 is a plan view of the detachable platen carriage showing the relative positions of the ribbon carrier, the platen and rolls of paper.

Figs. 38 and 39 illustrate the locking plate whereby the platen carriage may be locked against longitudinal movement as when all the numerals are printed in a single column.

Fig. 40 shows the over-draft control mechanism and also the control mechanism for the ribbon shift and for the platen feed, these elements being located in the rear left hand corner of the machine and being shown in Fig. 40 as looking toward the right.

Fig. 41 shows some of the parts of Fig. 40 as viewed from the rear of the machine.

Fig. 42 illustrates the motor control at the right hand side of the machine and particularly the clutch mechanism, whereby the continuously rotating motor may be connected in to actuate the main drive shaft of the machine.

Fig. 46 shows the clutch mechanism on the left hand side of the machine, whereby connection is established between the continuously rotating motor and the carriage, so that the carriage may be shifted from side to side to print added items in one column and subtracted items in another and to otherwise regulate the shifting movement of the platen carriage.

Fig. 47 is a perspective view of the clutch mechanism of Fig. 46.

Fig. 48 shows in section the adjustable stand whereon all the operating parts are carried and illustrates particularly the vertical adjustment whereby the weight may be transferred from casters to stationary feet.

Fig. 49 is a detail of the toggle connection for shifting the weight from the casters to the feet.

Fig. 50 is a perspective view of the complete machine mounted on its stand, parts being broken away to show the toggle connection whereby the operator in pulling up on the handle or rail at the side of the machine, can transfer the weight to the casters and is thus able to trundle the machine from place to place.

Fig. 53 is a side elevation on a reduced scale of the duplicator mechanism showing certain parts of the machine in section.

Fig. 54 is a partial front elevation of the same partly in section.

Fig. 55 is a partial plan view of the same partly in section.

Fig. 56 is a perspective of the control plate and associated parts of the duplicator.

Fig. 57 is an elevation partly in section of the sliding table construction carrying the duplicator pinions.

General operation.

Fig. 1.

Before describing in detail the construction and operation of the various mechanisms which go to make up the complete machine, it may be profitable to set forth in general language, a statement of some of the various operations of which the machine is capable.

Figure 1:
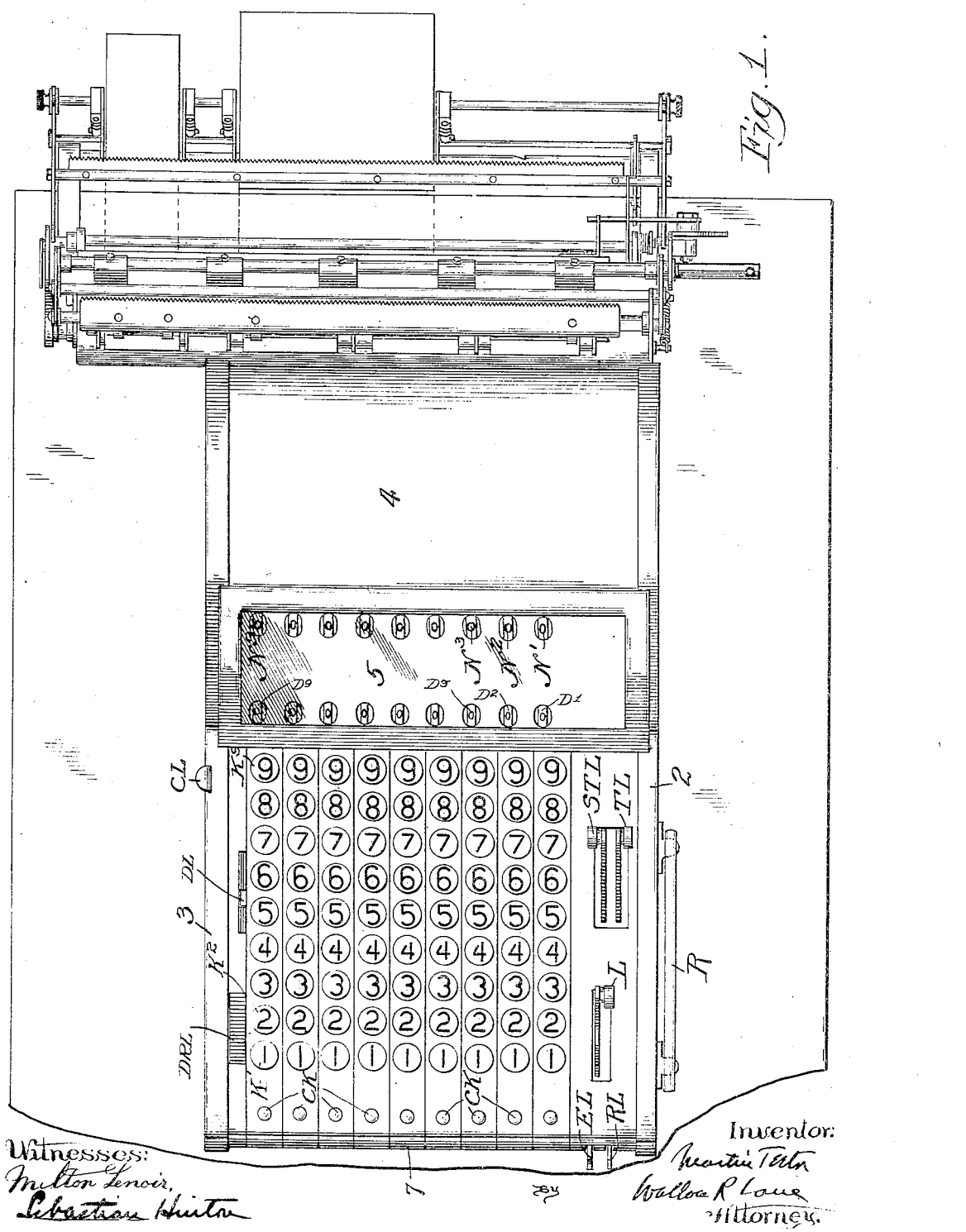
Figure 1 is a plan view of the machine, a portion of the supporting platform being broken away at the front to economize in space on the sheet.

Referring to Fig. 1 which is a plan view of the machine, it will be seen that the sectionalized key-board is in the usual position at the front of the machine and easily accessible to the hand of the operator. The carriage mechanism whereon the rolls or sheets of paper are supported, is at the back of the machine where it can be shifted either to the right or to the left, as occasion may require to print the items in one or more columns and to furnish a permanent record of the operations going on within the machine. Most of the control levers and similar devices are at the right hand of the machine, easily accessible to the hand which operates the keys, thereby making the machine essentially a one hand machine.

The keys of the sectionalized key-board are grouped in accordance with standard practice. Nine sets of keys are here shown, but it will be understood that more or less may be used if desired. These nine sections are numbered respectively $S_1$, $S_2$,—etc. to $S_9$. When any one of these nine sections is removed from the key-board, as for inspection or repair, it takes with it a portion of the internal mechanism of the machine, without, however, disturbing other sections or involving any material changes within the body of the machine.

Above the key-board is a window or series of windows at which numeral wheels $N_1$, $N_2$,—$N_9$, and preferably some distance below them the wheels $D_1$, $D_2$,—$D_9$, are visible, it being understood that the wheels $N_1$, etc. form part of the calculating mechanism and that the total in the calculating mechanism may, at any time, be read off them, while the wheels $D_1$, $D_2$,—$D_9$ are the duplicator wheels for retaining any number used in the calculations performed on the machine. The action of all these wheels may here be observed at all times, this being always a convenience to the operator and a necessity in some cases.

At the extreme right hand edge of the key-board is a rail R which may be called the tripping rail and which is so connected that the operator can touch it with the side of his hand without removing his fingers from the key-board. When this rail is touched, the driving motor is thrown into driving connection with the machine and turns it through one complete stroke, causing whatever operation may have been arranged for previously to be performed, or the tripper rail may be held down by the operator to repeat the operation, as when the same number is to be repeatedly recorded.

Also at the right hand of the machine is a lever L which can be swung either rearwardly (away from the operator) or forwardly (toward the operator). In the rearward position it sets the machine for adding, and in the forward position it sets the machine for subtracting. For example when it is desired to enter a certain number in the machine in a positive or adding direction, the lever L is thrown rearwardly as shown in Fig. 1, either before or after the setting up of the key-board and then the operator touches the rail R, tripping the clutch which connects the electric motor with the power shaft of the machine, and so rotating the calculator wheels to store up the number which had been set up on the key-board. Simultaneously, this number is printed on the paper roll or sheet at the rear of the machine, the platen is shifted to advance the paper, and as a part of the operation, the printing ribbon is shifted to present a fresh surface and other incidental operations are automatically carried through.

A second item set up on the key-board may in similar manner be carried through to the numeral wheels, which by their rotaton will add the number to the amount already indicated by the wheels, it being understood that this second item will simultaneously be printed on the sheet of paper at the rear of the machine.

The printing and carriage mechanisms are normally always in operative relation so that any numbers set up on the key-board and transferred through to the numeral wheels will simultaneously be printed at the rear of the machine in such a way as to yield a permanent record of the operation.

Other items may be added in, one after the other, each item serving to rotate the numeral wheels still further and so building up the total as indicated by these wheels as they appear through the windows.

When it is desired to subtract an item from another or from the total of previous additions or subtractions, the control lever L is thrown forward or toward the operator, into the subtracting position, either before or after the number is set up on the key-board, whereupon the tripping of the rail R will again turn the machine over, but this time the numeral wheels will back up by an amount corresponding to the set-up on the key-board, thereby, in effect, mechanically subtracting the number thus set up. Of course when lever L is swung forward, certain changes are effected within the machine whereby this reversal in the direction of rotation of the numeral wheels is brought about, but those changes need not be discussed at this point.

The items to be subtracted are printed at the rear of the machine, but previous to that printing, the platen frame may be shifted over far enough to print the subtracted item in a separate column, so that added numbers are printed in one column, which may be called the adding column, and subtracted numbers are printed in an adjacent column, which may be called the subtracting column. However, it is possible with this machine to print both added and subtracted numbers in either the adding column or the subtracting column and this result is effected through manipulation of the carriage lock CL at the left hand side of the machine, it being the function of this lock to hold the carriage against movement so that if locked while alined for the adding column it will continue to rest in that column whether the items are being added or subtracted at the numeral wheels and similarly of course, if the carriage be locked in the subtracting position, all the items will be listed one after the other in the subtracting column even though some of them may be items actually added in at the numeral wheels.

At any time during the operation of the machine, it is possible to subtract out a number which has been added in by mistake (or similarly to add in a number subtracted by mistake) without allowing the carriage to shift over to the opposite column preparatory to making the correction, it being only necessary to throw the carriage lock CL and hold the carriage in the position which it had when the erroneous item was put into the machine.

In speaking of these columns as the adding column and subtracting column, it will be understood that this is but an arbitrary nomenclature and that a large value of the shifting carriage lies in the capacity of the machine for printing in one column the added items of an account and in another column the subtracted items and ultimately printing the difference between debits or credits instantly on the next following stroke and in the proper column. By putting the carriage in the proper column at the beginning, the added items may all be put in the right hand column and the subtracted items in the left, as in case of bank statements, or the added items may be on the left and the subtracted items on the right, as in the case of the ordinary mercantile statements. The carriage can be tripped over from one column to the other, preliminary to printing, by the operator, in several different ways, as for instance by merely snapping the total lever TL far enough to unlatch the carriage, but ordinarily it is controlled automatically by the forward or rearward swing of the lever L.

In order to definitely identify negative items, no matter whether they are printed in a column by themselves or mixed in with positive items, a suitable character or mark is printed at the side of the number, as for instance a minus sign, and this indicates that the particular entry is of negative character and was subtracted. The identifying character is printed in automatically whenever a negative entry is made, no manipulation of the machine on the part of the attendant being necessary.

Since the numeral wheels are actuated in a positive direction when the lever L is set for adding, and in the negative or reverse direction when the lever L is set for subtraction, it is obvious that the indications of the numeral wheels as they appear at the windows, will be, at any time, the arithmetic sum of the numbers entered into the machine, since its last clearing, and exclusive of any "eliminated numbers" to be described.

The machine is provided with a total taking lever TL which in its rear position, as shown in Fig. 1 is inactive and allows the machine to list the items, one by one as they are set up on the key-board. To take a total and to print the total on the record sheet, the operator pulls down the total lever TL, thereby shifting mechanism within the machine in such a way that the total as set up on the numeral wheels is backed out from those wheels when the machine is next turned over, thereby returning the wheels to their cipher positions, whereupon they shift out of mesh with their actuating racks and the racks are allowed to return to normal. This leaves all of the number wheels at their initial or zero position. This backing out or unreeling of the numeral wheels serves to set up the printing mechanism so that it will print the total amount backed out from the wheels. In other words, if the machine be turned over with the total lever TL forward or in its total-taking position, the operator clears the numeral wheels and simultaneously prints the total as shown by those wheels. To throw the machine into driving relation with its motor for printing this total, it is only necessary to trip the rail R exactly as if an item were being added or subtracted.

To retain the total in the machine (commonly called sub-totaling) the sub-total lever STL as well as the lever TL must be pulled down into their lowermost positions. These two levers are so locked that while TL can be pulled down without moving STL, it is not possible to pull STL down without its pulling TL with it. With STL and TL in their lowermost positions the machine, when turned over by tripping rail R, will back out the total from the numeral wheels, thereby setting up the printing mechanism to print that total, and then by retaining the wheels in mesh will again return them to their previous setting or in other words leave the machine with the total still in it.

In many machines it is considered necessary to lock the key-board or to lock the keys against movement when a total is to be taken, otherwise the machine may either print an erroneous total or be damaged. In the machine of my present invention the key-board is not locked and yet the total cannot be tampered with and the operation of taking that total does not endanger the mechanism. This result is brought about by swinging the stop wires of the key mechanism forward out of stopping position, through the instrumentality of a rock shaft connected through suitable connections with the total lever TL, so that when this lever is thrown forward into its total taking position, the stop wires are out of the path of the swinging elements within the machine. Although the keys are not locked against movement they are effectually isolated from the rest of the machine during total taking and none of them can have any effect on the total or interfere with the swinging elements.

It is sometimes convenient, and even necessary, to enter a number on the printed record without adding it in at the calculating wheels, as for instance when the number of a railway car or the number of an invoice or other identifying data is to be put in as explanatory of the real numbers to be added or subtracted. In order to cause the printing of such explanatory items without actuating the calculating wheels, there is provided at the front of the machine an eliminating lever EL which serves to eliminate or keep out of the calculating mechanism the explanatory numbers which are to be printed on the permanent record. With the lever EL in its lower position, it is in its normal or inactive position, and when raised, it is in position to compel the entry on the printed record of the number set up on the key-board without allowing that set up to act on the calculator wheels. When such an explanatory or identifying number is printed on the record, there is also printed simultaneously and automatically an explanatory character in the nature of some special mark following the number, this character being sufficient to show that it is a box car number or the number of a bill of lading or something of that sort and is not one of the numbers added or subtracted by the calculator mechanism.

Repeating mechanism is also provided so that the same item can be entered several times in succession, without the necessity for setting up the key-board at each operation. This result is effected through use of a repeating lever RL at the front of the machine, Fig. 1, which when drawn down puts the machine in condition for repeating the number previously set up on the key-board. In a general way it may be said that this action is brought about by restraining the operation of the rocker normally used to clear the key-board. In other words it renders the key restoring means inoperative and leaves the keyboard set up for repetition as often as the machine is turned over.

At the front end of each of the sections of the key-board is a correction key CK which when depressed restores all of the keys to their raised position and clears out that particular section leaving it ready for a new impression. Thus when through error, the key-board has been set up with the wrong number, such of the digits as may be in error may be cleared out by depressing the correction key for their own sections of the key-board and thereupon the correct key manipulation may be made and the machine put in condition for turning over to print the corrected number and adding or subtracting at the calculator wheels. As a short cut to extensive corrections of this character, the total lever TL may be swung down and back thereby clearing the entire key-board but without affecting the calculator wheels or printing the item.

When an operator steps up to the machine to use it, he first wants to know whether the machine has been cleared at the end of its previous operation. In other machines, it is ordinarily necessary to take a spacing stroke (to release the total mechanism) and then with the total button down to take a printing stroke so that if there is a total in the machine, it will be printed on the paper. If there is no total in the machine the imprint will show that the machine is clear. In the machine of my invention, on the contrary, it is possible to ascertain whether the machine is clear without this spacing stroke simply by glancing at the numeral wheels at the windows.

But if a permanent record is desired on the paper, the proceeding is as follows: If the machine has been left in its total taking adjustment, with the lever TL in its down position, the next operation of the machine will print the total (if there is a total in the machine) or will print merely the usual total character (if the machine was cleared by the operator who used it last). Inasmuch as the identifying character for a total is different from the identifying character of a sub-total, the printed record will always show whether a previous total left in the machine has been added into the new account or has merely been printed on the record simultaneously with clearing from the numeral wheels. This allows the operator to subtract it out later on, if through mistake it has been added in at the beginning.

The machine is also provided with means for indicating when it is being worked beyond its limit point. There is provided a printing character which comes into play, serving as a warning to the operator that he is in danger of getting a misleading total. In the case of an over-draft, the identifying or warning character comes into action immediately, and so long as the operator is beyond the negative limit with the machine in the subtracting position, this identifying character will be repeated after each item, even though the over-draft be no more than a cent. The warning character does not appear after items which are being added in to wipe out an over-draft as would be the case in a banking account where deposits are made which tend to reduce the over-draft of the account. After an over-draft has been completely wiped out, the warning character will disappear from the record and the machine having been returned from its abnormal condition beyond the limit point, will continue to add and subtract and will give the totals in the normal way.

The machine is so adjusted that when it is working beyond the limit point, either positively or negatively, (either when the machine is nearly full or when there has been an over-draft) the total taking mechanism will be automatically locked so that the operator cannot possibly take a total until the machine has been returned from its abnormal condition or from beyond the limit point.

The machine is also provided with what I have termed a duplicating mechanism whereby any number at the time of its entry into the machine can be stored up in an auxiliary set of number wheels without interfering with whatever operation the machine is being called upon to perform and retained indefinitely until the operator at some future period desires to redeliver this number to the machine for any purpose. The number so stored up in the machine may be redelivered to the machine and cleared from the duplicator numeral wheels or redelivered to the machine and retained in the duplicator numeral wheels just as the operator desires. The controls for this mechanism are shown in Fig. 1, wherein DL represents the duplicator lever. When it is desired to store up some number, for instance the number of a bill of lading or a box car number, independent of the calculating or printing parts of the machine, for future redelivery to the machine, the operator shifts the lever DL forwardly, whereupon the number is rolled into the duplicating numeral wheels $D_1$ to $D_9$, upon the turn-over of the machine, whatever operation the machine may be performing with that number. The lever DL is returned after this turn-over of the machine to its central position shown in Fig. 1. When the operator desires to redeliver this number thus set up in the numeral wheels $D_1$ to $D_9$ he shifts the duplicator lever backward whereupon this number is delivered to the machine precisely as if it had been set up on the key-board to be employed in any operation of which the machine is capable, and at the same time cleared from the duplicator pinions $D_1$ to $D_9$. If the operator desires to retain the number in the duplicator numeral wheels $D_1$ to $D_9$ upon redelivery of that number to the machine, he operates the levers DL and DRL whereupon the number will be re-delivered to the machine but also retained in the duplicator numeral wheels $D_1$ to $D_9$.

The various functions and operations of the machine above briefly set forth, indicate in but a very general way the capacities of the particular embodiment shown in the drawings and set forth in the following detailed description. Many other features of novelty might be mentioned in this preliminary statement, but these features will become apparent after a detailed description of the drawings, which description here follows:

Key-board.

(Figs. 1, 2, 3, 4, 5, 6 and 7.)

Fig. 1 illustrates the separate keyboard sections $S_1$, $S_2$, $S_3$—$S_9$, any one of which may be removed from the machine in a very simple way without disturbing any of the others and even without interfering with the further normal operation of the others.

Fig. 2 shows one of the sections in its operative position, and

Fig. 3 is a diagrammatic or simplified view of enough parts to show how a keyboard section operates.

The casing of the machine comprises a base-plate 1, and is equipped with a suitable covering hood having sides 2 and 3 and a top 4, the top being provided with a glazed opening 5 exposing the little windows at which the numeral wheels $N_1$, $N_2$, $N_3$,—$N_9$ appear.

Each key-board section comprises a wall plate 6 arranged to support the key-stems, stop wires and other operative parts of the section. At its front the plate carries a flange 7 as wide as the operative parts of the section and serving to close the front of the key-board when the key-board is completely assembled. At the top edge of plate 6 is a flange or transverse plate 8 having slots to receive the key-stems. The keys $K_1$, $K_2$,—$K_9$, are mounted respectively on corresponding key-stems 9 each of which has a projection 10 to limit its downward movement and each of which carries near its lower end a forwardly projecting lug 11 serving as a cam to actuate a stop-wire and also serving as a stop to prevent upward movement of the stem until it has been released subsequent to fulfilling its function in holding the set-up until the machine is operated.

Coöperating with this lug 11 is a swinging stirrup 12 (Figs. 3 and 4) pivoted at 13 and urged toward the key-stem by a saddle-shaped arm 14 also pivoted at 13 and having a projection 15 constantly urged downward by the pull of a coil spring 16. The upper end of this saddle 14 is pivotally connected at 17 to a stop wire 18 the outer end of which is bent at a right angle as at 18′ and is suitably guided to serve as a stop for mechanism associated with the calculating wheels and printing mechanism. The lower end of each key-stem extends downward almost to the lower edge of plate 6, though in Figs. 2 and 3 that lower portion of each stem is in large measure concealed by the corresponding coiled spring 16. The extreme lower end of each key-stem is bent transversely and is attached to the lower end of spring 16 so that this spring fulfils not only the function of pulling down on the saddle arm 15 to urge the stop-wire 18 forward into stopping position whenever a key is depressed far enough to allow the stirrup 12 to swing in over lug 11, but it also serves the function of forcing the key-stem upward after the machine has acted and when the key-stem is to be returned to normal.

Projecting downward from each stirrup 12 is an arm 19 which is used to unlatch the stirrup from the lug 11 of the key-stem when the keys are to be returned to normal and also serves to positively restore the corresponding stop to normal. As a means for actuating this arm 19 there is provided a plate 20 slidingly mounted against the supporting face 6 of the section and having lugs 21 extending transversely in position to strike arms 19 when plate 20 is shifted longitudinally. As a means for shifting this releasing plate there is provided at its lower edge a lug or shoulder 22 positioned above a rock shaft 23 which has rigidly mounted on it a striking blade 24 positioned to swing around into contact with lug 22 at each operation of the machine, pushing that hook to the right (Fig. 3) and shifting the releasing plate 20 far enough to bring lugs 21 into engagement with arms 19, thereby swinging the stirrups away from lugs 11 and allowing the keys to return to normal. A coiled spring 25 attached to the rear end of the releasing plate 20 serves to restore that plate to normal after rock shaft 23 has turned back.

When a total is to be taken, this longitudinal shifting of the release plate is effected by means of another rock shaft, this being indicated in Fig. 3 by the reference numeral 26. This rock shaft carries a striking plate 27 for engagement with lug 28 on the lower edge of the releasing plate. This insures that all the stop wires will be "in the clear" or in the withdrawn position during totaling and prevents tampering with the total through manipulation of the key-board.

In case corrections are to be made in the setting of the keys in any section, to clear out an erroneous set-up, preparatory to operation of the machine, recourse may be had to the correction key CK at the front end of each section, this key being movable downward against the tension of a coiled spring 29 and having its lower end pivotally connected at 30 to a bell crank 31 swinging about a pivot 32 and having its upper arm pivoted at 33 to a sliding link 34, the rear portion of which is notched to engage a lug 35 projecting from the side of the releasing plate 20. As a result, the downward movement of the releasing key pushes the link 34 toward the rear of the machine and shoves the correction plate 20 longitudinally and far enough to release all the keys in that section, allowing them to return to normal. This sliding link 34 is so supported that it can be swung upward out of engagement with the stop 35 so that after the machine has once started on its swing, the operator will be unable to change the key-board setting by manipulating the correction key CK. In other words the correction keys are thrown out of operative connection with the sliding plate 20 at each operation of the machine, just preparatory to the swing of the machine, and that connection is not reëstablished until the machine has swung back to normal. To effect this result, the rear of link 34 is bent downward and provided with a foot 36 which bears on a rocker bar 37 which moves upwardly at the beginning of each stroke of the machine to swing link 34 upward as described into the position indicated in dotted lines Fig. 3 and it stays up until the very end of the stroke.

The details at the lower edge of plate 6 appear in Figs. 3, 5 and 7 and include three staffs, 38, 39, and 40, which slidingly support the releasing plate 20, these staffs also carrying spaced plates 41 between which the lower end of the key-stems are guided and below which the hooked ends of the stems protrude for engagement with their respective coiled springs 16. One of these plates serves as a stop to limit the upward movement of the key-stem. The plates 41 are held in position by a brass rod 42 which extends longitudinally of the plates through all three of the staffs 38, 39 and 40. This brass rod is in the nature of a key, the withdrawal of which releases the outermost plate 41 and permits removal of all the stirrups 12 and saddles 14 as soon as their springs 16 are unhooked and then allows all of the key-stems to be drawn out through the top plate 8 and all of the stop wires 18 to be pulled forward out of their slots and removed from their section. In regular course of assembly, the workmen put these parts together without mechanical tools, using only their fingers to slip the parts in place then hooking the retaining springs 16 and sliding in the locking key or wire 42.

Each time any one of the keys of a section is depressed, a shoulder 43 near the upper end of the key-stem comes into driving engagement with a roller carried on a stud 44 projecting from a plate 45 mounted near the top of the section and swinging from three pivotal links 46. The main function of this sliding plate 45 is to pull forward on the cipher stop as soon as any item has been put in on the key-board by depression of any of the keys. This result is effected through a pivoted link 47 (Figs. 3 and 6) the rear end of which has a hook engaging with roller 48 carried on a swinging plate 49 pivoted at 50 and carrying at its lower end a pivotally supported stop-wire 51, (this being the zero or cipher stop wire) the bent end of which slides in the zero slot of a pair of guiding segment plates 52. A coiled spring 53 normally pulls plate 45 rearwardly and also pulls the upper corner of plate 49 forwardly and so serves the double function of returning plate 45 to normal and resetting stop-wire 51 after each operation.

As a means for returning the zero stop-wire to its acting position as soon as possible there is provided a vertically sliding plate 54 the upper end of which has a slotted engagement with link 47 at 55 and the lower end of which is slotted to receive a vertically movable control rod 56 (Fig. 3) which is moved upwardly and downwardly in a positive manner at each operation of the machine and which pulls down on plate 54 just after the swinging arm or stop nose SN of the machine has passed stop-wire 51, thereby releasing the bell-crank 49 and allowing its lower end to re-set the zero stop.

It is not possible for the zero stop to hold the nose during a part of the forward swing and then release it for the balance of the swing for after the swing once begins the zero wire is effectively disconnected from the key-board and depression of keys will not withdraw it. As soon as the forward swing is complete the zero stop comes into action again and can be withdrawn by depression of a key even though the stop nose is on its return swing.

It will thus be understood that at each operation of the machine and properly timed with respect thereto, the control rod 56 moves down and stays down until the cycle has been completed or until the machine is again almost at rest, thus allowing the zero stop wire to move into stopping position the instant the stop nose has gone past it but giving the operator a chance to press down a new key set-up the instant the stop nose begins to swing back, or in other words, at the completion of a half stroke. And the keys may then be depressed even though their stop wires happen to be in the path of the upwardly swinging nose, for in that case the nose will simply brush them back and slip past, the wires then returning to their set positions. The operator therefore can be very deliberate in working the keys for he has 50% of the total time of a complete cycle wherein to set the keys for the next operation as compared with 10% or so on the machines more generally in use. The return or upward movement of plate 54 will withdraw the zero stop, if in the meantime any key has been depressed so that the machine may make another downward swing instantly on return from, or completion of, the previous swing. If the operator wants to repeat an item he can do so by simply holding down the appropriate keys and allowing the motor to turn the machine over as many times as the item is to be repeated. He is never thrown off the key-board for there is no forcible return of the keys.

This part of the machine is also provided with another vertically sliding control plate 57 which overlies plate 54 and in Fig. 3 largely conceals 54, and which comes into use when a total is to be taken by sliding upward to force its upper end 57″ against roller 48 pushing that roller backward and withdrawing the zero stop. This vertical movement is controlled through an angle plate 58 at the lower end of plate 57, and the up and down movements of the plate 58 are controlled by the total taking mechanism as hereinafter set forth. Simultaneously with the upward movement of plate 57 to withdraw the zero stop to take a total, the rock shaft 26 swings as previously described to bring its blade 27 into engagement with lug 28 thereby sliding the releasing plate 20 and thereby sliding all of the saddles and stirrups rearwardly and withdrawing all of the stop-wires and leaving the stop nose free from danger of interference through manipulation of the keyboard. The nose is free to swing through its full arc of travel and this is necessary in order that the swing may correspond with the setting of the accumulator wheels.

In some machines it is considered necessary to lock the key-board when a total is to be taken so as to prevent the operator from interfering with the total, either intentionally or through accident. Such locking mechanisms are necessarily delicate and somewhat uncertain in operation. In this machine, on the contrary the keys are not locked during the taking of a total and may be manipulated at will, for because of the effective disconnection between the key-stems and their corresponding stop wires through the sliding movement of the release plate 20 and the resultant backward swing of the stirrups and saddles, none of the manipulations of the keys while taking total will be transferred through to the stop wires. In other words there is an effective disconnection between the keys and the stop-wires, rather than a locking of the keys against movement. This feature is of considerable importance in the construction and practical operation of the machine here illustrated.

As previously mentioned all of the sections of the key-board are readily removable from the machine, each as a separate unit and altogether independently of the others. The others can continue to operate even though several of their companion sections have been withdrawn for inspection or repairs and the sections can be transposed and substituted one for another to equalize the wear on the key-board and to shift into a remote portion of the key-board any section which has given trouble through heavy use or wear. To release any of these sections from the machine, it is only necessary to pull out the key-rod 59 located near the upper rear corner of the section and passing through all the sections and the frame of the machine. It is then possible to pull the section forward and upward out of locking engagement with the transverse cross bars 60, 61 and 62 of the frame from which it normally gets its support. To insure that the machine stands at normal when a section is being taken out, a locking bar 62' is provided at the lower front corner of the sections, this being part of the main locking mechanism of the machine as hereinafter pointed out.

*The accumulator.*

(Figs. 2, 8, 17, 18 and 19.)

The accumulator mechanism as a whole includes pinions carrying numbered wheels, a swinging rack for each of these wheels, means for moving each pinion into mesh with its rack as the latter starts movement in one or another direction when the wheel is to be rotated (as when something is being added or subtracted) and for moving it out of mesh at the completion of the stroke. There is also included, mechanism for allowing the rack to slip with respect to the stop-nose by a distance equal to one tooth in either direction so that after one complete revolution of a numbered wheel, the amount so represented can be transferred through to the next adjacent wheel giving that adjacent wheel a movement equal to one tooth. This transferring mechanism also embraces a latch and trigger whereby this slip may be effective to carry over from one wheel to the next in either direction.

There is also provided appropriate mechanism for swinging the segmental racks, for swinging the stop-noses, for shifting the pinions into and out of mesh with their racks and for otherwise controlling the co-operative action of the several parts which go to make up this particular portion of the machine.

Each accumulator pinion 63 (Fig. 17) carries a numeral wheel 64 and is pivotally mounted at the end of a suitable supporting arm 65 rigidly attached to a rock shaft 66. When the pinion is in its uppermost position it is locked against accidental movement by a retaining tooth 67, formed on a bar 67' spanning the side frames of the machine, but when in its lowermost position it meshes with a segmental rack 68 mounted for frictional drive from the main rock shaft 69 of the machine as hereinafter described. Also frictionally driven from this main rock shaft 69 and in the same friction unit as is the rack 68, is an arm 70 carrying the stop nose SN, it being understood that this arm can swing down between the stop-wire guide plates 52 until it strikes one of the stop-wires 18 and that its swinging movement will govern the swing of the segmental rack 68 except however, that the segmental rack may slip one tooth backward or forward with respect to the stop nose and so can be made to carry across from one accumulator wheel to another. The stop nose arms 70 have rack teeth thereon for a purpose to be described.

The mechanism whereby the slip between the segmental rack and its stop nose is effected, comprises a pivotal latch 71 carried by the stop nose arm 70 and notched to engage with a projecting lug 72 carried by the segmental rack 68 and projecting outwardly from the side thereof this being the rack which meshes with the accumulator pinion 63. The latch 71 is controlled by a pull wire 73 pivoted to a swinging lever 74 which is pivoted at 75 and has its upper corner 76 positioned to strike against and to be controlled by the laterally projecting lug 77 of the trigger 78 pivoted at 79 and having at its outer end a roller 80 which at proper times can be pushed down to lift stop 77 from in front of corner 76, thereby, through the action of the coiled spring 81, allowing the lever 74 to pull on wire 73 and swing latch 71 away from lug 72, thereby permitting the rack to move with respect to stop nose (or vice versa) by a distance equal to the pitch. The trigger lever 78 is tripped by a cam 80' rigidly mounted to turn with the next adjacent pinion 63 and numeral wheel 64. It is of circular outline but with a projecting corner so positioned as to strike against the trigger roller 80 of the section next adjacent while the pinion 63 and its numeral wheel 64 are revolving from the "9" position to the "0" position or vice versa. This is the point at which the wheel has fulfilled its function as an accumulator and must transfer or carry over to the next adjacent wheel.

In explanation of this mechanism I may anticipate what will be more fully described hereinafter, and say that when subtraction is to be performed all the accumulator pinions 63 go into mesh with the racks 68 at the beginning of the down stroke of the racks and stop noses; when addition is to be performed, they go into mesh at the beginning of the up or return stroke. Now assuming subtraction is being performed; the stop noses each go down until they strike a stop wire. If a transfer is to take place, that is, when any numeral wheel 64 is turning from the "9" to the "0" position, its cam 80' will cause latch 71 to be depressed in the next adjacent section which will allow that rack 68 to move past stop nose 70 until lug 72 impinges the lower end of the slot in member 70, or a distance corresponding to one tooth. This movement of rack 68 relative to stop nose 70 is rendered possible by the slip joint connection between the two, both of these members being urged downwardly by the shaft 69 upon which they are each frictionally mounted. Thus the accumulator or pinion next to the one turning from "9" to "0", is turned back one tooth.

When addition is being performed precisely the same operation takes place, except that it occurs on the backward movement of the stop nose 70. When the stop nose at the end of its backward sweep is stopped by the bar 60 the rack 68 (provided latch 71 has been tripped) moves on under the frictional impulse of the shaft 69 until the upper lug 72 comes into contact with the extremity of its slot, thus moving the corresponding accumulator wheel forward a distance of one tooth with respect to its stop nose.

As a means for resetting the trigger 78 and the trigger controlled lever 74, there is provided a shaft 82 operated as hereinafter described carrying a lantern construction which extends across from one side of the machine to the other, this construction embodying rolls 83 and 84 the latter of which performs the function of swinging the lever 74 against the tension of its holding spring 81 when the parts are to be re-set. Lever 74 has a cam projection 85 which swings forward when the lever is tripped and so is in the path of roller 84, which by striking this projection, will swing the lever back into position for latching and in so doing will force the latch 71 forward to engage the lug 72 and to lock the stop nose SN with respect to the segmental rack, provided the latch and lug are in correct relative position.

Because of the slip joint connection between rack 68 and stop nose 70 whenever latch 72 has been released, the completion of the up stroke will always leave stop nose 70 held against bar 60 and rack 68 held by the contact of lug 72 with the upper end of the slot in member 70. Timed just ahead of the action at roller 84, the other roller 83 swings around into contact with a projecting shoulder 85' of the segmental rack 68 and pushes that rack forward with respect to the stop nose 70 by a distance equal to one tooth so that the lug 72 will lie in the middle of its slot and in position to be caught by latch 71 when that latch is raised. This resetting of the stop nose and rack takes place at the completion of a full stroke of the machine.

The triggers 78 and the levers with which they co-act, together with their respective springs 78' and 81 are mounted on an L-shaped plate 87 connected by staffs according to what may be designated as "clock construction" and each L-shaped plate with its load of springs and swinging members is a unit in itself, and can be assembled by the assembler's bare hands and then slipped into position from the back of the machine, with its front recessed end embracing the main upper cross bar 60 which is slotted to receive it. These L-shaped plates 87 are positioned to receive and to be secured by the same locking rod 59 which is used to hold the key-board sections in position. The upper or rear end of plates 87 are shaped to embrace the upper rear transverse frame member 88.

The lantern structure 82 comprises end plates 82' one of which is shown in Fig. 10 and carrying the rollers 83 and 84; the whole lantern being rotatable on shaft 82. The plate 82' has an extended rounded corner 82ª to which is pivotally connected the link 82ᵇ the other end of which carries a pin mounted in the curved slot 82ᶜ in the wing extension 82ᵈ on plate 154' carried by shaft 155. The link 82ᵇ is normally held in its rearmost position by the spring 82ᵉ. A pin 82ᶠ projects forwardly from the side frame of the machine which serves as a stop for the plate 82' and also engages the hooked end of link 82ᵇ when the link is in forward position. When the machine is at rest with the plate 154' in rearmost position, the lantern structure assumes the position shown in Fig. 10, wherein the rollers 83 and 84 contact with the lugs 85' and 85 respectively (Fig. 17). As soon, however, as the forward stroke of plate 154' begins, link 82ᵇ, under the influence of spring 82ᵉ, follows the plate until its hooked end engages pin 82ᶠ whereupon link 82ᵇ comes to rest while plate 154' continues. In this position rollers 83 and 84 are off-set with respect to lugs 85 and 85' and the rearward extension 82ª on the plate 82' has been swung inwardly. The parts remain in this position until plate 154' has returned to a position wherein the forward end of the slot 82ᶜ impinges the pin in the end of link 82ᵇ whereupon the hooked end of link 82ᵇ is disengaged from the pin 82ᶠ and the parts are returned to the position shown in Fig. 10, alining racks 68 and 70 and causing latch 71 to engage its lug.

*Slip joint drive for type carriers and stop noses.*

The slip joint between the main rock shaft 69 and the stop nose arms 70 and the segmental rack arm 68 is of the general construction disclosed and claimed in my copending application Ser. No. 485,724 filed March 25, 1909, though in some details it differs from the construction there shown. The slip joint is made up of a series of spools 89 and collars 90 which have keyways to receive a feather 91 on shaft 69, the arrangement being such that these spools and collars can slide along the shaft but must always turn with it. On one side of each collar is a type-bearing lever 92 running back to the rear end of the machine and carrying the removable type head corresponding with one of the key sections, the other end of that lever constitutes the arm 70 which carries at its front end the stop nose whereby the swing of the segmental rack is regulated. On the other side of that collar is the segmental rack arm 68.

The connection between each collar and its coöperating arms 92 and 68 is effected by means of flanges, one carried by the collar and the other carried by the adjacent spool so that these arms need not come in direct contact with the main rock shaft 69. To insure perfect wearing and perfect surface, each of the swinging arms 92 and 68 is faced on both sides with babbitt disks 92' and 68' cast in place and accurately surfaced before the machine is assembled. Small holes may be drilled through the arms so that the cast disk on one face will be intimately connected with the cast disk on the other face. To insure uniform wear and lubrication, the rock shaft 69 is made hollow and provided with an oil feed at one end and with radial ducts leading out to an oil groove at each slip joint.

To insure a constancy in the slip and a uniform tension on the various parts of the slip joint, there is provided at one end of the rock shaft a helical spring 93 which is coiled about the rock shaft and presses directly against the end disk, this pressure being transferred across from one collar or spool to the next, it being understood that the series terminates in a disk 94 permanently pinned to the shaft. This spring 93 is housed in a box 93' see Fig. 19 and on assembly of the machine is adjusted to proper tension, which never need be changed in normal use.

In Fig. 19 where this slip joint is shown partly in section, the extreme right portion of shaft 69 is shown as carrying an extra hammer-bearing arm 95, this arm being projected forward at 96 beyond shaft 69. This is the type-bearing arm which prints the identifying characters, as for instance when a total is printed or when the number of a railway car is printed, or subtraction taken, etc. The means whereby this character is controlled is described more in detail hereinafter.

Concerning the function and advantages of the rock shaft 69 and its operation with the type-bearing arms and with the stop nose arms and swinging rack arms it may be said that it contributes to ease of assembly by allowing substantially all of the parts to be stamped out and made up in duplicate and then slipped on one after the other in their proper order until the entire structure is built up. In normal action the rock shaft 69 swings through a definite angle of rotation every time the machine is turned over, irrespective of the set-up on the keyboard and the stop nose arms 70 swing with it throughout the complete rotation, unless restrained by one of the stop-wires of the key-board or by a stop-guard of the total taking mechanism acting through the swinging segmental rack. These stop-noses do not strike a hard blow on the stop-wires for the slip joint is so nicely adjusted that while of rugged construction, still the noses always stop when they reach their respective stop-wires. Inasmuch as the shaft continues to turn after the stop-noses hit their appropriate stop-wires there can be no re-bound of the stop-noses, or vibration of any kind during such times as the printing is being done, or in fact at any other time and the action of the noses consists merely in swinging down into gentle contact with their stop-wires and there remaining until the rock shaft begins its return movement. The slip joint for every stop-nose and accumulator rack in the entire machine is held up by a single spring.

The mechanical construction of the slip joint is such that these long metal plates carrying the type at their rear ends are prevented from whipping around or getting out of alinement. It is desirable that the type should be spaced close together and to get this result the type-bearing arms must be staggered over as shown in Fig. 19, but there is no special objection to this in the present machine for the spools and collars press and re-inforce the parts at the joint so that no twisting or whipping is permitted and the type are accurately alined and held in alinement at all times.

*Type-bearing heads.*
(Figs. 23 and 27.)

At the printing end of each of the printing arms 92 is a removable type-bearing head comprising a pair of side plates 97 and 98 riveted together to form therebetween rectangular chambers in which the printing type 99 are slidingly mounted. Coiled springs 100 are disposed in the spaces between adjacent type and engage with pins 101 projecting from the side of each type, it being the function of these springs to return the type to their retracted position after they have been struck by the hammers. This entire type-bearing head locks into the end of the swinging arm 92 by means of a thin spring metal plate projection 102 coöperating with a pair of headed studs 103 and 104. The stud 104 can be inserted through an opening in arm 92 and stud 103 can then be swung around into the slotted end of that arm and then plate 102 can be snapped over behind a retaining stud 105, thereby locking the type-head on the end of the arm, but in such a way that it can be removed without the use of any tool other than a pen-knife. The type-head bears on its side a thin metal segmental strip 106 projecting outward somewhat beyond the retracted position of the type, but not as far as the striking position of the type, it being a function of this metal plate to serve as a guard preventing the ribbon from becoming caught on the irregular face of the type-bearing head or becoming entangled with a type bar, even though the ribbon be perforated. There is one of these guard plates to each type-bearing head.

*The hammer section.*
(Figs. 21 to 27.)

The hammer section of the machine comprises a pair of side plates 107 and 107' connected by cross bars to form a rigid frame wherein the hammers 108 are pivotally mounted on a transverse rod 109 about which they may swing to bring their upper striking ends into engagement with appropriate type after the type-carrying bar 92 has been swung into a position governed by the swing of the corresponding stop-nose.

The striking power of each hammer is controlled by a coiled spring 110, the tension of which may be adjusted through a crank arm 111 carried by shaft 112, the end of which terminates in a crank (Figs. 21 and 24), controlled in position by a nut carried on an adjusting screw 114 arranged at the side of the hammer section and accessible to a screw driver.

Each hammer comprises a finger 115 whereby it is retracted from the type to a striking position, this retraction being effected in two separate steps. The hammer also includes a projecting lug 116 whereby the arm may be prevented from striking in case it is to be held inactive for that particular operation of the machine. To effect this control of the hammers, the mechanism includes a swinging lever 117 pivoted on cross rod 117' having a notch 118 for the reception of the lug 116 and having a notch 119 for receiving a cross bar 119' on the lower forked end of a pendulum lever 121, the upper end 121' of which (except in the case of the outermost lever) normally supports the type-bearing head and is released as soon as that head starts on an upward movement. Lever 117 is cut away at 120 to permit an upward swing far enough to lock lug 116 against stop 118, when occasion may require, as hereinafter explained. In other words, this pendulum lever is held in normal position by the weight of the type-bearing head, and can swing from that position only when released by the head. A coiled spring 122 pulls up on lever 117 and pulls down on a projection of lever 121 in such a way that it tends to swing the lower end of the pendulum lever forward toward the pivotal point of lever 117. The extreme rear end of lever 117 engages with a control bar 123 carried by an arm 124 actuated from a rock shaft 125. Also there is provided a rotating X bar 126, the function of which is to raise the hammers in position for striking and to drop them at the proper instant and then, almost immediately, to retract them out of contact with the rear of the type so that the type-bearing arm may be free to swing into another position.

It is not necessary here to explain how the X bar 126 is rotated, a detailed explanation of that appearing later, but it is here pertinent to describe the means for swinging the rock shaft 125 to control the position of bar 123 and its coöperating lever 117. The driving connection for this is located on the outside of the hammer section and appears in Fig. 21. It comprises a crank arm 127 rigidly secured to rock shaft 125 and bearing against the outer edge of a cam disk 128 mounted to turn with the X bar 126 and having its edges provided with four notches, each comprising two parts of different depth. With the elements in normal position, as shown in Fig. 21, the crank arm 127 rests in the deepest of these two portions.

The lever 121 never rests against the shoulder nearest recess 120, but is suspended above it free to move over as soon as the type-heads are lifted. The part is cut away at 120 to permit lever 117 to move up when lug 116 is to be caught by stop 118. There is clearance enough for the pendulum lever to swing and it is only prevented from swinging by the weight of the type-heads.

When a type-bearing head starts upward in accordance with a setting of the keyboard, it frees the upper end of pendulum lever 121, leaving its lower forked end free to move over until the edge of the notch 119 is against stop 119'. The several parts remain undisturbed in this position with the pendulum resting against stop 119 until about two-thirds of the full forward stroke of the machine and then X bar 126 and its cam disk 128 turn slowly, shifting crank 127 and so lifting bar 123 to release lever 117.

On further rotation of the X bar 126 the hammer is swung back to striking position while simultaneously swinging lug 116 forward into position for locking with the notch 118 unless lever 117 is being held down by the lower end of pendulum lever 121, as it will be held down if that pendulum has been allowed to swing because of upward movement of its type head. Each type head controls its own hammer and unless the type-head moves up, the hammer will be caught by its lug 116 and will not strike against the type when released through further rotation of the X bar 126. The timing of the rotating bar 126 and the movable rod 123 is such that first the pendulum lever is released and swings forward against stop 119, then rod 123 lifts, allowing lever 117 to come up as far as is permitted by the pendulum lever 121. With that lever 121 in its forward or acting position complete upward movement of lever 117 is impossible and the hammers are free to swing back and strike, wholly under the action of the rotating X bar 126. Bar 126 by its rotation lifts the hammers forward and drops them back with a striking blow. Almost immediately, however, it lifts them away from the type again so that the type heads can swing back into contact with the upper end 121' of pendulum lever 121, which is thereupon swung back to normal position as shown in the drawing. The second lifting of the hammer is delayed just long enough to permit the transfer plungers to carry across the entire printing section.

In the special case where the hammer is not to print a zero or anything else, the type head will not lift from the pendulum lever and the lower end 121 of that lever will not limit the upward swing of lever 117 with the result that when the hammer is drawn back by the X bar 126, its release will carry it no further than until lug 116 strikes against the stop 118. Nothing will be printed on the paper.

However, there is the special case that in printing numerals followed by ciphers it is necessary to print in the cipher without an upward swing of the type-carrying head and this special case is taken care of by means of transfer mechanism including a sliding plunger 129 for each hammer, movable in a suitable guide-way and having its lower looped end 130, offset as shown in Fig. 24 and shaped to embrace the end of a lever 117 and to engage the upper edge thereof for driving that lever downward when occasion requires. The upper end of plunger 129 is in position to be struck by the tail 115 of the hammer member, and it is this blow transferred across to the next adjacent lever 117 which unlatches the adjacent hammer and allows it to strike the zero type of its section. This unlatching is automatically transferred across from one hammer to the next on the right and so includes in the printing, all of the necessary ciphers.

*Control mechanism for adding and subtracting.*

Figs. 8, 11 and 12 indicate somewhat diagrammatically the various elements that go to make up the control mechanism, which determines whether the machine shall add or subtract when a certain number has been set up on the key-board. This mechanism includes the hand lever L pivoted to the machine frame, which, in its rearward position, as shown in Fig. 11, is in the adding position, but which can be swung forward into the subtracting position, as previously explained in connection with Fig. 1. When tilted backward as shown in Fig. 11, a roller 131 on lever L passes down over the lower lip of the recessed end of a rock lever 132 on shaft 189 and swings that lever upward at its rear end, thereby pushing upward on a link 133, the upper end of which carries a roller 134 movable in the slot of a plate 135, to which is riveted the plate 135′. The construction is to permit the roller 134, which has a flange on the inner side of slotted member 135 to pass the pivot of this member. Plate 135 has a projecting arm 137 at its rear end, having a cam slot to receive a roller 138 carried on the lower end of a swinging arm 139, this arm being rigid on the rock shaft 66 and serving to control the inward and outward swings of the supporting arms 65 which carry the accumulator pinions 63, the numeral wheels 64, the stop cams 80′ and the totaling stops 80ª.

Pivotally connected with the stud of the roller 134 and with the upper end of link 133 is another link 140 pivoted to the upper end of a plate 141 pivoted on a stub-shaft 142 and having a roller 143 at its lower end and an offset retaining lug 144 at its rear edge. An auxiliary plate 145 is pivotally mounted on the stub shaft 142 and can swing with respect to plate 141 and is used to put that plate under tension at each forward or backward swing of the machine so that the numeral wheels 63 will snap into or out of mesh, as the case may be, at appropriate times. To effect this result there is interposed between plate 145 and plate 141 a spring 146 which is coiled about shaft 142 and has both of its ends projecting upward divergently, these ends being respectively anchored in guide plates 147 and 148, both of which are free to swing about shaft 142 and serve merely to hold the ends of the spring to their work. With the elements in the position shown in Figs. 11 and 12 the spring-supported guide plate 147 will contact with a stud 150 on the upper end of lever 141 and the other spring holding plate 148 will contact with a stop 151 projecting from the top of the swinging plate 145, thereby putting the two parts under tension and tending to swing the stud 150 toward the stop 151.

Referring now to Fig. 8, it will be seen that the means for swinging plate 145 consist of a pair of studs 152 and 153 mounted on the outer face of the main controlling plate 154. This controlling plate is driven in a manner hereinafter described and turns on a shaft 155 forward and back at each swing of the machine. The upper edge of plate 154 has a laterally projecting flange 156 which serves as a retaining cam for holding roller 143 against movement until the machine has reached just the proper point in its swing and thereupon releases that roller to allow plate 141 to snap over in response to the tension which in the meantime has been put on it through spring 146, for this spring meantime has been loaded by the swinging motion induced in plate 145 through engagement therewith of one or the other of studs 152 and 153. In other words the studs on plate 154 swing lever 145 backward and forward at every operation of the machine, thereby shifting the spring tension from one side to the other with respect to plate 141 and it is the function of the roller 143 to prevent the parts from slipping through until the machine is in exact position and this exact position is defined by the release of roller 143, by the controlling flange 156 projecting laterally from the upper edge of plate 154. The object of this mechanism is to shift the accumulator pinions 63 into and out of mesh with racks 68 at the proper instant.

Referring to Fig. 11: This figure illustrates the position of the parts before wheel 154 has begun its forward stroke and when the lever L is in its rearward or adding position. In this position of parts roller 134 is at the top of the slot in plate 135. The forward stroke of the wheel 154 will operate to first lock roller 143 by means of flange 156 and then to swing the lower end of lever 145 by impact thereupon of a pin 153. The upper lug 151 on lever 145 will move the swinging arm 148 to the right and tension spring 146 without, however, shifting pin 150, for the reason that plate 141 is locked. As soon, however, as the flange 156 has passed off roller 143 plate 141 is free to rock and under the tension of spring 146, applied through member 147 will be swung to the right. This will communicate a forward impulse to link 140, rocking the slotted plate 135 in a clockwise direction, which lowers arm 137 and by means of the caterpillar slot therein rocks lever 139 and causes accumulator pinion 63 to go into mesh with rack 68. The return of wheel 154 will first lock roller 143 in its new position, thus holding accumulator pinion 63 in mesh with rack 68 and thereafter pin 152 will impinge lever 142 putting tension on spring 146 in the opposite direction, so that at the end of the return stroke when roller 143 is released by flange 156, spring 146, acting this time through arm 148 will cause a rearward impulse to be communicated to link 140, thus rocking slotted plate 135 in a counter clockwise direction, which, through the caterpillar slot in this member will swing arm 139 to the left and withdraw accumulator pinion 63 from mesh with rack 68. This is the position of the part illustrated in Fig. 11. Thus, while the machine is adding the accumulator pinions are held out of mesh on the forward stroke put into mesh during the rearward stroke and automatically flipped out of mesh at the end of the rearward stroke.

The subtracting operation is analogous. In subtracting, the level L is in its forward position wherein lever 132 is tilted downwardly at its rear end, causing roller 134 to engage at the lower extremity of the slot in plate 135. Precisely the same operation of the remaining parts will cause the accumulator pinion 63 to be held in mesh on the forward stroke, thrown out of mesh at the beginning of the rearward stroke, and flipped into mesh again at the end of the rearward stroke. This must be true because the operation of all the other parts being precisely the same in either case, in the subtracting operation link 140 (being lowered) communicates an impulse to the opposite end of pivoted plate 135 rocking this member in precisely the opposite direction each time to the direction it would rock it at the same stage of operation if adding were being performed.

There is an auxiliary plate 157 (Fig. 8) pivoted on a sub-shaft 158 and having a laterally projecting stop 159, which will ride on the top edge of the large rock lever 132 when that lever has been tilted upward at its rear end for the adding position. But in case of subtraction, and with this lever 132 tilted down out of the way, this auxiliary plate 157 swings forward at its lower end under the driving action of a coiled spring 160 so that the notch 161 near its lower end may engage with the laterally projecting stop 144 located on the rear corner of the swinging plate 141. The result is that when lever 132 is set for subtraction, the projection 144 will snap in under the shoulder at 161 as soon as it is released at the end of the forward stroke, this having the effect of positively keeping the numeral wheels out of mesh with the segmental racks (on the return stroke) until other operations have taken place, including rotation of the lantern shaft 82 and re-engagement of latches 71 with their lugs 72 to again connect each segmental rack in its normal relation to its stop nose arm. The swinging plate 157 continues to lock plate 141 against return movement until the main plate 154 swings back far enough to bring a lug 162 against the lower offset end of plate 157, and thereupon that plate is unlatched and plate 141 can swing back under the driving impulse of its spring 146, which has long previously been shifted over to put the tension on in the other direction.

From the foregoing it will be apparent that with lever L in the adding position, the accumulator pinions are out of mesh at the beginning of the forward stroke and are flipped into mesh at the beginning of the rearward stroke while for subtraction they are put into mesh at the beginning of the forward stroke, flipped out at the beginning of the rearward stroke and positively held out until the beginning of the forward stroke.

With this machine there is the advantage that after each subtraction, the calculator wheels are again shifted into mesh at the conclusion of each turn over of the machine and so are in position for a second subtraction.

To deaden or cushion the swing of lever 137 its rear end is positioned to engage with shoulders on a sliding plate 137' (Fig. 9) movable up and down and frictionally retarded by a spring metal retaining plate 137" having crimped ends engaged in the recessed ends of studs 137''' upon which plate 137' is slidably mounted.

The peculiar motion induced by roller 131 on lever L in lever 132 constitutes an important feature of my invention. The action of the lever L on lever 132 is positive at its extremities, yet in its intermediate positions it has all the freedom of a slot and pin connection. It is an important advantage to have adding lever L first lock the machine, when it begins to swing and at the extremity of its swing unlock the machine, substantially the entire swing of lever 132 taking place while the machine is locked. To bring about this I have formed lever 132 with two lips 131$^a$ and 131$^b$ and a central aperture therebetween. In operation and supposing the parts to be in the position illustrated in Fig. 11, wherein the adding lever is in its rearward position and the forward end of lever 132 down, it will be apparent that the adding lever may swing until roller 131 has cleared the lip 131$^a$ and passed the open space in the center and actually come into contact with lip 131$^b$ before the lever 132 is shifted. The first part of this movement of lever L serves to lock the machine. After striking lip 131$^b$ roller 131 first gives lever 132 a quick short swing to set it to its upper or subtracting position; this comes about before roller 131 can continue in its movement. After lever 132 has been thus quickly shifted to its upper position, roller 131 can then continue to ride up lip 131$^b$ without having any effect on lever 132. It is this part of the movement which serves to unlock the machine. The rock mechanism for the adding and subtracting lever comprises a swinging plate 185 to which is rigidly connected the plate 267 and having a rearward corner thereon adapted to swing across the path of block 186 on plate 154 effectually locking the machine.

*Totaling mechanism.*
(Figs. 2, 3, 8, and 10.)

The total taking mechanism includes the total lever TL pivotally mounted on a rock shaft 163 and connected with the adding and subtracting lever L by means of a link 164 which is pivoted to the total lever and which is connected to the adding lever by a slot and pin connection 164' when the total lever TL is in its rearward position. Lever L can be swung either forward or backward without disturbing the total lever TL but if the total lever is swung downward it necessarily takes with it the lever L, thereby setting the mechanism in subtracting position, it being understood that in this machine the totaling operation is a partial subtracting operation and includes unreeling or backing out of the calculator wheels, the total of the items previously put in. The total lever TL is slotted at 165 for engagement with the end of the link 166, the other end of which is pivoted to a rocking cam plate 167, the cam way of which engages a roller 168 carried on the lower end of the crank arm 169 rigidly mounted on a rock shaft 170. Rock shaft 170 carries hooks 171 (Fig. 10), the rearward ends of which serve as stops, and positioned to be swung around into abutting relation with the lugs 80$^a$ one of which is carried on the shaft with each calculator wheel 63 and its numeral wheel 64. The lugs 80$^a$ occupy a space of one pitch of the gear pinion, and the parts are so arranged that when the hooks 171 are thrown rearwardly lugs 80$^a$ will bring numeral wheels 63 to rest in correct position to drop into mesh with rack 68. When a total is to be taken since the lever L is thrown forward, as above described, all the numeral pinions 63 will go into mesh with rack 68 at the beginning of the forward stroke (as for a subtraction) pinions 63 will then revolve backward until lugs 80$^a$ strike hooks 171. This position corresponds to the zero position of the accumulator wheels. Since the number in each accumulator wheel has been rolled out, the racks are set at whatever number was registered on the wheels before the operation began. If the numeral wheel should register zero at the beginning of the operation, its lug 80$^a$ would, of course, already be in contact with the corresponding hook 171 and that rack would not be permitted to start. Thus the total will be backed out of the machine, and at the same time the racks 68 set in position to correspond with the amount of the total and the total printed as the machine is cleared. The accumulator pinions are raised out of mesh on the return stroke of racks 68, so that the completion of the operation will find the total printed and the machine clear.

As a part of the total taking mechanism there is provided a slot 172 in the total lever plate TL and riding in that slot is a roller on the end of an arm 173 revolubly mounted on a rock shaft 174 from which shaft a rigidly mounted arm 175 extends rearwardly as shown in Fig. 2 and supports the angle bar 58, whereby, through the action of the vertical plate 57, the zero stop is withdrawn whenever a total or sub-total is to be taken and printed. The arm 173 has a lug 173$^a$ thereon, which engages the lug 174$^b$ on crank arm 174$^a$ on shaft 174 when the arm 173 is moved in a counterclockwise direction, as viewed in Fig. 8, and coiled spring 174$^c$ acting on shaft 174 normally keeps the arm 175 lowered.

The total taking mechanism also includes a swinging arm 176 having its front face shaped to engage with a stud 177 projecting from the outer face of the total lever TL, it being the function of this arm to swing on a stud 176', and induce a swinging movement in the downwardly extending arm 178 which is off-set with respect to arm 176 but must move therewith. The lower end of this arm 178 is slotted and cammed to engage a roller 179 acting through a crank 180 to swing the rock shaft 26 (Fig. 3) whereby the blade 27 is swung upward against lugs 28 and shifts the releasing plate 20 to withdraw all of the stop-wires so that the stop-noses will not be interfered with by any of the key-board mechanism, but will be free to swing in response to the setting of the numeral wheels, or in other words until the stopping of those wheels by engagement of hooks 171 with stops 80$^a$.

While the operator is swinging the total lever from its normal position to its active position, it is desirable that the machine be locked against rotation, and to effect this result, there is provided on the lower edge of the total lever plate TL a cam 181 which rolls over a roller 181' carried on a bell crank 182 working against the tension of a spring 183 and serving to swing the lower arm of that bell crank against a roller 184 projecting from the side of the stop-plate 185. When the operator starts to swing the total lever back, the cam 181 rides up on the roller 181' and swings plate 185 downward into the path of a stop-plate 186 carried on the side of the main control plate 154, which acts as a brake thereby locking the machine against rotation until after the total lever has reached substantially its forward or working position and thereby has swung its cam 181 beyond the roller of plate 182 far enough to permit the locking plate 185 to move upward again to the clear position.

The lower edge of the total lever plate is cut away at 187 so that the shoulders thus formed can act in conjunction with shaft 189 (which carries lever 132) to limit the swing of the total lever.

The sub-total lever STL is of the shape shown in Fig. 14 and has its lower edge provided with a cam face 190 so that it can also serve to swing the bell crank 182 and force the locking plate 185 into position in front of the main control plate. But this projection 190 on the sub-total lever has an additional function, in that it may swing forward to lie over an arm 191 projecting forwardly from the swinging plate 141; thereby acting to prevent that plate from swinging, irrespective of a shift in the tension device. The result is that in taking a sub-total, the numeral wheels are thrown into mesh with the segmental racks and run along until stopped, but are not lifted out of mesh on the return stroke. They must run back over the same distance and thereby take up again the total which they had just given up to the printing mechanism. In other words this projection 190, coöperating with the arm 191 insures the retention in the calculator of the total, which has been printed out, in this respect differing from the operation when the total lever TL only is depressed, for in that case the total is printed out and the machine is cleared.

The sub-total lever is connected with the total lever TL through a stud 193 which strikes against an inwardly projecting extension of stud 177, so that although the total lever can be pulled forward without disturbing the sub-total lever, it is not possible to pull the sub-total lever without also swinging the total lever with it. It is this forward swinging of the total lever that sets all of the various total taking mechanism and it is the forward swing of the sub-total lever that so locks the swinging plate 141 as to insure return of the total into the calculating wheels.

*The repeater control.*

(Figs. 3 and 8.)

To insure repetition in the machine, as repeated additions, or subtractions, or printing, without setting up the key-board each time, there is provided at the front of the machine the repeat lever RL pivoted on a short shaft 194 and limited as to length of swing by a stud 195 running in a slot. The lower corner 196 of this rock lever plate carries a roller running on the cammed face of an irregularly shaped plate 197 pivoted at 198 and having its rear end provided with a laterally projecting flange 199, the function of which is to drop down against the forward end of bar 200 and force that bar down against the tension of its spring 201, thereby unlatching it from a pin 202 carried by a crank 203 mounted on a rock shaft 23 which, as is shown in Fig. 3 has the function of shifting the release plate to return the key-stems and stop-wires to normal.

With this rock shaft 23 thus rendered inactive the original key settings will remain undisturbed and the machine may continue to operate any number of times, repeatedly adding or subtracting and printing that set-up, without clearing the key-board. On return of the rock lever 197 to its inactive position, as shown in Fig. 8 the bar 200 will again swing up into driving relation with pin 202 and the keyboard will be cleared at each swing of the machine.

In order that the machine may be locked while the repeating lever is being shifted from its up position to its down position and likewise to prevent any operation of the machine when the repeat lever is not exactly in one or the other of those positions, there is provided in the lower edge of that lever, a pair of notches separated by a cam face 204, the function of which is to force downward on the end of the bell crank lever 205 pivoted on a shaft 206 and having its lower rear end connected through a link 207 with the forward end of the locking plate 185, whereby the main plate 154 may be locked against rotation. With the repeat lever in the upward position, as shown in Fig. 8, the rollered end of lever 205 lies in a recess and the machine is not locked and similarly when the repeat lever is in the downward position, the roller lies in the depression on the other side of the cam face 204 and the machine is not locked but at any intermediate position the bell crank 205 is out of normal and the locking plate 185 projects down into the path of plate 186. The locking bar 62′ for the key-board sections (Figs. 3 and 19) is carried by the levers 205 and when depressed also serves to lock the machine against rotation.

*Eliminating numbers from the calculator.*

(Figs. 8–13.)

In order that we may print various numbers on the record, as for instance box car numbers, and not add them in at the accumulator, there is provided an eliminating lever EL at the front of the machine, the function of which will now be described.

This lever normally stands down, as shown in Fig. 8. It is pivotally mounted on stud 194 and has its lower edge notched to receive the roller of plate 205 so that it fulfils the function of locking the machine against rotation when this lever is not at its upper or lower limit, in this respect corresponding in action with the repeat lever RL. The essential part for securing the printing of a number without its addition or subtraction at the calculators, consists of a roller or pin 208 which rolls around against the forward edge of a rocking arm 209, the upper end of which is pivotally attached to a long push bar 210 the rear end of which is pivotally attached at 211 with the upper end of a swinging plate 212, Fig. 13, the lower end of which carries a hook 213, the function of which is to lock the stop 144 of plate 141 against downward movement. The function of this hook is to prevent any movement of the plate 141, irrespective of the shifting of its tension device, thereby preventing any swing of the arm supporting the calculator wheels and positively holding the calculator wheels against their retaining pins 67.

Also connected at the pivotal point 211 at the upper end of this plate is a push bar 214 which extends rearwardly and upwardly, its outer end being supported and guided by a stud 215 which is received in a slot in that bar. This bar 214 is cut away to lie over the shaft 82 of the lantern structure (which is used to shift the segmental racks with respect to their stop noses and to drop the latches in for holding these two parts in their proper normal relation).

Bar 214 carries a shoulder 216 which, when the bar is thrust backward comes into locking engagement with a pin 217 carried by shaft 82 and so holds the lantern structure against rotation. It is to be remembered that the lantern structure is not positively rotated, but is merely released from its normal position, swinging through a limited arc by a spring (Fig. 10) and reset by a slot and pin drive from shaft 155. Shoulder 216 acts as a detent to prevent the release of the lantern structure when the eliminating lever is up. In a certain sense the part 214 is superfluous, being in the nature of a duplication of the operation and function of the hook which holds stop 144 and the machine can be operated without this additional safeguard.

When the eliminating lever is up in its active position, the swinging arm 209 has a lug on its rear edge forced in under a stop shoulder 218 formed in the front edge of the adding and subtracting lever plate. The result being that this plate is locked in the adding position, this being the position in which the numeral wheels are out of mesh with their segmental racks and also the position in which the total lever and the sub-total lever are locked in their normal position by the cross link 164. In other words, it is not possible to disturb the normal setting of either of the total levers while the eliminating lever is in its upper or operative position. A total in the machine is thus protected and cannot be changed or eliminated.

It will be seen that the adding and subtracting lever L works through a bell crank 219 pivoted on shaft 176' to move a link 220 rearwardly, this link being pivoted at 184 to plate 185 and serving to force that plate down into the path of the plate 186 to lock the machine while the adding and subtracting lever is being shifted, so that the machine is locked when either the adding lever or the total lever, or the repeat lever or the eliminating lever is being shifted. All of these locking mechanisms work through the downwardly extending arm 267 of plate 185 to control the effective connections between the motor and the machine, as hereinafter explained. Thus the machine is locked whenever any control is being shifted.

*Printing special characters.*

Referring to Fig. 9, an explanation may now be made of the means used to control the printing characters such as the minus sign, the total sign, etc. As previously explained in connection with the printing mechanism, these characters are arranged in a row on a swinging type-bearing head just as if they were numbers and that type-bearing head is carried on an arm which is driven through a slip joint from the main rock shaft 69 of the machine.

As the parts appear in Fig. 9, this character arm C, appears at the extreme left of the figure and its coöperating stop nose lever SN projects forward toward the front of the machine where it is in position for coöperating with a large sliding plate 221 having a series of notches 222, any one of which may serve as a stop for the stop-nose, provided plate 221 is drawn forward far enough. This plate 221 is connected up with the eliminating lever EL and with the subtracting lever L and with the total lever TL and with the sub-total lever STL, so that by operation of any one of these, the plate will be moved over far enough to allow some movement of the stop nose SN. Movement of the eliminating lever will shift plate 221 so that the stop-nose will enter as far as the first notch, operation of the subtracting lever will shift the plate to bring the stop-nose into the second notch, operation of the total lever will put it in the third notch and operation of the sub-total lever will put it in the fourth notch. The connections between the eliminating lever and sliding plate 221 comprise a roller 223 secured near the lower edge of plate 221 and movable by means of a bell crank 224 pivoted to a suitable support and having its upper end engaging with a lug 225 carried on the side of the long link 210, the rearward movement of which is effected when the eliminating lever EL is swung upward into active position.

The connection between the adding and subtracting lever L and the sliding plate 221 is brought about through the swinging movement of the long rock lever 132, for that rock lever carries at its lower edge, somewhat in front of its point of pivotal support, a downwardly extending cam face 226, which on the upward swing of the front end of that lever presses against a roller 227 carried on the lower end of a slide plate 228 bolted to the inner face of the slide plate 221. This movement is sufficient to shift the plate over two of the notches at the stop-nose. When the total lever TL is swung forward to take and print a total and clear the machine, it exerts a forward push on a stop 229, positioned at the upper edge of plate 221. This result is obtained through the action of an irregularly shaped plate 230 pivoted at 231 to the total lever and having its lower slotted end fitted over a pin 232 projecting from the side of the sub-total lever. Then as the total lever is swung forward without movement of the sub-total lever, this plate 230 will rock on its pivot and will also swing forward, the result being a forward push on the stop 229 by the upper face 230' of the plate 230, moving plate 221 a distance equal to three of the notches for the stop-nose. But if it happens that the sub-total lever be swung forward simultaneously with the total lever as when the machine is to print its total and retain the total in the calculating wheels, then as the forward movement of the sub-total lever swings pin 232 forward, the total lever goes with it, plate 230 does not rock and strikes lug 229 with its end 230" moving plate 221 back a distance of four notches.

The slide plate 221 may be held in place in simple manner, as by means of a button 233 riveted to a frame plate 234, the lower edge of plate 221 being held behind the head of a stud 235 and the front end being held and guided by the head of a stud 236. To dismember the machine, the plate may be drawn forward and slipped off over the head of stud 236.

The frame plate 234 is of irregular outline, as shown in Fig. 9 but fits in over the transverse frame bars 60, 61 and 62 and is removable therefrom in much the same way as the key-board sections. The retractive movement of plate 221 is effected by a coiled spring 237, which has one end fastened to the frame plate 234 and the other fastened to the side plate 228, which is riveted to the sliding plate 221. This spring draws the plate back into normal position, as soon as that plate is released by appropriate movements of the eliminating lever or the adding lever or the totaling levers.

*Controlling the zero stops.*

This same figure also illustrates the mechanism used for controlling the zero stops in the key-sections. This mechanism comprises a plate 238 pivotally mounted at 239 and having feet 240 and 241 to act as stops in limiting the upward or downward swing of each end of the plate by striking against cross bar 174. Beyond the key-board section on the other side of the machine is a similar plate 238' and these two plates serve as supports for the cross bars 56 and 37. Cross bar 56, which is carried at the rear ends of plates 238 and 238' operates as indicated in Fig. 3 to drop plate 54 and disconnect the zero stop from the key-board immediately after the stop nose has struck that stop or has passed it, thereby preventing a delayed release of the stop nose in case a key is depressed during the forward swing of the machine and later, after the backward swing is nearly completed, it serves to lift the vertical plate 54 and to withdraw the zero stop. This is useful in those special cases where a key has been depressed during the backward swing and before the machine has returned completely to normal, thus holding the zero stop back so that the forward swing can be begun immediately. If no key has been depressed on the backward swing, the upward movement of bar 56 will reset the zero pin and reconnect it through link 47 with the key-board so that subsequent depression of a key may withdraw it.

It is the function of the cross bar 37, as shown in Fig. 3, to lift up on the rocking links 34 and thereby disconnect the correction keys CK from the releasing plates 20 while the machine is turning over.

The rear end of this rocking plate 238 is normally pulled downward by a coiled spring 241' and the downward swing is controlled by a stud 242 projecting from the side of the disk 243 mounted on the main drive shaft 155, so that as this disk 243 begins its forward swing, the stud 242 drops away from plate 238 and allows the cross bar 56 to drop and these parts remain in that condition until the return swing of the plate, when the stud 242 again lifts the adjacent end of the rock plate 238. This lowers and raises the sliding link 54 to control the zero stop in the manner and for the purpose heretofore explained.

*Driving the printing mechanism.*
(Figs. 9, 21 to 24.)

The means used for driving the printing mechanism from the main power shaft comprises a pair of pushers 245 and 246 pivotally mounted along the lower edge of the disk 243 and guided at their rear ends in a supporting structure 246' in such a way, that pusher 246 may engage one pin of a rotary lantern 246 and pusher 245 can engage the next pin. As the result of their coöperative action, pusher 246 gives a slight turning movement to the lantern and then reaches the dead center point with respect to shaft 155 and so remains practically stationary while pusher 245 is coming up to give a quick thrust to the next pin of the lantern. These two pushers thereby give an intermittent movement to the printing X bar of the printing mechanism and bring about the alternate release and positive retraction of the hammers of the printing mechanism.

The motor drive.

(Figs. 8, 42 to 45.)

The motor drive for the particular embodiment disclosed in the present drawings, includes an electric motor 247 having its armature shaft connected through a worm 248 and worm gear 249 inclosed in a cup-shaped housing 250 bolted to a supporting plate 251, which is carried by a casting 252 depending from the base 1 of the machine.

The worm wheel 249 is keyed to a tube 253 and serves to turn that tube in the bearings of castings 250 and 251. One end of that tube carries a ratchet 254, which turns continuously so long as the motor runs. This ratchet serves as the driving element for the machine, the driving connection being established through the aid of a pawl 255 which can be released to catch into the ratchet wheel 254 and hold on until the pawl and all the parts connected with it have swung around through one complete revolution and have come back to their starting point. The pawl is made to grab into the ratchet 254 by means of a swinging lever 256 pivoted at 257 and having its upper end connected by a link 258 with the lower end 259 of a rock lever pivoted at 260 and having its forward arm 261 pivotally connected with one of the push rods 262 of the tripping rail R. The other push rod 263 of the tripping rail is connected through a bell crank 264 and through a link 265 with the lower end of the rock lever 259, thereby equalizing the action of the tripping rail. The rearwardly extending arm 266 of the rock lever pivoted at 260 reaches through into the machine (Fig. 8) in position to serve as a lock for the downwardly extending arm 267 of the swinging plate 185, the result being that after the tripping rail R has been pushed, the locking plate 185 cannot swing downward to check the forward swing of the machine and similarly if plate 185 has been swung to check the machine (as through incomplete shifting of any of the hand levers at the top of the key-board) it will be impossible to operate the tripping rail. In other words either arm 266 or arm 267 can serve as a lock for the other, by swinging across into the path of the other. Each element is thus a safeguard for the other.

Pushing down on the trip rail R swings the lower end of lever 256 out of engagement with a forwardly projecting lug 268 on the crank plate 269 and almost immediately thereafter releases the tail of dog 255 by moving outward beyond the end of it, so that under the action of its spring 270 that dog can catch into the ratchet wheel 254 locking the crank plate 269 to the ratchet and compelling the crank plate to throw over through one complete revolution of the ratchet. The tail of the dog is slightly longer than the tail of plate 269. The crank plate 269 is mounted on a tube 269' housed within the rotating tube 253. This is just a convenient way of getting a bearing surface for the crank disk support. But inasmuch as the worm gear ordinarily would run continuously in oil, its supporting tube may be perforated to permit entrance of oil between the tubes to give constant lubrication of the crank disk support. Pivoted to the crank plate at a crank pin 271 is a pitman 272 which reaches up into the machine, as shown in Figs. 8 and 42 and there is pivotally connected to the lower end of the main swinging plate 154 of the machine. During this rotary movement of the crank plate, the crank pin 271, which carries a roller 273 swings around and strikes against a curved lever arm 274 swinging that arm rearwardly. The arm is rigidly mounted on a rock shaft 275 which also carries another lever arm 276, having pivotal connection at its rear end with the push bar 200 of Fig. 8, whereby the periodical rocking of shaft 23 is effective at mid-stroke to shift the releasing plate 20 rearwardly and release all the key-stems so that they may return to normal. The arm 276 has a forward projection serving as a stop, by engagement with a stud 277, thereby limiting the swing of shaft 275 and its arms 276. When the crank disk 269 has made one complete revolution, the lever 256 will be in position to act as a stop and will serve, first to unlatch the dog and almost instantly to strike against the projection 268 of the crank plate, thereby checking further movement and holding the crank at its dead center with respect to the load. If the operator holds trip rail R down, the crank disk will continue to rotate and the machine will repeat its operations. A spring pressed latch 278 may be provided for catching the crank to prevent it from slipping back because of any tendency to rebound. This latch has a downwardly extending arm 279 bearing against a stud which serves to limit the upward swing of the latch. The coil spring 278' serves a double purpose of yieldingly holding up latch 278 and yieldingly holding down arm 266 whereby the tripping rail is held upward and the latch 256 in position to engage with crank plate 269.

With this mode of driving the machine from the motor, the travel is from a dead center back to that same dead center, and as the result, the load comes on the motor gradually and the speed of travel within the calculating machine builds up gradually and the motor is disconnected from the machine after the calculating parts have been returned to a substantially stationary position, through slowing up of the mechanism as the crank approaches again the original dead center. No cushions or dash pots are required and the connection between the motor and the calculating mechanism is positive and direct. This mode of driving, insures a full stroke of the mechanism, thereby effecting complete return of all parts to normal at each stroke.

The worm drive in addition to driving the ratchet for turning the machine, also has connections for driving the carriage and particularly for shifting the carriage longitudinally with an intermittent motion, so that different groups of figures can be printed in parallel columns on the strip of paper.

Figure 44:
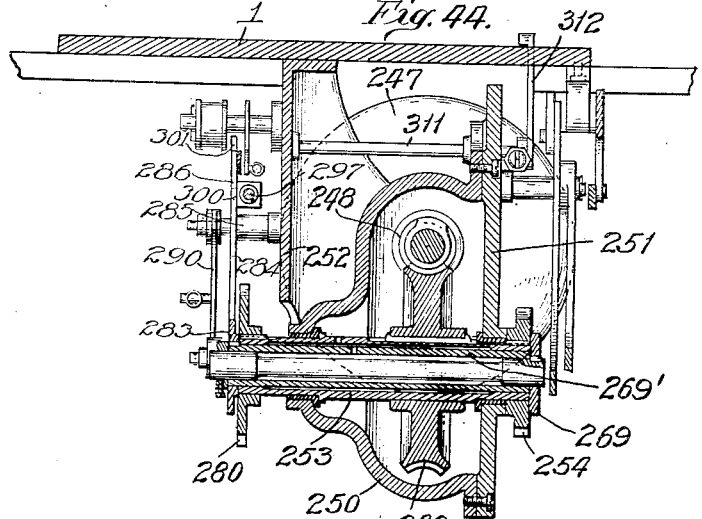
Fig. 44 is a transverse section through the worm gear drive showing the concentric tubes whereon are mounted the ratchet wheels, one used for connecting the motor to drive the calculating mechanism and the other used for connecting the motor to shift the platen carriage.
Figure 45:
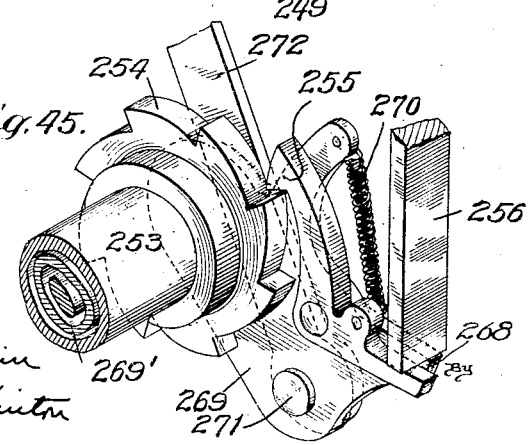
Fig. 45 is a perspective view of the ratchet and clutch mechanism on the right hand side of the machine, whereby the motor is connected in to drive the calculating mechanism.

*The carriage driving mechanism.*
(Figs. 46, 44 and 47.)

On the rotating tube 253 at the end opposite from that used to turn the machine over, is a second ratchet 280 which is used to shift the carriage longitudinally. Coöperating with this ratchet is a dog 281 which can be thrown in to grip the ratchet when the shift is to be made. This dog operates in essentially the same way as the dog used for turning the machine over and has a rearwardly projecting tail 282 adjacent to a similar projection from the crank disk 283, these projections being in position for engagement with a hook 284 pivoted to swing from a stub shaft 285 and having an upwardly projecting arm 286 connected through a link 287 with a similar arm 288 carrying another stop 289. For shifting the carriage, the crank disk 283 makes one-half a revolution at each shift, the carriage traveling to the right for a half turn of the crank disk and then coming back to the left for the next half turn of that disk. Spring catches 290 and 291 may be relied on to hold the crank disk at its dead center, thereby preventing it from swinging back because of the weight of the connected parts, or because of any rebound or vibration.

The crank disk 283 is pivotally connected with a pitman 292 which is pivoted to a rock lever 293 carrying a connecting rod 294 working through a bell crank 295 to shift the carriage driving pin 296 back and forth along the line of travel of the carriage. When the carriage is in place, it has a link connecting with this pin 296 and its longitudinal movements are controlled thereby As a means for governing the action of the dog 281, I make use of a push rod 297 pivoted to the rock lever 293 and carrying a pair of coiled springs 298, 299 adjustable in tension and both bearing against a pin 300 of the swinging arm 286. When the carriage is in one position, spring 298 is compressed and when it is in the other position spring 299 is under compression. With the elements in position, as shown in Figs. 46 and 47 spring 298 is under compression tending to force the hook away from the tail of dog 281 and tending to force stop 289 inward to a striking position, but movement is not possible because of engagement between a little lug 301 on the extreme upper end of arm 286, and a pair of lugs projecting downward at 302, one of which is mounted to swing with a rock lever 303 pivoted at 304 and controlled in its movement by a coiled spring 305, a limit stop 306 and the push rod 307, which rod runs up to the top of the key-board and terminates at its upper end in the carriage-lock wing-piece CL. When CL is down the carriage shifting mechanism is locked at 302 and no shifting can occur, but when it is up, one of the stops at 302 is out of position and movement of the carriage will be governed by the raising and lowering of the other stop. This other stop is carried on a swinging arm 308 pivoted at 304 and controlled by a coiled spring 308', the free end of this arm carrying a roller 309 which bears against a swinging arm 310 mounted on a rock shaft 311 which goes through to the other side of the machine, as shown in Fig. 8 and which terminates in an upwardly projecting arm 312, the extreme upper end of which is bent over to lie in the path of arm 267, so that at each forward swing of arm 267 (resulting from the downward swing of the locking plate 185) there will be given a slight rotary movement to rock shaft 311 (each time any of the control levers is manipulated) and this slight rotary movement of shaft 311 is sufficient to lift arm 308 and allow stop 301 to swing by to the other side of its coöperating stop at 302, thereby unlatching the dog 281 and connecting in to the motor and so shifting the carriage across to the other side.

In case it is desired to shift the carriage, without changing from additions to subtractions or vice versa, it is only necessary for the operator to lift the control lever L or the totaling lever TL for a small fraction of its complete throw, allowing it to snap back without completing the throw. This has the effect of unlatching the holding means for the carriage pawl and so allows the carriage to be shifted over to the other side, leaving the control mechanism at the key-board in the same setting as before.

In placing debits and credits in separate columns on the printed record, the machine of my invention makes the shift from one column to the other, preparatory to the printing of each item, this action being entirely automatic and calling for no thought on the part of the operator, other than that of seeing that the control levers are set to add or subtract as the items are being put into the machine.

This carriage shifting mechanism is powerful in operation and certain in its action both forward and back and inasmuch as the weight of the carriage to be shifted, may be relatively great, particularly in machines of great capacity and used especially for tabulating, there is afforded ample power for making the shift with the proper speed and with certainty and without overloading the motor or subjecting the calculator to undue disturbance or in any way interfering with the normal use of the motor as the driving means for the calculating mechanism. The carriage shifting mechanism puts on the load at a dead center and takes it off at a dead center, so that as far as concerns the motor, the load comes on and goes off without shock. No cushioning or dash pots are needed.

*Over draft mechanism.*

The over-draft or limit (Figs. 10, 40 and 41) locking mechanism is used to lock the total mechanism to prevent taking a total when more has been subtracted out of the machine than has been put in, or in other words when the accumulator falls below zero, and this locking mechanism remains effective to prevent total taking until after enough has been added into the machine to bring it back again from beyond its limit onto the working range of the accumulator.

Also the over-draft mechanism, through action on the right hand hammer of the series of hammers prints on the record at the side of each subtracted number, a character showing that the machine is in over-draft position. This character does not appear after amounts added in, and is not necessary as such additions tend to correct the over-draft condition and tend to bring the machine back to its normal working range.

This over-draft mechanism is also so adjusted that after additions have been made sufficiently to build up a total in which the last accumulator wheel is loaded to its capacity, the total taking mechanism will become locked and no total can be taken until the calculator has been returned from this abnormal state.

This over-draft mechanism shown in Figs. 10, 40 and 41, comprises a trigger 320 pivotally mounted at 321 and having its outer free end positioned under the numeral wheels and carrying a platform 322 lying in the path of the cam 323, which in appearance and position is like the cams 80', but which has a function quite different.

The other end of lever 320 has its upper edge bent over horizontally to form a stop 320' which normally lies in the path of the upper end 324 of a swinging arm 325 mounted to swing on a frame stud 326 and having its front edge formed into a shoulder at 327 as shown in Figs. 10 and 40 to bear against the lantern structure which swings about shaft 82 as a center.

Unless the last number wheel and its cam 323 is in the "9" position the lever 320 will have its stop 320' in the path of the upper end 324 of lever 325 and lever 325 cannot swing forward as the lantern structure rotates. But in case of repeated additions until the total has increased so far that the last numeral wheel is in the "9" position, the cam 323 pushes down on platform 322 of lever 320 and unlatches arm 325, allowing that arm to swing forwardly toward the key-board as the plate 82' comprising one end of the lantern structure is rotated, and by so doing, turn on stud 326. But pivotally mounted on stud 326 and off-set somewhat with respect to lever 325 but swinging therewith, is a downwardly extending arm 328 controlled in its movement by a coiled spring 329 (Fig. 10) and being pivotally connected at its lower end to a link 341, a mere fragment of which appears in Figs. 10 and 40 and the main body of which shows in the drawing of the hammer section, Figs. 22 and 23. It runs rearwardly for connection to a crank arm 342 on a shaft 343 having bearings in plate 107' of the printing section. Shaft 343 carries a horizontal crank arm 344, the rearward end 345 of which serves as a stop for finger 346 integral with the last pendulum member 121 on the left, which particular pendulum member has its upper end cut off so that it does not have the upwardly extending stop 121'. The link 341 is on the left hand side of the machine, but the rock shaft 343 crosses over through the printing mechanism from one side to the other so that the danger signal is printed to the right of the subtracted item. The action of these parts is such that link 341 is pushed rearwardly through the effect of adding into the machine enough numbers to make the last numeral wheel show a "9" and the resulting release of the pendulum 121 will operate as previously described to hold the stop plate 117 in its down position and so will allow lug 116 to clear stop 118 thereby permitting the hammer to strike against the type, and the type in this instance is a single type member 347, Fig. 24, carried at the end of a stationary bracket 348, bolted to the side member 107 of the hammer section. The net result is that in case the calculating section is reaching almost its full capacity, the over-draft or limit character will appear on the paper as a warning to the operator.

In case of over-draft, and by this I mean subtracting out from the accumulating mechanism more than there is in it, the carrying mechanism will have the effect of setting the last or left hand wheel at the "9" position, even though but a single cent or unit be subtracted. This over-draft then has the action of bringing the cam point 323 of the last numeral wheel into contact with the platform 322 of lever 320 and thereby through the action of the swinging arms 327 and 328 and the link 341 and its coöperating crank arms 342 and 344 acting in the hammer section to print the overdraft character or signal at the side of the subtracted item.

As stated, the over-draft mechanism also has the function of locking the machine against totaling whenever there is a "9" showing on the last wheel of the calculating mechanism. This result is attained through mechanism now to be described.

Mounted on the side of the swinging arm 328 (Fig. 10) is a roller 349 which controls the movement of the upper arm 350 of a bell crank pivoted at 351. The lower end of the bell crank consists of a hook 352 which can engage the front end of a swinging latch arm 353 pivoted at 354 to a stationary frame stud, this latch arm 353 being riveted to a swinging arm 355 connected at 356 to the slotted end of a long horizontal link 357 which extends forwardly along the base plate of the machine and terminates in an upwardly curved portion pivoted at 358 to the upper end of a crank 359. This crank is rigidly mounted on a rock shaft 360, which also carries a downwardly extending arm 361 to serve as a stop when it strikes the bottom plate of the machine. Shaft 360 carries in addition to the arm 359 a similar upwardly extending arm 362 (Fig. 8) the upper end of this arm being notched at 363 so that it can swing in under a stud 364 carried on the forward edge of the control plate of the total lever TL, thereby to serve as a lock for the total lever, preventing the operator from throwing that lever under certain conditions of the over-draft mechanism.

The energy necessary for shifting the long horizontal link 357 (Fig. 10) to throw in the lock for the total lever is furnished by a little coiled spring 365 located at the extreme lower and rear corner of the machine, as shown in Fig. 10, the spring there being shown as broken away at its middle, but having its rear end attached to a frame stud 366 and its front end attached at 367 to an arm 368 pivoted at 369 to the crank arm 355. The forward end of arm 368 can slide back and forth over the adjacent cross member of the machine and it is the full function of this member 368 to furnish an anchorage for the coiled spring 365 and to permit the use of a long spring.

It follows that when the machine enters the overdraft condition, the stop 349 will swing the arm 350 to unlatch hook 352 and the backward movement of the long horizontal link 357 will lock the total lever TL against movement until the machine has been returned from its over-draft setting. After the calculating section has returned from its over-draft condition, the first full operation of the machine will unlock the total lever so that the total can be taken. This result is attained through mechanism, which will now be described.

The main drive shaft 155 of the machine carries the control plate 154' and pivoted to the side of this control plate is a long upwardly inclined link 370, the rear end of which is pivoted at 371 to the upper end of a rock beam 372, pivoted to swing about the center 354 and carrying at its lower end a stud 373 positioned to swing forwardly and strike against arm 355 working against the tension of the big spring 365 and serving to swing latch 353 upward into engagement with the hook 352 so that after the hook has been released by an upward swing of arm 329 (this result being attained by return of the over-draft lever 320 to normal) the hook 352 will latch under the arm 353 and hold all the parts in normal position with the total lever TL free.

As stated the machine will not take a total when in the over-draft position or when so much has been added that the last or left hand numeral wheel stands at "9", but can take a total immediately on return from either of those extremes, though as the machine comes back to zero on the first operation after an over-draft, it must be turned over once before the total can be taken.

*Ribbon shift.*

(Figs. 28 to 40.)

The printing ribbon of this machine is fed across automatically in front of the printing type and after it has been nearly unwound from one spool, is automatically reversed in direction, to unwind from the other spool. Also means is provided for gradually lifting both spools and their associated mechanism through a substantial distance and then lowering it again so that the type impressions will be scattered on the ribbon and so that maximum use may be had without renewing ribbons. The ribbon carrier mechanism is a unit in itself, readily detachable from other parts of the machine and connected in for operation through swinging arms which can be pulled away from their associated parts when the ribbon carrier is to be taken out of the machine.

Power for unwinding the ribbon comes in to a swinging arm 374 (Fig. 28) through a recessed block 375 which fits over a lug on the member 372 (Fig. 40) that member having a to-and-fro motion, each time the machine turns over. This arm 374 is pinned to the lower end of a vertical rock shaft 377 (Fig. 33) the top end of which is provided with a crank arm 378 (Fig. 34) to which is attached a link 379 extending across to the opposite side of the ribbon carrier and there connected with a corresponding crank arm 380 clamped to another vertical rock shaft 381. The result is that when power comes in from the machine through the swinging arm 374 to move that arm back and forth at each movement of the machine, both of the vertical rock shafts 377 and 381 swing equally through a small angle. Mounted to turn on each of these rock shafts is a ribbon carrying spool made up of a central hub 382, a top flange 383 and a bottom flange 384, the top flange making frictional contact with one end of a leaf spring 385, the other end of which extends across to form a bearing for a vertical guide roller 386 over which the ribbon 387 passes in going from one spool to the other. Below the lower flange 384 of each drum and normally free to turn with respect thereto, is a gear 389 which comes into action whenever the direction of ribbon movement is to be changed and as a means for bringing this gear into action, there is provided on each spool, a swinging flap 390 over which the ribbon is wound. This flap carries at its lower end a finger 391 projecting down through a slot in the spool flange 384 and engaging with one end of a pawl 391', the toothed end of which is spring pressed (see Fig. 32) to engage with the teeth of gear 389 when the ribbon has been unwound from the spool down to the last turn, or far enough to release flap 390 and so release the free end of the pawl and allow its working end to engage with the gear teeth.

It should be explained that the movement of the spools in one direction or the other, is brought about by a pair of swinging plates 392 and 393 pivoted respectively at 394 and 395 to the arms 374 and 380 and each serviceable as a pawl to permit forward movement of its own spool, but under certain conditions to prevent return movement thereof. These swinging plates are so connected that only one of them is working at any particular time. Each swinging plate is provided with a coiled spring 396 so that it yieldingly engages in the notched edge of the lower flange 384 of its spool and since the pivotal support for plate 392 moves with the swinging arm 374 and the pivotal support 395 of the other plate 393 swings with a similar arm 374', one or the other of the swinging plates can serve to push on the notched edge of its spool flange and thus advance the ribbon in one direction or the other at each swing of the machine. These swinging plates carry tails provided with rollers 397 and 398 which bear against the edge of a long sliding plate 399 having notches at 400 and 401 to serve as cam faces to govern the position of those rollers and thereby to govern the setting of the swinging plates. This long sliding plate 399 shifts longitudinally each time the ribbon has been completely unwound from one or the other of the spools, the shifting movement being induced by a connecting bar 402 connected to a swinging arm 403 which is pivoted at 404 and is shifted with a quick snap by the mechanism now to be described.

When the ribbon has been unwound from a spool down to the last turn, the flap 390 will release and its finger 391 will allow pawl 391 to grip gear 389 and further movement of the spool will cause rotation of that gear and consequent rotation of another gear 405 meshing therewith. Gear 405 is on a shaft 406 to which is splined a drum 407, (Fig. 34) carrying one end of a chain 408, which passes over a sheave 409 (Fig. 28) and around a winding drum 410 to which it is attached. The chain continues over sheave 409' and is similarly attached to another drum (similar to drum 407) adjacent the opposite spool. Rotation of gears 389 and 405 therefor causes rotation of drum 410, either in one direction or the other in accordance with the direction of movement of the ribbon. Immediately below drum 410 is a cam disk 412 free to turn about the pivotal center 413 of the drum and having a cut away portion 412' by means of which it is controlled in its movement by a stud 414, positioned at the pivotal connection between two swinging arms 415 and 416, the former of which swings about center 413 below cam disk 412 and the latter of which swings about the stud 417 and is slotted to move longitudinally with respect to that stud and has a spring 418 impelling toward the cam plate 412 which it serves to govern. Stud 414 under the impulse of spring 418 bears against the end of a slot 419 in drum 410 and when that drum rotates is pushed back against the tension of spring 418 until it passes the dead center line with respect to the centers 417 and 413 and then jumps to the other end of slot 419 and so gives a quick throw to arm 415 and a quick snap to cam plate 412. This cam plate 412 has a working face 420 which can pass into contact with rollers 421 and 422 mounted on pins projecting from the plate 403 which swings about pivot 404 to move bar 402 when plate 399 is to be shifted. The swinging of cam plate 412 swings arm 403 and shifts plate 399 and cam faces 400 and 401 shift with respect to their rollers, releasing one of the spool engaging plates and throwing the other into action. This reverses the direction of movement of the spools and so winds up the ribbon the other way and thus the ribbon will automatically wind up and unwind, and the shift from one spool to the other is made with a snapping movement and the ribbon never has a chance to get slack, even at the instant of reversal.

In addition to the unwinding of the ribbon from either spool, it has an up and down movement to bring all parts of it equally into use. This up and down shift is effected through an arm 423 Fig. 40, which in the normal operation of the machine is given a slow up and down movement by means of a cam 424 moving with a ratchet 425, the rotation of which is effected by means of a pulling bar 426 pivoted to the rocking plate 372 which swings about center 354, at each operation of the machine, as heretofore explained. Arm 423 is attached to one end of a rock shaft 429 Fig. 28 and that rock shaft carries a pair of arms 430 each of which projects forward toward one of the spools and is connected through a link 431 to a plate 432 (Fig. 33) which underlies the corresponding ribbon spool, thus when the rock shaft turns, the toggle pushes up on plate 432 and moves the spool progressively along its supporting shaft 377 sliding it slowly up and down to change the relative position of the ribbon and the type. The ratchet plates 392 and 393 are broad enough to engage with the notched lower disk of the ribbon spool, irrespective of its altitude and so need not be raised and lowered, but substantially all of the other parts of the ribbon carrying mechanism move with the ribbon in response to the shifting of arm 423 and its associated toggle connections.

Carriage mechanism.
(Figs. 35, 37, 46, 49.)

Figure 52:
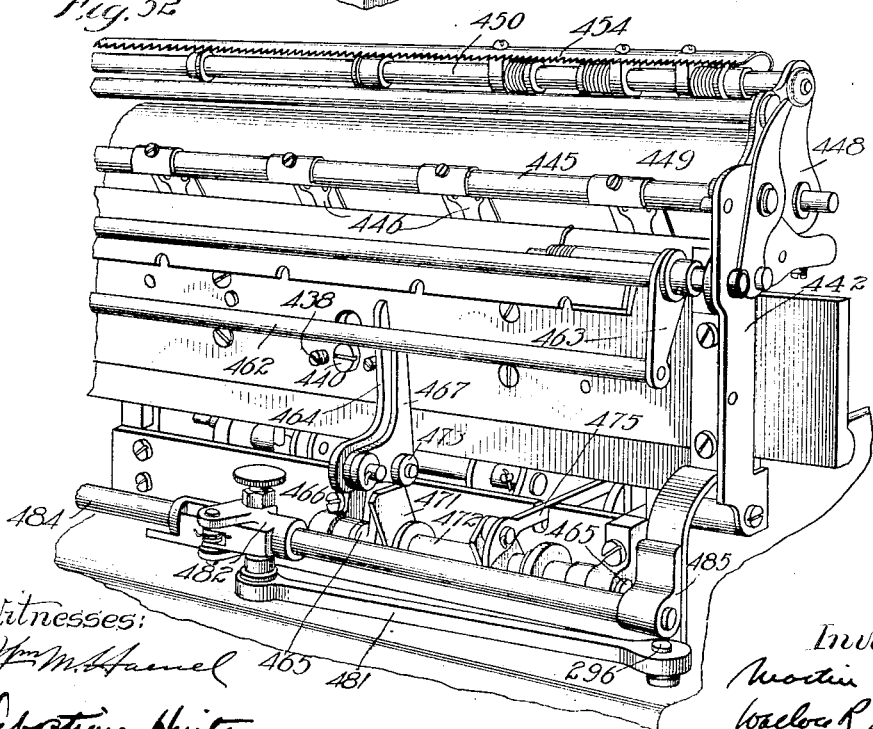

A carriage for the platen and the rolls of paper is positioned at the rear end of the machine and is slidingly mounted on ball bearings, the balls of which run in grooves cut in the top and bottom edges of a supporting plate 433 from which the entire ribbon shifting mechanism is supported by means of a pair of brackets 434 and 435 each held in place by a pair of screws 436. The supporting bar 433 is detachably connected to one of the round frame members of the machine by means of a screw 440 engaging lug 437 which has a slight possible swinging movement on its supporting bar. There are provided two adjusting screws 438 and 439 (Fig. 52) which can be forced in against the cross bar, after first releasing the main screw 440, the result being to swing the entire carriage about the supporting cross member as an axis, thereby adjusting the contact at the platen roller, which, as will appear from Fig. 34, has its contact face positioned above the carriage supporting cross member of the frame.

Figure 51:
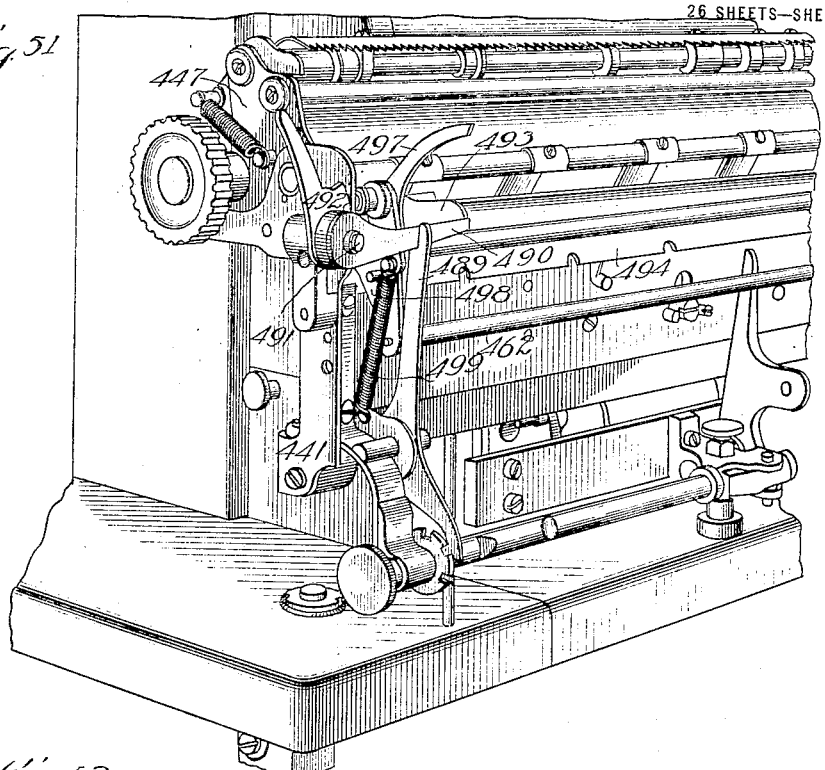
Figs. 51 and 52 are perspective views of the sliding carriage and its coöperating parts as seen from the rear of the machine with the detachable paper support removed.

The carriage includes end plates 441 and 442 and these are connected together by upper and lower bars 443 and 444 each of which is shaped to serve as a ball race for the bearing. At the top, the end plates 441 and 442 are connected by a shaft 445 carrying adjustable resilient guide fingers 446 and serving as the pivot about which the platen frame may swing. The platen frame comprises end plates 447 and 448 (Figs. 51 and 52) serving as bearings for the shaft of the platen 449 and swinging upward about shaft 445 as a center when the platen is to be lifted away from the printing ribbon. These platen end plates also serve as supports for a stationary bar 450 which supports a plurality of spring pressed swinging arms 451 at the lower end of which is a cross bar 452 carrying a plurality of short rubber rollers 453 which normally press yieldingly on the paper strip. Rigidly positioned above bar 450 is a paper cutting knife 454.

Platen shifting mechanism.
(Same figures.)

As a means for rotating the platen forwardly at each stroke of the machine, there is provided a ratchet 455 with a driving finger 456 actuated from a swinging center 457 and held to its work by a spring 458. This swinging center is on a rock arm 459 which oscillates about a center 460 against the tension of a spring 461 and carries at its lower end a cross bar 462 which passes across to the other side of the carriage and is there attached to a swinging arm 463. Suitable outward movement of cross bar 462 at each operation of the machine, swings plate 459 and so forces ratchet wheel 455 around a proper distance. The means for producing the periodic outward swing of bar 462 comprises a finger 464 pivoted to swing with a rock shaft 465 and carrying on its side and pivoted at 466, a supplementary finger 467 which comes into action only when a total is to be taken and when a double space is needed on the paper so that the printed record may conform in appearance with records now common. Rock shaft 465 is slung from suitable brackets 468 and each time the machine turns over, is rotated by means of the forwardly projecting arm 469 which reaches forward into contact with a pin 470 carried on the swinging plate 372 (Fig. 40), the oscillations of which, as previously recited, actuate the ribbon shifting mechanism through the swinging block 375 and the swinging arm 374 and also through the action of finger 426, shift cam 424 to raise or lower the ribbon. But when a total is to be taken, the auxiliary finger 467 is brought into action by means of a swinging cam plate 471 mounted on a sleeve 472 carried by rock shaft 465 and engaging a roller 473 carried on the auxiliary finger 467. Sleeve 472 can be turned by means of a crank 474 actuated by a link 475 which reaches forward as shown in Fig. 40 for rock connection with a pin 476 carried on a swinging arm 477 pivoted at 478 and actuated by a link 479 which extends forward along the base 1 of the machine for connection to the total taking mechanism at rock shaft 26. The result is that when the machine is set to take a total, the auxiliary finger 467 will give bar 462 a shift corresponding to one space on the platen and then when the machine turns over to print the total, the main finger 464 will be swung in usual manner and in so doing, will swing the auxiliary finger 467 outward by still another roller 473 rolling on cam 471, thus giving a double space on the printed record. On restoration of the total taking mechanism to normal setting, the auxiliary finger 467 will be shifted back into its original position through the action of spring link 480 on link 475.

The mechanism whereby the carriage is shifted on its ball bearings from one side to the other across the machine when the pin 296 (Fig. 52) is swung back and forth by the motor and its clutch connections, includes a link 481 pivoted to a sliding block 482 having a pair of spring pressed pawls 483 which can engage with notches in a rotatable shaft 484 which crosses the entire width of the carriage and is supported therefrom by depending brackets 485. With the pawls in the notches the oscillatory movements of the link 481 will shift the entire carriage forward and back across the machine. By rotating shaft 484, as by turning the thumb nut 486 at one end thereof, the pawls 483 will slip from their notches and the entire carriage can then be shifted over to bring the pawls into engagement with another pair of notches, thereby changing the range of movement of the carriage and putting the two columns of figures further over on the paper. Accidental rotation of shaft 484 is prevented by means of a swinging arm 486' carrying a lug for engagement with notches in a plate 487 pinned to shaft 484, this arm being maintained in contact with the plate by coiled spring 461, (which serves also to pull down on crank 461' on shaft 460 to reverse pawl 456 after each stroke thereof) and swinging about a center 488. Also swinging from center 488, is an arm 489 (Fig. 51) the upper end of which serves as a retaining finger for an arm 490 swinging about a center 491 and rigidly attached to a thumb piece 492. It is a function of this arm 490 to govern the position of a swinging arm 493 rigidly attached to a notched swinging plate 494 pivoted to swing about a center 495. It is the function of this plate to swing down against the rear of the stationary supporting plate 433 there to engage with suitable pins 496, (Figs. 34 and 39) to lock the carriage against shifting movement and in order that this lock may be effective, it is necessary to rotate the cross bar 484 far enough to disengage the pawls 483 from the notches, thereby freeing the block 482 so that it may slide back and forth along the bar without producing movement in the bar.

Supported at the side of arm 493 is a finger piece 497 rigidly attached to the swinging arm 498 which supports the spacing bar 462 so that it is possible for the operator to reach across over the machine and by hand shift the platen, notch by notch, as may be desired. The return movements of the spacing bar, whether it is being operated by hand or by the swinging fingers, are effected by means of a coiled spring 499.

Figure 35:
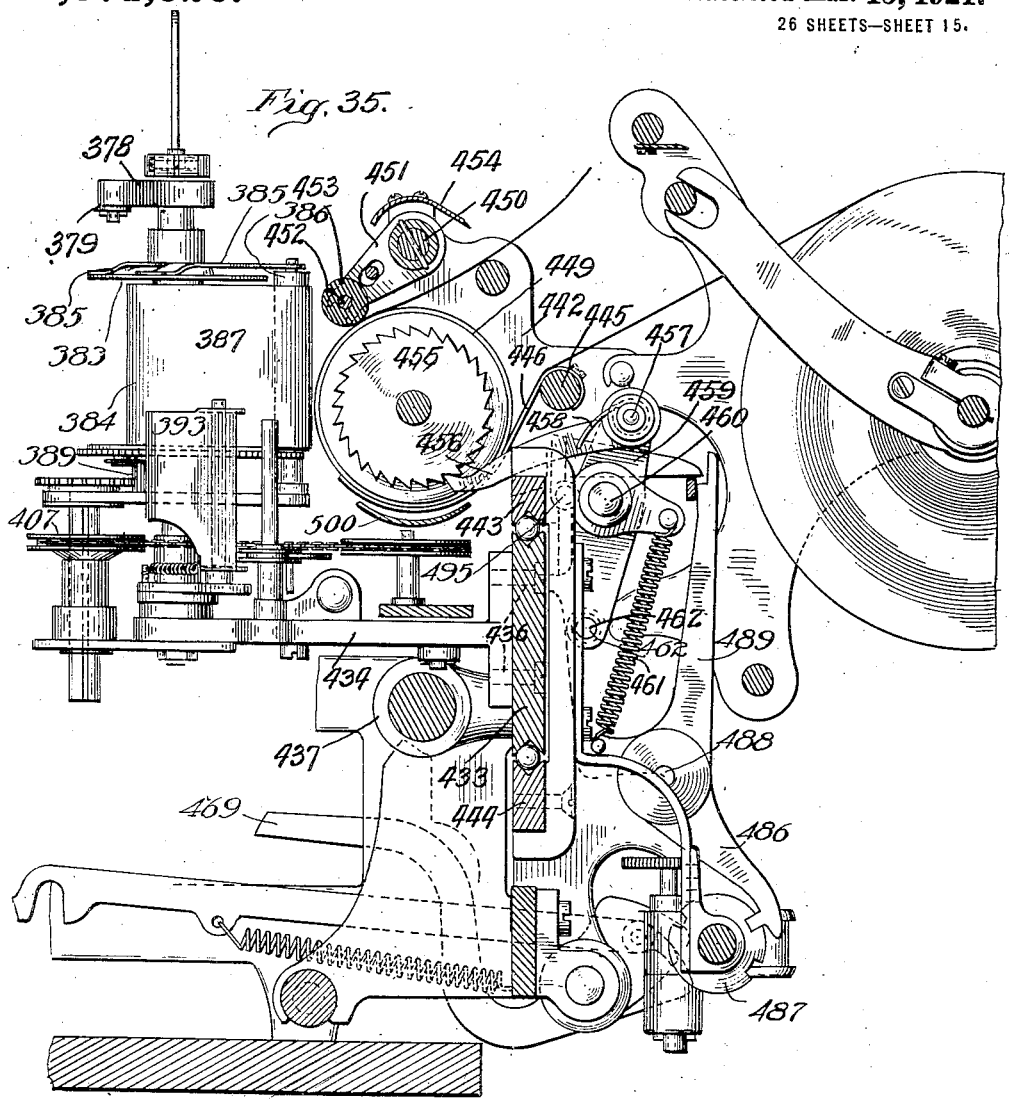
Fig. 35 is a similar section taken on the line C—C of Fig. 37.
Figure 36:
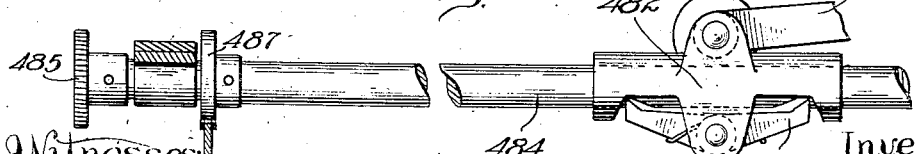
Fig. 36 is a detail of the bar positioned at the lower edge of the platen carriage through which connection is established to the motor so that the carriage may be shifted back and forth at the rear of the machine to print in two or more columns.
Figure 43:
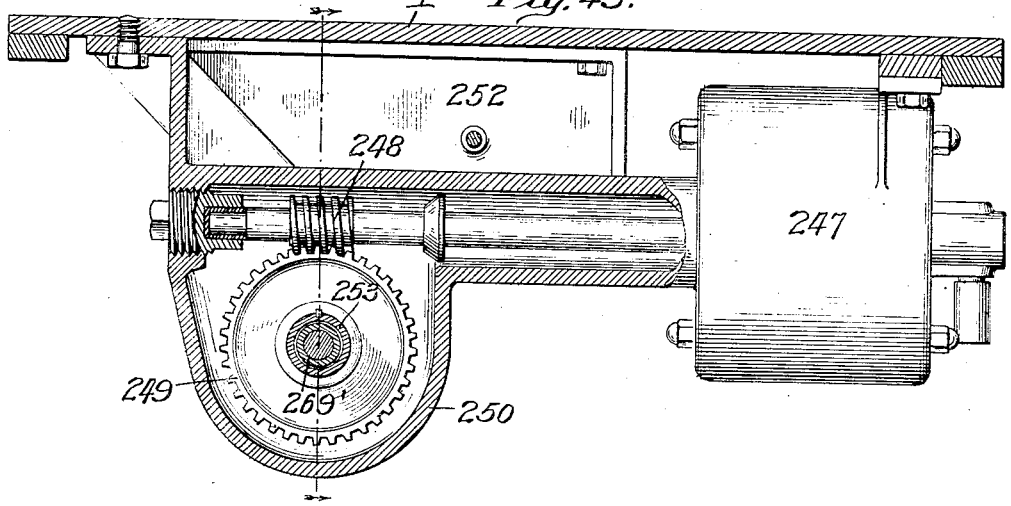
Fig. 43 shows the motor shaft and the worm gear used for reducing the speed.

Supported immediately below the platen is a plate 500 Fig. 35, which is suspended from end plates 501 Fig. 37, one of which is connected through a link 502 to a part of the carriage frame slightly off center with respect to the axis 445 about which the platen swings, the result being that as the platen is swung up to expose the entries last printed, the plate 500 is shifted around by its toggle to bring its upper edge just below the printed entry, there to serve as a guide or ruler extending the entire width of the paper sheet. With the carriage mechanism above disclosed, no spacing stroke need be taken before taking a total, for the total can be taken immediately after any item is in. In many machines it is necessary to take this spacing stroke to re-arrange the carrying lugs before attempting to take total, but with the present machine no preliminary spacing stroke is necessary for anything the machine does. Throwing down the total lever gives the platen a double feed and the automatic shifting of the carriage makes it possible to print the items in different columns and by shifting the point at which the motor driven link connects with the carriage, the position of those columns may be shifted and a single sheet of paper may bear as many as four separate parallel columns.

*Supporting stand.*

(Figs. 48 and 50.)

The stand whereon the machine is mounted for commercial use, comprises four angle iron legs 503 held together at their lower ends by connecting bars 504 and suitably cross braced from similar members 505 at the top of the stand. Inclosed within each leg is a round post 506 carrying a caster 507 at its lower end. The upper ends of these posts are connected rigidly together by cross bars 508 and means is provided for shifting these posts with respect to the frame so that the stand is carried either on the casters 507 or on rigid feet 509 positioned one at each corner of the base. This shifting mechanism comprises short toggles 510 pivoted to bell cranks 511 connected together in pairs by cross bars 512, two of the bell cranks being rigidly connected to a rock shaft 513 provided with swinging arms 514 extending downward and connected by a handle bar 515. With the handle bar down against the legs of the frame as shown in Fig. 50, the bell crank will be in released position and the weight of the machine and its supporting stand will be carried by the feet 509. If, however, the stand is to be moved about the room, the operator in taking hold of the handle 515 and pulling up on it to drag the machine about the room, will lift the frame with respect to the posts 506 and so will lift the weight from feet 509 and transfer it to casters 507. After the machine has been wheeled over to a new location, the release of the handle will immediately drop it onto the feet 509.

The motor control includes a treadle 516 supported from a cross shaft 517 at the rear side of the frame and serving to pull down on a chain 518 which leads to a motor controlling switch of the type shown and claimed in my application, Ser. No. 612,131 filed March 3, 1911, which switch device is so constructed that when the operator steps on the treadle, the motor switch closes instantly and the motor starts, but when the operator releases that treadle to open the motor switch, the opening does not take place immediately but is delayed for a brief interval of time, say a half minute. This delay permits the operator to leave the machine for a moment and he will find the motor running when he returns, but if he stays away for any considerable time, the switch will act to open the motor circuit and stop the rotation of the motor. This mode of control gives the operator the freedom of both hands.

*The duplicator mechanism.*

(Figs. 8, 10, 17, 53 to 57.)

I will now describe the mechanism for taking any number set up on the key-board and storing this number for future re-delivery to the machine. This mechanism I call a duplicator mechanism. In reality it comprises an automatic memorandum whereby the operator may, so to speak, "carry" any number which he has for any purpose once set up on the key-board and may then by shifting a single control, at any time, re-deliver this number to the machine for any operation of which the machine is capable, precisely as if he had again set up the number on the key-board.

In the side frames of the machine in front of the accumulator pinion 63 and alined radially with the shaft 69 carrying the racks and stop-noses, are four studs, two in each side of the machine, one of each pair being shown at 520, and 521, Fig. 54. The stud 520 is seated in a washer 522 counter-sunk into the machine frame and is secured by the screw 523 threaded into the stud 520 and having its head counter-sunk into the machine frame as shown. The corresponding pins 521 upon the opposite side of the machine are similarly mounted. The studs 520 and 521 have apertures therein radially alined with the shaft 69 in which are rigidly mounted by any suitable means, the rods 524 and 525. Slidably mounted upon the rods 524 and 525 is a table structure comprising a pair of arches 526, 526' (Figs. 54 and 57). The arch 526 is sleeved by means of the sleeves 527 and 528 upon the rod 524 and the arch 526' is similarly sleeved upon the rod 525 by means of the sleeves 527' and 528'. Bridged across the tops of these arches and secured thereto by suitable screws 529' (Fig. 17), is a plate 529 having a pair of brackets 530 and 530' in which is mounted the duplicator shaft 531, having revolubly mounted thereon associated pairs of duplicator numeral wheels 532 and duplicator pinions 533, this structure being the same as that of the associated numeral wheels 64 and accumulator pinions 63, fully described hereinbefore. These duplicator numeral wheels are marked $D_1$ to $D_9$ in Fig. 1. Each duplicator pinion 533 has rigidly fastened thereto a plate 534 having formed thereon a stop tooth 535 as shown in Figs. 54 and 17 adapted to coöperate with stop teeth 536 depending from the plate 529 to stop each duplicator numeral wheel at its zero position. The duplicator pinions 533 are alined with the toothed stop-nose arms 70.

Revolubly mounted in the two side frames is a shaft 537 carrying rigidly mounted thereon the cranks 538 which in turn carry pitmen 539 pivotally connected at their lower ends with the shaft 531 upon which are mounted the duplicator pinions and duplicator numeral wheels. Bridged across the side frames of the machine is a bar 540 (Fig. 17) to which is secured by screws, such as 541, the angle bar 542, the angled portion 543 of which serves as a retaining tooth to prevent accidental rotation of the duplicator pinions when the latter are out of mesh with the stop-noses 70, the function of this tooth 543 being precisely the same as that of the tooth 67, previously described. It will be apparent from the description thus far that a partial rotation of the shaft 537 will serve to slide the shaft 531 radially toward or away from the stop noses 70, causing pinions 533 to mesh with stop noses 70 or to be locked by the tooth 543.

I will now describe the mechanism for throwing the duplicator pinions into or out of mesh with the stop arms 70, (Fig. 53). Rigidly mounted upon the shaft 537 is an irregularly shaped plate 545 having thereupon a tooth 546 and a lug 547. Rotatably mounted upon the stud 548 in the side frame of the machine is the plate 549, arc-shaped at its upper and lower edges. This plate has in its lower edge the three notches 549$^a$, 549$^b$, 549$^c$, adapted to be engaged by the tooth 550 on the bell crank 551 mounted on stub shaft 552 and normally held in engagement with a notch by the spring 553 whose opposite end is anchored in a stud 554 mounted in the frame of the machine. Upon the plate 549 are two studs 555 and 556. These studs form guides for the release plate 557 slidably mounted on the studs by means of slots 558 and 559. The plate 557 is normally held up by the spring 560 anchored at its other end to the plate 549 but may be depressed by means of the knurled knob 561, which I have also marked DL to indicate "duplicator lever". The lower end of the plate 557 is arc-shaped to conform with the lower edge of the plate 549, except that it is smooth. It will be apparent that when the knob 561 is depressed, the lower edge 562 of the plate 557 will disengage the tooth 550 from whichever notch it is in and allow the plate 549 to be rocked either to the right or to the left. By this means the plate 549 can be positioned and locked with the tooth 550 in engagement with any one of the three notches. The plate 549 is restrained from excessive movement in either direction by the stud 563 coöperating with the arc-shaped slot 564 therein.

The plate 549, has projecting therefrom the two lugs 565 and 566 (Figs. 53 and 56). Pivotally mounted upon the stud 548 is the rocking plate 567 having ears 568 and 569 thereon radially less distant from the shaft 548 than are the lugs 565 and 566 just described, so that these lugs and ears may pass each other. The plate 567 is connected at its upper end with the plate 545 by means of the link 570. Loosely mounted upon the stud 548 are the two plates 571 and 572 having fingers 573 and 574 respectively thereon, which fingers are adapted to engage with the pairs of lugs 565 and 568, 566 and 569 respectively. The plates 571 and 572 are anchored by springs 575 and 576 to eyes 577 and 578 upon the repeater control hereinafter to be described. Pivotally connected with the plate 549 is a link 579 which is expanded at its upper end to provide the broad notch 580, coöperating with the lug 547 in a manner to be described, and the slot 581. Rotatably mounted upon a stud 580' in the side frame of the machine is a bell crank comprising the arm 582 having thereon a roller 583 projecting into the slot 581 just described and the arm 584 which is bent outwardly as shown at 585 and coöperates with a roller 586 upon the disk 587 upon the extreme end of the main rock-shaft 155 of the machine. The bell crank 582—584 is normally held to the right, Fig. 53, by the spring 588 whose other end is anchored to a stud 589 in the frame of the machine. The shaft 174 hereinbefore described (which withdraws the zero pins) is connected by a crank 590 with a depending arm 591 having a slot and pin connection 592—593 with the plate 549. Thus when the plate 549 is swung to the left or in a counter-clock-wise direction, the shaft 174 will not be disturbed. When the plate 549, however, is swung to the right, the shaft 174 will be rocked and the zero pins withdrawn in the manner hereinbefore clearly explained.

In operation, when it is desired to roll a number into the duplicator pinions, the plate 549 is swung forward. In this position, the link 579 will be moved rearwardly until the rear end 580$^a$ of the notch 580 engages the lug 547, thus positively holding the plate 545 in the position illustrated in Fig. 53 wherein the numeral pinions are out of mesh with the stop-noses 70. In this position the lug 565 will be moved to the left and the finger 573 under the impulse of its spring 575 will tend to rock the plate 567 in a counter-clock-wise direction and thus through the intermediary of link 570 and rock-plate 545 throw the numeral pinions into mesh; this action, however, being prevented by the positive engagement just noted between the lug 547 and the rear end 580$^a$ of the notch 580. When the machine turns over, however, at the end of the forward stroke the roller 586 will engage the arm 584 of the bell crank 584—582 thus through the intermediary of roller 583, depressing the link 579 and releasing lug 547 whereupon the duplicator pinions 533 will snap into mesh with the stop nose arms and remain in mesh therewith during the rearward stroke thereof, thus rolling into the duplicator pinions whatever number had been set up upon the key-board. Having thus stored the number in the duplicator pinions, the operator re-sets the plate 549 to a central position, whereupon since the springs 575 and 576 are equal in strength, the parts return to the normal position shown in Fig. 53, the machine may now be operated for an indefinite period until such time as it is desired to reproduce the number stored in the duplicator pinions. When this is desired the plate 549 is set to the right whereupon the link 579 is pulled rearwardly and until the forward end 580$^b$ of the notch 580 impinges upon the lug 547, and positively swings the duplicator pinions into mesh with the stop nose arms before the turnover of the machine. In this position the lug 566 being swung to the left, the finger 574 would tend, under the influence of spring 576 to swing plate 567 in a clockwise direction and thus snap the numeral pinions out of mesh. This action, however, is prevented by the engagement just noted, of the forward end 580$^b$ of the notch 580 with the lug 547. At the end of the forward stroke, however, the roller 586 trips the lever 584 releasing the lug 547, whereupon the duplicator pinions are snapped out of mesh with the stop-nose arms. Before the turn-over of the machine, the rock shaft 174 has been rocked to withdraw the zero stops by means of the link 591 and crank 590, leaving the stop noses free to swing forward, thus since the duplicator pinions are in mesh at the beginning of and throughout the forward stroke of the machine, each of these pinions will be rotated by the stop-nose with which it is engaged until its stop 535 engages with the stationary stop 536, thus setting its corresponding duplicator numeral wheel to the zero position and allowing the corresponding stop nose arm to swing to a position corresponding to whatever number was indicated by the duplicator numeral wheel. Thus the duplicator pinions act as a substitute for the key-board and the accumulating part of the machine is set up through them precisely as if the key-board had been fingered.

It is sometimes desirable to retain the number in the duplicator after it has been delivered to the machine, as for instance when the same number is to be repeatedly used throughout the course of calculation upon which the operator is engaged. For this purpose I provide a repeat control 595, which I have also marked DRL on the drawings to indicate "duplicator repeat lever," pivoted on a shaft 596 in the frame of the machine. The repeat control 595 is arc-shaped and knurled as shown, and has pivotally connected therewith a link 596, which at its other end is pivotally connected with the dog 597 rotatably mounted upon the stud 580'. It will be remembered that upon delivering to the machine, the duplicator pinions go into mesh before the beginning of the forward stroke. Now, when it is desired to retain the number in the duplicator pinions, the repeat control 595 is rocked backward, whereupon the disk 597 slips under the tooth 546 and prevents the pinions from snapping out of mesh at the end of the forward stroke and the number is rolled back into these pinions on the back stroke of the machine. After the operation of the machine, the repeat control is set back to its normal position, the plate 549 is also set back to normal position whereupon the duplicator pinions move out of mesh with the number just delivered to the machine still retained therein.

I have provided simple connections whereby during the shift of these controls the machine is locked precisely as it is locked during the shift of any other control. This mechanism comprises a link 598 having a forked end 599 engaging with a pin 600 on the arm 601 rigid with shaft 206 carrying arms 602 connected to rod 62'. When the push button 561 is depressed, the rod 62' will be lowered, thus rocking the plate 205 and locking the machine, as heretofore fully described. For locking the machine during the shifting of the repeat control 595, I provide the lower end of this control with a cam projection 602 which coöperates with a cam roller upon an arm 603 pivoted upon a stud 604 mounted in the frame of the machine and normally held to its duty by the spring 605 whose other end is anchored to a stud 606 in the frame of the machine. The arm 603 carries a depending projection upon which is mounted a roller engaging with the wing projection 608 from the arm 601 hereinbefore described. Thus while the repeat control 595 is moving from one position to the other, the rod 62' is rolled and the machine locked against movement.

An important feature of my new duplicating mechanism is, that it is structurally independent from any of the other controls or operating parts of the machine, though functionally it coöperates with the machine as a whole. Thus the duplicator mechanism operates in reality as a substitute-keyboard and a number previously rolled into the duplicator pinions can be delivered to the machine for any operation of which the machine is capable. Moreover, by means of the repeat control the same number may be returned into the machine again and again either consecutively (in connection with the repeat lever of the machine) or from time to time as the operators may desire. I consider this duplicator mechanism of vital importance and broadly new.

Various changes in construction and arrangement of the several parts of this calculating machine may be made without departing from the spirit of my invention as defined by the appended claims.

I claim:

1. In a calculating machine, a casing, a plurality of transverse shafts mounted therein, a series of partitions removably supported on and slidably engaging said shafts, releasable means for retaining said sections in position on said shafts and adapted to be lifted away therefrom, key mechanism carried by each partition and removable therewith, and a section secured to each partition, said sections fitting together removably and forming a portion of the casing top or cover.

2. In a calculating machine, a casing, a plurality of transverse shafts mounted therein, a series of partitions removably supported on and slidably engaging said shafts, releasable means for retaining said sections in position on said shafts and adapted to be lifted away therefrom, key mechanism carried by each partition and removable therewith.

3. In a computing machine, a frame, a plurality of key-board sections removably mounted in said frame and accumulator mechanism including transfer devices operable from the key-board sections, means for preventing the transfer action of the transfer device, whereby the coöperating keyboard section may be withdrawn without affecting the operation of the machine.

4. In a calculating machine, a depressible key stem carrying a lug, a swinging stop for holding said key depressed, a stop wire, and a swinging connection between said stop wire and said key stop to permit movement of said wire while said key is depressed.

5. In a calculating machine, a swinging stop nose, stop wires therefor, keys for controlling said stop wires and yielding connections between said stop wires and said keys permitting said stop nose to swing backward over said stop wires, brushing them aside, while their respective keys are still in depressed condition.

6. In a calculating machine, a stop wire, a key, a swinging stop nose, connections between the key and the stop wire whereby the wire is yieldingly held in the path of the stop nose after the key has been depressed.

7. In a calculating machine, a stop device, a stop nose, one of said elements having a beveled face whereby the two may relatively pass each other in one direction, and key controlled means for resiliently forcing said stop device into the path of said stop nose when the key is depressed.

8. In a calculating machine, depressible key stems, a swinging stop for engagement with each key stem to hold its key in depressed position, a stop wire and a pivoted member swinging with said key stop to thrust said wire into stopping position, but movable independently of said key stop to allow return movement of said stop wire even though the key remains depressed.

9. In a calculating machine, a plurality of keys, a plurality of stop wires, swinging elements connected to the stop wires and adapted to thrust the latter into stopping position, stops for retaining depressed keys mounted behind the swinging elements whereby movement of the stops in one direction will positively shift the swinging elements, said elements, however, being movable independently of the stops.

10. In apparatus of the class described, a plurality of keys, a plurality of stop wires, swinging elements connected to the stop wires, swinging stops associated with said elements and adapted to retain the keys in depressed position, said swinging elements being disconnected from the swinging stops whereby the stop wire may be moved when a key is in depressed position.

11. In apparatus of the class described, accumulator mechanism, swinging stop noses for operating said accumulator mechanism, a series of keys arranged in rows, a series of stop wires, connections between said wires and keys whereby the wires may be individually advanced through the keys into the path of the stop noses, all so constructed and arranged that the wires will only stop the noses when the latter are moving in one direction.

12. In a calculating machine, a depressible key stem carrying a lug and swinging stirrup for engagement with said lug, a saddle member capable of swinging with said stirrup, a stop wire pivoted to said saddle member, and a spring urging said stirrup into stopping position, said saddle member being capable of movement independently of said stirrup to re-direct the stop wire even though the key stem be still held by its stirrup stop.

13. In a calculating machine, the combination of depressible key stems, a plurality of sets of stop wires actuated thereby, a swinging stop nose for each set of wires, connection between said stop wires and their respective keys, permitting return movement of the wires even though the keys be down, and a member movable to positively return the stop wires and release depressed keys.

14. In a calculating machine, a key-board section having depressible key stems, stop mechanism for each key stem to hold its key in depressed position, a stop wire controlled through said stop mechanism and means effective for disconnecting each stop wire from its controlling key for withdrawing the stop wires from stopping position independent of the position of their respective key stems.

15. In a calculating machine, depressible key stems, stop wires actuated thereby, connecting means between said wires and said stems, and a sliding plate for swinging said connecting means to positively return the stop wire and to release depressed keys.

16. In a calculating machine, depressible key stems, stop wires actuated thereby, connecting means between said wires and said stems, and means for swinging said connecting means to positively return the stop wire and to release depressed keys.

17. In a calculating machine, depressible key stems in sections, stop wires actuated thereby, connecting means between said wires and said stems, and a sliding plate for each section for swinging said connecting means to forcibly return the stop wire and to release depressed keys, and a correction key for each sliding plate to release all the depressed keys of any one section, independently of the other sections.

18. In apparatus of the class described, a key-board including a plurality of rows of keys, accumulator sections, stop noses, stop wires normally automatically movable into stopping position upon the depression of keys, manually operable means for disconnecting the stop wires and keys and maintaining the stop wires in inoperative position, means for rendering said last named means inoperative during a portion of every turnover of the machine.

19. In a calculating machine, the combination of depressible key stems, accumulator mechanism, swinging stop noses, adapted to be controlled either through the key stems or through the accumulator mechanism, stop wires for the stop noses, connections between the key stems and the stop wires, a correction key for effectively disconnecting the stop wires from the key stems and returning the latter independently of the positions of the key stems, means for temporarily rendering the connection key inoperative during the normal operation of the machine.

20. In a calculating machine, accumulator sections, stop noses associated therewith, a set of keys, means whereby the depression of individual keys determines the position of the stop noses, means prevailing over said last named means whereby the position of the stop noses is rendered independent of the depressions of individual keys, means for rendering inoperative the last named means during a portion of each cycle in the operation of the machine.

21. In a calculating machine, the combination of an accumulator, stop noses controlling the movements of the accumulator, and stop wires, depressible key stems whereby said stop wires may be put in stopping position, the connections between the key stems and the stop wires being such that the stop wires will not interfere with the return movement of the stop noses even though they lie in the return path of the stop noses and must be moved thereby.

22. In a device of the class described, a lever carrying type at one end, and a stop nose at the other end, a rock shaft serving as a support for said lever, a separate rack arm also supported by said rock shaft and a friction connection betwen said rock shaft and said lever and between said rock shaft and said rack arm.

23. In a device of the class described, the combination of a lever carrying type at one end and a stop nose at the other, a swinging support for said lever, friction means for yieldingly holding the type bearing lever to the support, a separate swinging rack arm carried by said support and friction means for yieldingly holding the rack arm to the support, and means for swinging the support to swing said lever and its type and to swing said rack arm.

24. In a calculating machine, a shaft, means for rocking the shaft, a collar frictionally mounted on the shaft and having a stop nose and a type carrier thereon, a separate rack arm frictionally mounted on the shaft, a stationary stopping member for limiting the travel of the stop nose in one direction, selectively operable devices for limiting the travel of the stop nose in the other direction at variable points.

25. In apparatus of the class described, a rocking member, a collar frictionally mounted on the rocking member and carrying a stop nose and a type head, a rack having a slip connection with the collar, manipulative means for variously limiting the forward travel of the stop nose, releasable means for locking the rack to the stop nose whereby when said last named means are released the rack may travel on after the stop nose has been stopped.

26. In a calculating machine, a rock shaft, a member frictionally mounted upon the rock shaft and carrying a stop nose and a type carrier, a segmental rack frictionally mounted at its center upon the rock shaft, an accumulator element adapted to be operated by the rack, manipulative means for selectively limiting the forward travel of one of the frictionally mounted members, locking mechanism whereby the stop nose and the rack are locked for movement together, including means whereby, when unlocked, one of said members may travel a distance corresponding to the space of one rack tooth with respect to the other, stationary means for limiting the rearward travel of one of said members whereby when the locking mechanism is released one of said members will travel the space of one rack tooth beyond the travel of the other.

27. In a calculating machine, a rocking shaft, a plurality of members frictionally mounted on said rocking shaft and each carrying a stop nose and a type head, segmental racks frictionally mounted on said shaft and having a slip connection with each of said members, accumulator mechanism operable by said racks and including tripping devices, selectively operative mechanisms associated with each member and rack, and adapted to limit the forward travel of one thereof, stationary means adapted to limit the rearward travel of one thereof, a latch and means to permit the racks and members to shift a distance of one rack tooth relatively to each other when the latch is tripped.

28. In a calculating machine, a rocking shaft, a member comprising a stop nose, frictionally associated with said shaft, another member frictionally associated with the shaft and with the stop nose for operating an accumulator section, a latch device for locking said two members together as regards angular movement about the shaft, means for limiting the rearward movement of one of said members whereby when the latch is tripped one of said members will have traveled beyond the other at the end of the rearward rocking movement of the shaft.

29. In a calculating machine, a rock shaft, a member comprising a stop nose frictionally associated with said shaft, another member frictionally associated with the shaft and with the stop nose for operating an accumulator section, a latch device for locking said two members together as regards angular movement about the shaft, means for limiting movement of one of said members whereby when the latch is tripped one of said members will have traveled beyond the other at the end of the rearward rocking movement of the shaft, and means for thereafter realining said members and relatching the latch device.

30. In a calculating machine, a rock shaft, means for causing the rock shaft to make a partial rotation and return, stop noses and racks frictionally mounted on said rock shaft, means for limiting the swing of the stop noses in either direction, latch devices for causing the stop noses and racks to move together, tripping devices for releasing the latches whereby when the latch is released the racks will move beyond the stop noses at the end of the return swing of the rock shaft, means for thereafter and realining said racks and stop noses and relatching the latch devices.

31. In a device of the class described, a type bearing lever, a friction support for said lever, a swinging rack carried by said support and movable with respect to said lever and means for operating the friction support to swing said rack and said lever, and means for retarding the movement of the lever to shift its position with respect to said rack.

32. In a device of the class described, the combination of a type bearing lever having a stop nose, a support for said lever, friction means yieldingly holding said lever to the support, a rack carried by said support and capable of swinging with respect to said lever, means for operating the supporting means and means for retarding the movement of the type bearing lever, while permitting a limited further movement of said rack.

33. In a device of the class described, the combination of a rock shaft, spools and disks placed alternately on said shaft and swinging therewith, means for yieldingly holding said spools and disks toward each other and a type bearing lever carried by said rock shaft between a spool and a disk and frictionally driven thereby when the rock shaft turns, whereby the stopping of said lever will not stop the shaft and soft metal pads on said lever and frictionally engaged between said spool and disk.

34. In a device of the class described, the combination of a rock shaft, friction spools and disks fixed to swing with said shaft and slidable thereon, there being at least one disk between each pair of spools, said spools and disks being held toward one another by spring pressure and type bearing arms, each of which is frictionally engaged by the adjacent sides of a spool and disk, means for swinging the rock shaft to swing the type bearing arms, and manually operated stops for checking the movement of said arms.

35. In a device of the class described, the combination of a rock shaft, means for swinging it, a pair of spools, and a collar mounted upon said shaft and swinging therewith, a shoulder on said collar and a type bearing arm mounted thereon and held between said collar and one of said spools and a swinging rack arm frictionally held between the other side of the collar and the other spool.

36. In a device of the class described, the combination of a rock shaft, and type bearing levers and rack arms mounted thereon and capable of independent movement, latching means for connecting each rack bar with one of said levers for simultaneous operation, a series of spools and disks mounted on said rock shaft to turn therewith and free to slide thereon, said rack arms and said levers being positioned in pairs in frictional engagement with the opposite sides of the disks.

37. In a machine of the class described, calculating mechanism arranged in sections and including transfer mechanism, shafts, each of said sections including a plate having an element of the transfer mechanism mounted thereon and provided with open ended slots, said slots being slidable onto and off of said shafts in a direction transverse to the length of said shafts, whereby said plates and attached transfer parts may be selectively removed or interchanged.

38. In a machine of the class described, an accumulator comprising a plurality of sections, each removable from the machine as a unit without disturbing the other sections, numeral wheels and a cam adjacent to each numeral wheel and coöperating with one of said sections to unlatch the same when a transfer is to be made from one section to the next.

39. In a calculating machine, an accumulator section comprising a plate having recesses therein adapted to removably fit upon appropriate rods in the machine, staffs mounted in said plate, a cover plate removably secured to said staffs, a trip lever pivotally mounted between said plates, a lever controlled by said trip lever, a link secured to said last named lever for operating a latch, all for the purpose described.

40. In apparatus of the class described, a plurality of accumulator pinions, a plurality of racks for operating said pinions, stop noses associated with said racks, selective means for variously limiting the movement of said stop noses, means for preventing relative movement between the racks and the stop noses, transfer mechanism for releasing said preventive means whereby the racks and stop noses may have a relative movement, said last named mechanism being controlled in accordance with the setting of the accumulator pinions, means for repositioning the stop noses and racks and simultaneously resetting the movement preventing devices.

41. In a machine of the class described, a swinging rock shaft, stop nose arms frictionally driven thereby, stop wires positioned to determine the swing of the various stop noses, a swinging rack carried by said rock shaft, accumulator wheels adapted to be brought into mesh with their respective racks, sectionalized transfer mechanism actuated in accordance with the setting of the corresponding numeral wheels and connections from said transfer sections to their respective stop noses to permit slipping of the stop noses with respect to their racks in either direction when a transfer is to be made from one numeral wheel to the next.

42. In a machine of the class described having swinging stop noses, and stop wires for regulating the swing of those noses, the combination of numeral wheels, swinging racks with which those wheels may be thrown in mesh and transfer mechanism operative through the action of said numeral wheels to slip said racks with respect to their stop noses in either direction to transfer across the machine in either direction from one numeral wheel to the next.

43. In a machine of the class described, the combination of a rock shaft, type bearing levers frictionally driven by said rock shaft and each bearing a stop nose, swinging rack arms frictionally driven by said rock shaft, latching means holding said rack arms to move with said stop noses, numeral wheels each provided with a cam and means interposed between each cam and the latching means to a stop nose for releasing the swinging rack and allowing it to slip in either direction with respect to its stop nose by a distance equivalent to one tooth of the rack.

44. In a machine of the class described, the combination of a rock shaft, swinging levers frictionally driven thereby each carrying printing means at one end and a stop nose at their other, a swinging rack carried by said rock shaft, accumulator wheels meshing with said racks and means for slipping a rack with respect to its stop nose when the corresponding accumulator wheel has made one complete revolution and must transfer across to the next adjacent wheel.

45. In a calculating machine having a swinging stop nose arm with a type bearing head at one end, the combination with spring pressed type mounted in each of said heads and a ribbon guard positioned at the side of each head and projecting beyond the inactive position of the type faces.

46. In a calculating machine, swinging racks, accumulator pinions adapted to mesh with said racks, a lever and mechanism associated therewith for snapping said pinions into mesh with said racks at the beginning of the forward stroke of the latter and out of mesh at the end of the forward stroke thereof, or vice versa, according to the setting of said lever, a control lever for said swinging lever adapted to assume two positions, connections between the control lever and the lever whereby, in whichever position the control lever may be, it may move substantially to the opposite position before disturbing the setting of the swinging lever and thereafter in its continued movement will quickly snap the swinging lever to the opposite position, and means for locking the machine during the shifting of the control lever.

47. In a calculating machine, swinging racks, numeral pinions, a swinging lever, spring devices and mechanisms associated with said lever for snapping said accumulator pinions into mesh with the swinging racks at times controlled by the setting of said swinging lever, a shiftable control device for controlling the setting of the swinging lever, connections between the control devices and the lever whereby the control device may move from the position corresponding to either setting of the lever, substantially to a position corresponding to the other setting of the lever, without disturbing the lever, and means for locking the machine during the shift of the control lever.

48. In a machine of the class described, the combination of swinging racks, pinions for meshing with said racks, and a spring tension device for snapping said pinions into mesh with the racks and means for reversing said tension device subsequently to snap the pinions out of mesh with their racks.

49. In a machine of the class described, the combination of a main drive shaft, a plate swinging therewith, a tension device actuated by said plate, swinging racks, pinions for meshing with said racks and releasing mechanism associated with said tension device and coöperating with said swinging plate to shift the pinions with respect to their racks at the proper moment.

50. In a calculating machine, swinging racks, stop noses, stop wires, numeral pinions having stop devices thereon, totaling elements comprising means movable into position for engagement by said stop devices, means to snap the pinions into engagement with the racks at the beginning of the swing thereof, and means to withdraw the stop wires whereby the control of the racks is shifted from the stop noses to the stop devices and the racks are set to a position corresponding to the total while the machine is cleared.

51. In a machine of the class described, the combination of a shifting carriage, a platen carried thereon, printing mechanism coöperating with said platen, key-set mechanism for governing the action of the printing mechanism, an adding and subtracting lever, and power-driven means for shifting said carriage with respect to said printing mechanism when said adding and subtracting lever is shifted.

52. In a calculating machine having control means for changing from additions to subtractions, of a sliding carriage and power driven means for shifting said carriage automatically with the shifting of said control means.

53. In a calculating machine having a printing mechanism, and a key-board operatively connected to govern said mechanism, the combination of a sliding carriage, an accumulator, control mechanism for shifting said accumulator from additions to subtractions or vice versa, and means for positively shifting said carriage automatically when said control means is shifted.

54. An adding and subtracting machine having a sliding carriage, and power driven means for shifting said carriage automatically when said machine is changed from adding to subtracting.

55. In a calculating machine having a sliding carriage, the combination of a motor, clutch mechanism for connecting said motor with said carriage when the carriage is to be shifted and means for locking said clutch against operation when desired.

56. In a calculating machine having a sliding carriage, the combination of a continuously operating motor, a ratchet actuated thereby, a crank, clutch mechanism for connecting said crank to turn with said ratchet and connections between said crank and said carriage whereby said carriage may be shifted, said crank starting from dead center and stopping at dead center with respect to said connections.

57. In a calculating machine having printing mechanism and manipulative devices for governing said mechanism, the combination of an accumulator adapted to add or subtract, a carriage control mechanism for automatically positively shifting said carriage at the change from the adding to the subtracting operation of the accumulator or vice versa, and means for rendering said shifting mechanism inoperative.

58. In a calculating mechanism adapted to add or subtract, printing devices including a shiftable carriage, means for shifting said carriage at each change from addition to subtraction or vice versa, whereby amounts added and subtracted are printed in different columns.

59. In a calculating machine having control mechanism for shifting from additions to subtractions, the combination of a sliding carriage and continuously operating motor, a clutch mechanism responsive to the condition of the machine whether set for additions or subtractions and operative to connect said motor with said sliding carriage to shift the carriage so that added items may be printed in one column and subtracted items in another column.

60. In a calculating machine having a printing mechanism, an accumulator, and means for printing a total, a platen, means for shifting paper over said platen at each stroke of the printing mechanism, and means for giving a double shift to the paper when a total is to be printed.

61. In a calculating machine having an accumulator, a printing mechanism and a total lever for setting the printing mechanism to print the total in the accumulator, of a platen shifting means and means for giving the platen a double shift when the printing mechanism is to print a total.

62. In a calculating machine, a sliding platen carriage, power driven means for shifting said carriage and means for interrupting said driving connection and locking said carriage against sliding movement when desired.

63. In a calculating machine having an accumulator, printing means and key-set mechanism for controlling the accumulator, means for printing a total as indicated by the accumulator and means for locking the machine against printing when the accumulator is in an over-draft condition.

64. In a machine of the class described having a printing mechanism, an accumulator and manually controlled means for governing the accumulator, of a total lever, and means for locking said total lever when the accumulator is in an over-draft condition.

65. In a machine of the class described having a plurality of number wheels and means for transferring the rotation of one wheel to an adjacent wheel, of a cam carried by the last wheel of the series, printing mechanism operative to produce a permanent record of the setting of the accumulator while adding or subtracting normally, and means actuated by said cam for printing on said record a special over-draft character when subtracted items have run the numeral wheels beyond their lower limit and thereby have swung the last wheel of the series backward from its zero to its nine position.

66. In a calculating mechanism, key-set device, stop nose arms controllable therefrom and having rack teeth, duplicator pinions having stops, other stops adjacent thereto, means to cause the duplicator pinions to mesh with the stop nose rack teeth during one movement of the latter, whereby the pinion stops are moved away from the other stops, means to cause the duplicator pinions to mesh with the stop nose rack teeth during another movement of the latter whereby said stops are brought together to selectively limit the movement of the stop nose arms in accord with the setting of the duplicator stops.

67. In a calculating machine including swinging actuating devices, a duplicator mechanism comprising duplicator pinions adapted to be swung into or out of mesh with said actuating devices, means for positively holding the duplicator pinions selectively in or out of mesh, means for simultaneously imparting a tension to said duplicator mechanism to shift it in the opposite direction and means for tripping said positively engaging means at the end of the first half cycle of the machine operation, whereby said pinions are snapped out of or into mesh as the case may be.

68. In a calculating machine, a calculating mechanism, a series of calculating sections in the calculating mechanism, each of which is detachably mounted in the machine, and the parts of which are each detachably connected with each other, a calculating wheel in each calculating section, designed to be rotated in opposite directions for adding and subtracting, and means for rotating the calculating wheels in opposite directions.

69. In a calculating machine, a calculating mechanism, a series of calculating sections in the calculating mechanism, each of which is detachably mounted in the machine, and the parts of which are each detachably connected with each other, a calculating wheel in each calculating section, designed to be rotated in opposite directions for adding and subtracting, a calculating rack for each of the calculating wheels, and means for driving the racks for rotating the calculating wheels in either direction, and means to cause said racks and wheels to engage and disengage at different points in the operative cycle of the machine.

70. In a calculating machine, a spring operated totalizing mechanism, an adding and a subtracting lever for throwing the calculating mechanism into and out of operation for adding or subtracting, whereby the parts are returned to their normal position after the completion of the addition or subtraction, and locking means for holding the parts of the device in their proper positions while the calculating mechanisms are completing their operations and later releases same to allow spring to act.

71. In a calculating machine, an automatic calculating mechanism, means for throwing the calculating mechanism into and out of operation for adding or subtracting, whereby the parts are returned to their normal position after the completion of the addition or subtraction, a printing mechanism operatively connected with the calculating mechanism for automatically printing the numbers which are added or subtracted, a carriage in the printing mechanism, and means for automatically shifting the carriage when the subtracting lever is operated to list the subtracted numbers in a column separate from the column used in listing the added numbers.

72. In a calculating machine, a key controlled automatic calculating mechanism, an adding and a subtracting lever for throwing the calculating mechanism into and out of operation for adding or subtracting, whereby the parts are returned to their normal position after the completion of the addition or subtraction, a printing mechanism operatively connected with the calculating mechanism for automatically printing the numbers which are added or subtracted, a carriage in the printing mechanism, and means for automatically shifting the carriage when the subtracting lever is operated to list the subtracted numbers in a column separate from the column used in listing the added numbers.

73. In a calculating machine, a series of numeral wheels, and a carry-over mechanism associated with said numeral wheels, said mechanism consisting of a plurality of independently removable sections, there being a section for each but the highest order numeral wheel.

74. In a calculating machine, a plurality of calculating sections, key-controlled mechanism for operating said calculating sections to perform addition or subtraction, a plurality of transverse shafts mounted in said machine, each of said sections slidably engaging said shafts, and releasable means for retaining said sections in position on said shafts.

75. In a calculating machine, the combination of a rock shaft, a plurality of friction members rigidly mounted thereon, each member consisting of a sleeve which terminates at either end in a disk provided with an axial flange, the flanges of adjacent disks extending toward each other to present opposing friction surfaces, a collar held between each pair of opposing flanges, a type arm frictionally held between one face of said collar and the adjacent disk, and a rack arm frictionally held between the other face of said collar and its adjacent disk, calculating mechanism adapted to be actuated by said arms, and means for yieldably forcing said friction members together.

76. In a calculating machine, the combination of a rock shaft, a plurality of friction members rigidly mounted thereon, each member consisting of a sleeve which terminates at either end in a disk provided with an axial flange, the flanges of adjacent disks extending toward each other to present opposing friction surfaces, an intermediate disk mounted on said shaft between each pair of opposing flanges and provided with a peripheral frictional flange in alinement with the flanges on either side thereof, an actuating arm held frictionally between each intermediate disk and one of the adjacent end disks, a controlling arm held frictionally between each intermediate disk and the other adjacent end disk for controlling the operation of the associated actuating arm, means for yieldably forcing said friction members together, and calculating mechanism adapted to be operated by said actuating arms.

77. In a calculating machine, the combination of a rock shaft, a pair of end disks mounted thereon, an intermediate disk mounted on said shaft between said end disks, said disks being provided with opposing frictional flanges, a type lever held frictionally between the intermediate disk and one of the end disks, a rack arm held frictionally between the intermediate disk and the other end disk, and means for yieldably forcing said disks together.

78. In a calculating machine, the combination of a shaft, a pair of friction members mounted thereon, an arm held frictionally between said members, said arm having a soft metal pad on each side thereof, said pads frictionally engaging the adjacent faces of said friction members respectively, a calculating device adapted to be operated by said arm, and means for yieldably forcing said members together.

79. In a calculating machine, the combination of a shaft, an arm, frictional means for operatively supporting said arm on said shaft, said frictional means including restricted annular contact surfaces between which said arm is frictionally held, said arm having a soft metal pad on each side thereof to frictionally engage said surfaces, and a calculating device adapted to be operated by said arm.

80. In a calculating machine, the combination of a series of numeral wheels, a toothed sector associated with each numeral wheel for operating the same a predetermined amount, a key-controlled arm associated with said sector for controlling the operation thereof, a pin-and-slot connection between each sector and its arm to permit a one-space movement of the sector in either direction independently of the associated arm, means for normally locking each sector and its arm together for simultaneous operation, connections between the numeral wheels and said locking means, whereby a lower-order wheel on passing through zero automatically releases the sector of a higher-order wheel to carry one unit into the higher-order wheel, and means for locking any desired sector against release to prevent carrying through that sector.

81. In a calculating machine, the combination of a rock shaft, a pair of friction disks rigidly mounted thereon, said disks being provided with peripheral flanges, an arm held frictionally between said flanges, an indicating member adapted to be actuated by said arm, and means for yieldably forcing said disks together.

82. In a calculating machine, the combination of calculating wheels, a key-controlled rack associated with each wheel for actuating the same, means for operating said racks to clear the numeral wheels, a key-controlled stop-arm associated with each numeral wheel, and a lug provided for each numeral wheel to engage said arm when the numeral wheel reaches zero position.

83. In a calculating machine, the combination of calculating wheels adapted to receive entries, supplemental mechanism arranged to be operated in accordance with the indication of said calculating wheels at any time, a sectional keyboard, means for locking said sections in position, and means controlled by said mechanism for releasing said locking means.

In witness whereof, I hereunto subscribe my name to this specification in the presence of two witnesses.

MARTIN TEETOR.

Witnesses:
F. C. BELL,
H. C. BLACKBURN.